(12) United States Patent
Petitpont et al.

(10) Patent No.: US 12,288,377 B2
(45) Date of Patent: Apr. 29, 2025

(54) COMPUTER-BASED PLATFORMS AND METHODS FOR EFFICIENT AI-BASED DIGITAL VIDEO SHOT INDEXING

(71) Applicant: Newsbridge SAS, Boulogne Billancourt (FR)

(72) Inventors: Frédéric Petitpont, Boulogne Billancourt (FR); Philippe Petitpont, Boulogne Billancourt (FR); Yannis Tevissen, Boulogne Billancourt (FR); Khalil Guetari, Boulogne Billancourt (FR)

(73) Assignee: Newsbridge SAS, Boulogne Billancourt (FR)

( * ) Notice: Subject to any disclaimer, the term of this patent is extended or adjusted under 35 U.S.C. 154(b) by 41 days.

(21) Appl. No.: 18/615,754

(22) Filed: Mar. 25, 2024

(65) Prior Publication Data
US 2024/0320952 A1  Sep. 26, 2024

Related U.S. Application Data

(60) Provisional application No. 63/457,732, filed on Apr. 6, 2023, provisional application No. 63/454,256, filed on Mar. 23, 2023.

(51) Int. Cl.
*G06K 9/00* (2022.01)
*G06V 10/74* (2022.01)
(Continued)

(52) U.S. Cl.
CPC .......... *G06V 10/761* (2022.01); *G06V 10/764* (2022.01); *G06V 20/70* (2022.01)

(58) Field of Classification Search
None
See application file for complete search history.

(56) References Cited

U.S. PATENT DOCUMENTS

| | | | |
|---|---|---|---|
| 2022/0067381 A1* | 3/2022 | Lin | G06F 18/214 |
| 2022/0222469 A1 | 7/2022 | Rao et al. | |
| 2022/0270369 A1 | 8/2022 | Yu et al. | |

OTHER PUBLICATIONS

International Search Report and Written Opinion from International Application No. PCT/IB2024/000143 dated Sep. 4, 2024.
(Continued)

*Primary Examiner* — S J Park
(74) *Attorney, Agent, or Firm* — GREENBERG TRAURIG, LLP

(57) ABSTRACT

Systems and devices of the present disclosure may receive a digital video comprising a sequence of video frames. A video frame may be input into a video frame encoder to output a video frame vector. A similarity value between the video frame and an adjacent video frame in the sequence may be determined based at least in part on a similarity between the video frame vector and adjacent video frame vector of the adjacent video frame to identify scene. Each video frame of the scene may be input into expert machine learning models to output expert machine learning model-specific labels associated with the scene, and expert machine learning model-specific markup tags associated with the expert machine learning models may be applied. A scene text-based markup for the scene may be generated comprising the expert machine learning-specific markup tags and the expert machine learning-specific labels associated with the scene.

20 Claims, 38 Drawing Sheets

(51) Int. Cl.
*G06V 10/764* (2022.01)
*G06V 20/70* (2022.01)

(56) References Cited

OTHER PUBLICATIONS

Cazzato et al., "Video Indexing Using Face Appearance and Shot Transition Detection," 2019 IEEE/CVF International Conference on Computer Vision Workshop (ICCVW), pp. 2611-2618.

* cited by examiner

| OCR in scanned documents | Scene Text Recognition (STR) |
|---|---|
| Full image | 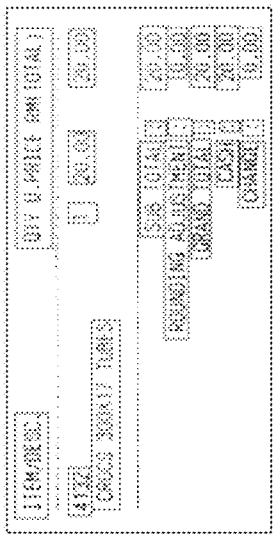 |
| 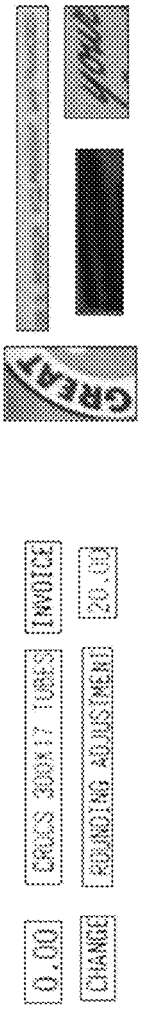 | |
| Text instance | |

- Clean background.
- Single color, regular font, consistent size, and uniform arrangement.
- Clear and frontal.
- Occupied the main part of the images.

- Complex background.
- Multiple colors, irregular fonts, different sizes, and diverse orientations.
- Distorted by nonuniform illumination, low resolution, and motion blurring.
- Captured randomly in its native environment.

FIG. 7

Figure 3. Canonical logo images. There might be significant differences between the versions of the same brand logo.

Figure 2. Our logo detection framework. Generic logo detector outputs candidate logo regions, which are cropped from the image and then matched to a set of canonical logo images using low dimensional CNN embeddings learned for matching logo images.

COMPUTER-BASED PLATFORMS AND METHODS FOR EFFICIENT AI-BASED DIGITAL VIDEO SHOT INDEXING

FIELD OF TECHNOLOGY

The present disclosure generally relates to computer-based platforms/systems configured for efficient AI-based digital video shot indexing using video shoting and multiple AI-based feature pipelines to extract features of shots of videos chunks for an improved search algorithm.

BACKGROUND

As the quantity of media content increases, identifying relevant content and/or content of interest becomes increasingly difficult. Typically, searching such media content relies on the use of manually created tags and/or captions.

SUMMARY

In some aspects, the techniques described herein relate to a method including: receiving, by at least one processor, a digital video including a sequence of a plurality of video frames; inputting, by the at least one processor, at least one video frame into a video frame encoder to output at least one video frame vector for the at least one video frame; determining, by the at least one processor, a similarity value between the at least one video frame and at least one adjacent video frame in the sequence based at least in part on a similarity between the at least one video frame vector and at least one adjacent video frame vector of the at least one adjacent video frame; determining, by the at least one processor, at least one scene within the sequence of the plurality of video frames based at least in part on: the similarity value, and a similarity threshold value; wherein the at least one scene includes at least one sub-sequence of adjacent video frames; inputting, by the at least one processor, each video frame of the at least one scene into a plurality of expert machine learning models to output a plurality of expert machine learning model-specific labels associated with the at least one scene; determining, by the at least one processor, a plurality of expert machine learning model-specific markup tags associated with the plurality of expert machine learning models; and generating, by the at least one processor, at least one scene text-based markup for the at least one scene including the plurality of expert machine learning-specific markup tags and the plurality of expert machine learning-specific labels associated with the at least one scene.

In some aspects, the techniques described herein relate to a method, further including: inputting, by the at least one processor, a plurality of video frames into a video frame encoder to output a plurality of video frame vectors; generating, by the at least one processor, an aggregate video frame vector for the plurality of video frame vectors; determining, by the at least one processor, a shot similarity value between the aggregate video frame vector and at least one adjacent aggregate video frame vector of an adjacent plurality of video frames in the sequence; and determining, by the at least one processor, a scene including the plurality of video frames and the adjacent plurality of video frames based at least in part on the shot similarity value exceeding a threshold value.

In some aspects, the techniques described herein relate to a method, further including: inputting, by the at least one processor, the scene into a scene classifier neural network to output at least one shot type based at least in part on a plurality of trained neural network parameters.

In some aspects, the techniques described herein relate to a method, further including: indexing, by the at least one processor, the at least one sub-sequence of video frames of the at least one scene using the at least one scene markup.

In some aspects, the techniques described herein relate to a method, further including: searching, by the at least one processor, the at least one scene markup, using the index, based on a search query including plain text.

In some aspects, the techniques described herein relate to a method, further including: receiving, by at least one processor, a search query including plain text; encoding, by the at least one processor, the search query into a search vector using at least one semantic embedding model; encoding, by the at least one processor, the at least one scene text-based markup into a destination vector using the at least one semantic embedding model; and searching, by the at least one processor, the at least one destination vector with the search vector based at least in part on a measure of similarity between the search vector and the destination vector.

In some aspects, the techniques described herein relate to a method, further including: increasing, by the at least one processor, upon determining that a first expert machine learning model-specific label of the plurality of expert machine learning model-specific labels matches a second expert machine learning model-specific label of the plurality of expert machine learning model-specific labels, an expert machine learning model-specific label confidence score of at least one of at least one of the first expert machine learning model-specific label or the second expert machine learning model-specific label by at least one rule; and confirming, by the at least one processor, the at least one of at least one of the first expert machine learning model-specific label or the second expert machine learning model-specific label by at least one rule based at least in part on the expert machine learning model-specific label confidence score exceeding a threshold.

In some aspects, the techniques described herein relate to a method, wherein the at least one rule is user configurable.

In some aspects, the techniques described herein relate to a method, further including: querying, by the at least one processor, at least one external data source with at least one expert machine learning model-specific label of the plurality of expert machine learning model-specific labels; receiving, by the at least one processor, property data associated with the at least one expert machine learning model-specific label from the at least one external data source in response; and modifying, by the at least one processor, the at least one scene text-based markup to include metadata including the property data.

In some aspects, the techniques described herein relate to a method, wherein the video is live-streamed and the indexing is in real-time.

In some aspects, the techniques described herein relate to a system including: At least one processor that is configured to: receive a digital video including a sequence of a plurality of video frames; input at least one video frame into a video frame encoder to output at least one video frame vector for the at least one video frame; determine a similarity value between the at least one video frame and at least one adjacent video frame in the sequence based at least in part on a similarity between the at least one video frame vector and at least one adjacent video frame vector of the at least one adjacent video frame; determine at least one scene within the sequence of the plurality of video frames based at least in part on: the similarity value, and a similarity threshold value; wherein the at least one scene includes at least one sub-sequence of adjacent video frames; input each video frame of the at least one scene into a plurality of expert machine learning models to output a plurality of expert machine learning model-specific labels associated with the at least one scene; determine a plurality of expert machine learning model-specific markup tags associated with the plurality of expert machine learning models; and generate at least one scene text-based markup for the at least one scene including the plurality of expert machine learning-specific markup tags and the plurality of expert machine learning-specific labels associated with the at least one scene.

In some aspects, the techniques described herein relate to a system, wherein the at least one processor is further configured to: input a plurality of video frames into a video frame encoder to output a plurality of video frame vectors; generate an aggregate video frame vector for the plurality of video frame vectors; determine a shot similarity value between the aggregate video frame vector and at least one adjacent aggregate video frame vector of an adjacent plurality of video frames in the sequence; and determine a scene including the plurality of video frames and the adjacent plurality of video frames based at least in part on the shot similarity value exceeding a threshold value.

In some aspects, the techniques described herein relate to a system, wherein the at least one processor is further configured to: input the scene into a scene classifier neural network to output at least one shot type based at least in part on a plurality of trained neural network parameters.

In some aspects, the techniques described herein relate to a system, wherein the at least one processor is further configured to: index the at least one sub-sequence of video frames of the at least one scene using the at least one scene markup.

In some aspects, the techniques described herein relate to a system, wherein the at least one processor is further configured to: search the at least one scene markup, using the index, based on a search query including plain text.

In some aspects, the techniques described herein relate to a system, wherein the at least one processor is further configured to: receiving, by at least one processor, a search query including plain text; encode the search query into a search vector using at least one semantic embedding model; encode the at least one scene text-based markup into a destination vector using the at least one semantic embedding model; and search the at least one destination vector with the search vector based at least in part on a measure of similarity between the search vector and the destination vector.

In some aspects, the techniques described herein relate to a system, wherein the at least one processor is further configured to: increase upon determining that a first expert machine learning model-specific label of the plurality of expert machine learning model-specific labels matches a second expert machine learning model-specific label of the plurality of expert machine learning model-specific labels, an expert machine learning model-specific label confidence score of at least one of at least one of the first expert machine learning model-specific label or the second expert machine learning model-specific label by at least one rule; and confirm the at least one of at least one of the first expert machine learning model-specific label or the second expert machine learning model-specific label by at least one rule based at least in part on the expert machine learning model-specific label confidence score exceeding a threshold.

In some aspects, the techniques described herein relate to a system, wherein the at least one rule is user configurable.

In some aspects, the techniques described herein relate to a system, wherein the at least one processor is further configured to: query at least one external data source with at least one expert machine learning model-specific label of the plurality of expert machine learning model-specific labels; receive property data associated with the at least one expert machine learning model-specific label from the at least one external data source in response; and modify the at least one scene text-based markup to include metadata including the property data.

In some aspects, the techniques described herein relate to a system, wherein the video is live-streamed and the indexing is in real-time.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 7 illustrates text recognition by the text recognition pipeline 104 of the video shot search platform 110 in accordance with one or more embodiments of the present disclosure.

DETAILED DESCRIPTION

Figure 1:
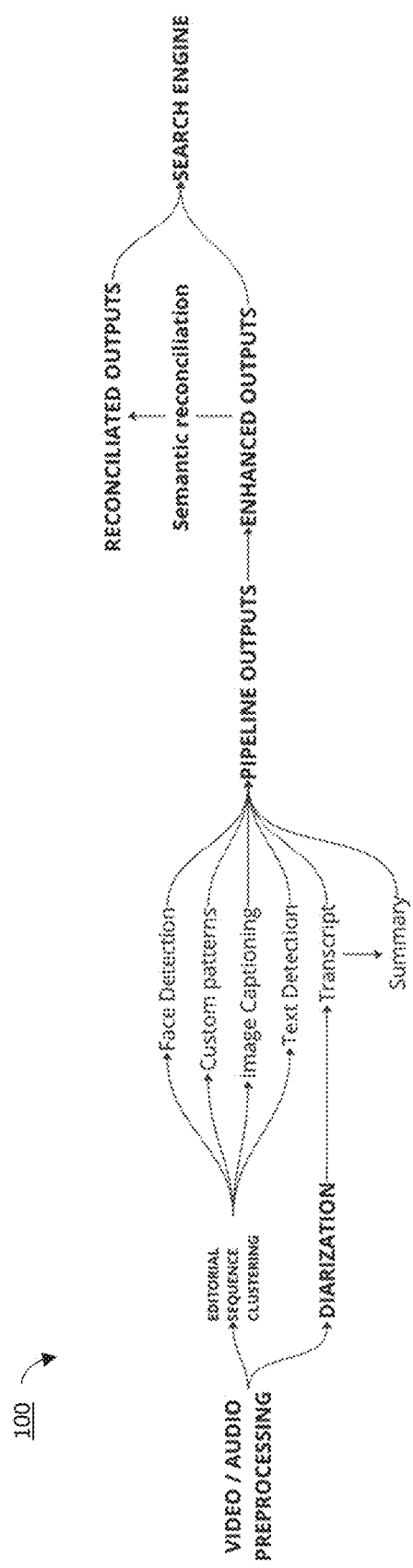
FIG. 1 depicts an AI pipeline 100 for processing video to generate enhanced video features that accelerate video shot searching in accordance with one or more embodiments of the present disclosure.

Various detailed embodiments of the present disclosure, taken in conjunction with the accompanying FIGS., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 33 illustrate systems and methods of AI-accelerated search of digital video shots that leverage machine learning and artificial intelligence processing of digital video streams to provide real-time searching for shots of the digital video streams. The following embodiments provide technical solutions and technical improvements that overcome technical problems, drawbacks and/or deficiencies in the technical fields involving search engines and data search technologies, including searching of digital video. As explained in more detail, below, technical solutions and technical improvements herein include aspects of improved video search technology by processing a digital video stream and/or digital video file with a pipeline of artificial intelligence and/or machine learning models to detect text, logos, persons, audio, labels, and/or other information captured in the video and/or audio component of the digital video stream and/or digital video file in order to extract a searchable video shot caption for particular shots within the digital video stream and/or digital video file. Based on such technical features, further technical benefits become available to users and operators of these systems and methods. Moreover, various practical applications of the disclosed technology are also described, which provide further practical benefits to users and operators that are also new and useful improvements in the art.

In some embodiments, technical solutions are designed to solve the video searchability problem. Such technical solutions include a core AI indexing technology. The AI indexing technology may include natural language models to generate human-like descriptions of video content. In some embodiments, the AI indexing technology may be specifically trained on tens, hundreds, thousands, tens of thousands, hundreds of thousands or more of hours of media entertainment and/or sports audiovisual content, using AI transformers.

In some embodiments, the AI indexing technology may solve many problems for media and sports organizations, by being able to index vast amounts of content faster than typical methods, and search large video collections as easily and intuitively as they search the web.

In some embodiments, the AI indexing technology may be fast and scalable: for example, more than 500 hours of video can be indexed per minute, including all the relevant metadata and description generation. As a result, organizations may start working with, and monetizing, archives of content quickly.

In some embodiments, the prohibitive cost of traditional AI services previously held companies back from embarking on full automation of archive and live indexing operations. In some embodiments, the AI indexing technology has lower energy consumption, making these projects more cost effective by making them fast (e.g., 2, 3, 4, 5, 6, 7, 8, 9, 10 or more times as efficient).

In some embodiments, the current state of indexing with AI results in a jumble of tags. But, in some embodiments, the AI indexing technology may be a breakthrough in its ability to describe shots in natural language. In some embodiments, the language model may link raw modalities (detection of face, text, logo, landmarks, actions, transcription, etc.) to generate a semantic description for increased searchability.

In some embodiments, the AI indexing technology may bundles a multifaceted AI with the ability to be customized and trained by an end user with multimodal rules and a custom thesaurus.

Referring to FIG. 1, an AI pipeline 100 for processing video to generate enhanced video features that accelerate video shot searching is depicted in accordance with one or more embodiments of the present disclosure.

In some embodiments, the AI pipeline 100 may support almost any type of video formats. Such formats may include, e.g., simpler MP4 files, advanced MXF from the broadcast industry, complex MOV or TS, among others or any combination thereof. The video may be encoded and decoded using a codec, e.g., MPEG2, H264, H265, AV1, among others or any combination thereof.

In some embodiments, the AI pipeline 100 may operate on discrete video files and/or video streams, e.g., live video streams. In some embodiments, the format of the live streams can be, e.g., RTMP, RTSP, HLS, SRT among others or any combination thereof. In some embodiments, the live streams may be received on a webserver (e.g., based on NGINX or other webserver or any combination thereof).

In some embodiments, a live stream may be a stream of bytes that is written as a file on a local machine according to a naming format. For example, the naming format may include, e.g., the name of the device from the ground (e.g., the recording device) and a timestamp.

In some embodiments, in parallel to writing the live stream to storage, another processing thread may be reading the file (which may be a growing file as the live stream is received and continuously stored), and packaging it into chunks, such as chunks in a video streaming format (e.g., HLS or other format or any combination thereof) that are sent to an object storage.

In some embodiments, the object storage stores video files and video streams. The object storage may be accessed via, e.g., application programming interface (API), hypertext transport protocol (HTTP), or other communication protocol and/or interface or any combination thereof, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network). In some embodiments, the object storage may, therefore, be the final storage solution but also the storage used to perform any further processing.

In some embodiments, object storage may be used because it is efficient in terms of energy, available size, durability, (one can either build oner own or use one from cloud provider, Azure, Google, etc.). In some embodiments, object storage may have tradeoffs and challenge such as, e.g.:

a. All access may be made via presigned HTTP URL, which has a delay of a several milliseconds: this means when processing content every call has several milliseconds delay due to the TCP handshake (unlike if processing a file from a solid-state drive (SSD) where delays would only be a few ms).

b. When sending Files, these are only visible at the end of the upload. In some embodiments, for regular "archive files" this drawback may not be an issue since the archive files are finished files. But when this is a live stream that can last for hours or more, such as 24 hours, only being visible at the end of the upload would mean processing would be delayed until the very end of the transmission.

Accordingly, in some embodiments, these technical issues may be solved by using a "chunk pivot format" to ensure further processing at scale. In some embodiments, the chunk format may include recording live streams as a growing file, and in parallel chunk the video stream and send chunks to the object storage on the fly (where, e.g., each chunk is 1, 2, 3, 4, 5, 6, 7, 8, 9, 10 or seconds duration, resulting each chunk being 1, 2, 3, 4, 5, 6, 7, 8, 9, 10 or seconds after being recorded). In some embodiments, any uploaded file and live streams may be normalized using, e.g., MPEG DASH chunks In some embodiments, normalizing any video contribution into the "chunked pivot format" may unlock the use of high availability cloud object storage. In some embodiments, any contribution (as described before, live, file, whatever the codec or format) is transcoded to a specific "chunk pivot format" (optimized with GOP size of 3 sec), and packetized to small video chunks.

In some embodiments, the video stream is processed in one track of chunks for the video, and as many tracks and chunks for each audio track. In some embodiments, each audio chunk duration has a predetermined duration (e.g., 1, 2, 3, 4, 5, 6, 7, 8, 9, 10 or more seconds) to maximize quality and speed.

In some embodiments, the one or more libraries for forming the chunk-based pivot format, such as, e.g., MPEG-DASH and GPAC Packetize open source library. In some embodiments, the chunk pivot format may be:
  a. Readable in a web browser so at to provide a preview for any user, and
  b. User for processing purpose (including an AI analysis by the AI pipeline 100, transcoding, among other processing operations or any combination thereof) from anywhere using, e.g., web technologies and/or cloud services including HTTP access to object storage, among other technologies or any combination thereof.

In some embodiments, as the transcoding and packetization progresses, chunks are sent again to object storage (along with a text file manifest) that is updated every update period, where the update period is a multiple of the chunk duration, such as for a 3 second chunk, update periods of 3, 9 and 18 seconds (depending on the velocity of the process).

In some embodiments, when the file manifest is updated, the system may send an event to all other components (such as, e.g., via an Apache Kafka bus). In some embodiments, the event may even be used for various usages, such as:
  a. Turned into a websocket event that is sent to users on the platform (platform is access via a web browser), so that without any action the associated video player will keep playing
  b. Trigger AI pipeline 100 or continue processing (for live streams)

In some embodiments, the chunks may be processed by the AI pipeline 100, which may include multiple AI and/or ML based feature pipelines as expert machine learning (ML) models/pipelines tailored for specific ML/AI tasks. In some embodiments, multiple AI and/or ML based feature pipelines may be trained to generate expert ML model-specific video shot features for each shot, where each shot may include a subset of chunks and/or frames of a video stream and/or video file.

In some embodiments, the AI pipeline 100 may include a shot clustering pipeline to cluster a subset of chunks and/or frames into a video shot associated with a particular shot, and classify the shot according to type.

In some embodiments, the AI pipeline 100 may include a face detection feature pipeline. In some embodiments, the face detection feature pipeline may process one or more frames of each shot to detect, using one or more machine learning models, faces of persons appearing in a given shot. For example, the face detection feature pipeline may process up to, e.g., 3 frames of each shot, or up to 2, 4, 5, 6, 7, 8, 9, or more frames per shot. In some embodiments, the one or more frames may be selected based on location within the shot, such as, e.g., first, last, middle, or a predetermined percentage of the duration of the shot, or any combination thereof. In some embodiments, each detected face may then be recognized as a particular person using one or more face recognition machine learning models. As a result, the face detection feature pipeline may output the identity of each person appearing in the video shot.

In some embodiments, the AI pipeline 100 may include a custom pattern feature pipeline. In some embodiments, the custom pattern feature pipeline may process one or more frames of each shot to identify, using one or more image recognition machine learning models, custom patterns, such as, e.g., logos, signs, trademarks, etc. For example, the face detection feature pipeline may process up to, e.g., 3 frames of each shot, or up to 2, 4, 5, 6, 7, 8, 9, or more frames per shot. In some embodiments, the one or more frames may be selected based on location within the shot, such as, e.g., first, last, middle, or a predetermined percentage of the duration of the shot, or any combination thereof. Thus, the custom pattern feature pipeline may output one or more custom patterns features identifying custom patterns appearing in the video shot.

In some embodiments, the AI pipeline 100 may include an image caption feature pipeline. In some embodiments, the image caption feature pipeline may take as input a video shot and output a summary feature including vector matching a description of the picture based on image classification of one or more frames of the video shot using one or more semantic recognition machine learning models.

In some embodiments, the AI pipeline 100 may include a text recognition feature pipeline. In some embodiments, the text recognition feature pipeline may use one or more optical character recognition and/or natural language processing/recognition machine learning models to output text features representing the text in one or more frames of the video shot.

In some embodiments, the AI pipeline 100 may include a diarization and transcription feature pipeline. In some embodiments, the diarization and transcription feature pipeline may use one or more audio processing machine learning models to process the audio associated with the video shot and extract audio features including structural information and speech content through speaker diarization, language identification and speech recognition.

In some embodiments, the AI pipeline 100 may include a summary feature pipeline. In some embodiments, the summary feature pipeline may take as input the audio features from the diarization and transcription feature pipeline, and output summary features based on one or more summary machine learning models trained to summarize transcripts (e.g., using one or more large language models).

In some embodiments, the features output by the AI pipeline 100 may be enhanced to produce enhanced outputs or enhanced features. The enhancement may include, e.g., multimodal boosts that boost confidence scores in the machine learning outputs of one or more feature pipelines based on matching outputs from one or more other feature pipelines. The enhancement may include, e.g., extracting landmarks from the frames of the video shot and/or from the image caption feature, shot descriptions combining one or more outputs into a description for the video shot, among other enhancements or any combination thereof.

In some embodiments, the AI pipeline 100 may perform semantic reconciliation on one or more of the outputs/features. Semantic reconciliation may include matching a feature to a corresponding data entry in a data source that maintains data records for various entities (e.g., persons, companies, custom patterns, etc.). One example of such a data source would be Wikidata, but could include other data sources or any combination thereof. Thus, the semantic reconciliation links the feature(s) to a corresponding data record so as to link additional information and descriptors to relevant video shots for added context.

In some embodiments, the enhanced outputs and/or links to corresponding data entries may be stored in the object storage or other data store. In some embodiments, the data store may include, e.g., a suitable memory or storage solutions for maintaining electronic data representing the activity histories for each account. For example, the data store may include database technology such as, e.g., a centralized or distributed database, cloud storage platform, decentralized system, server or server system, among other storage systems. In some embodiments, the data store may, additionally or alternatively, include one or more data storage devices such as, e.g., a hard drive, solid-state drive, flash drive, or other suitable storage device. In some embodiments, the data store may, additionally or alternatively, include one or more temporary storage devices such as, e.g., a random-access memory, cache, buffer, or other suitable memory device, or any other data store and combinations thereof.

In some embodiments, the AI pipeline 100 and/or one or more feature pipelines and/or engines thereof may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  a. define Neural Network architecture/model,
  b. transfer the input data to the exemplary neural network model,
  c. train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a search engine may then receive a search query from a user, where the search query may include, e.g., text, keywords, image(s), audio, etc. In some embodiments, the search engine may compare the search query to the enhanced outputs and/or data entries for each video shot in the object store. Thus, the search engine may identify a matching video shot within a video and/or live video stream that matches the user's search query based on people, custom patterns, audio content, image content, and/or data entries.

Figure 2A:
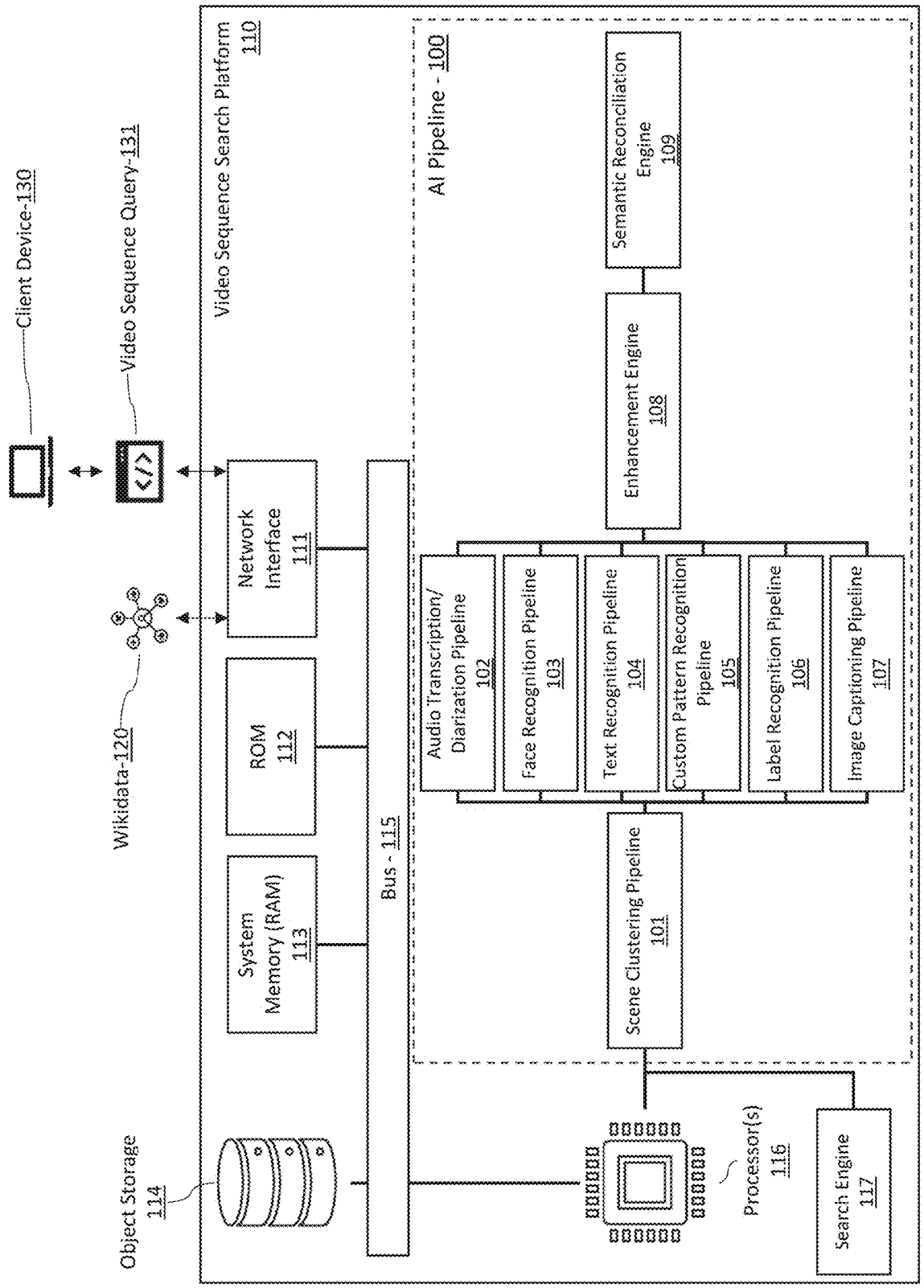
FIGS. 2A and 2B, an architecture for a video shot search platform 110 is depicted including the AI pipeline 100 in accordance with one or more embodiments of the present disclosure.
Figure 2B:
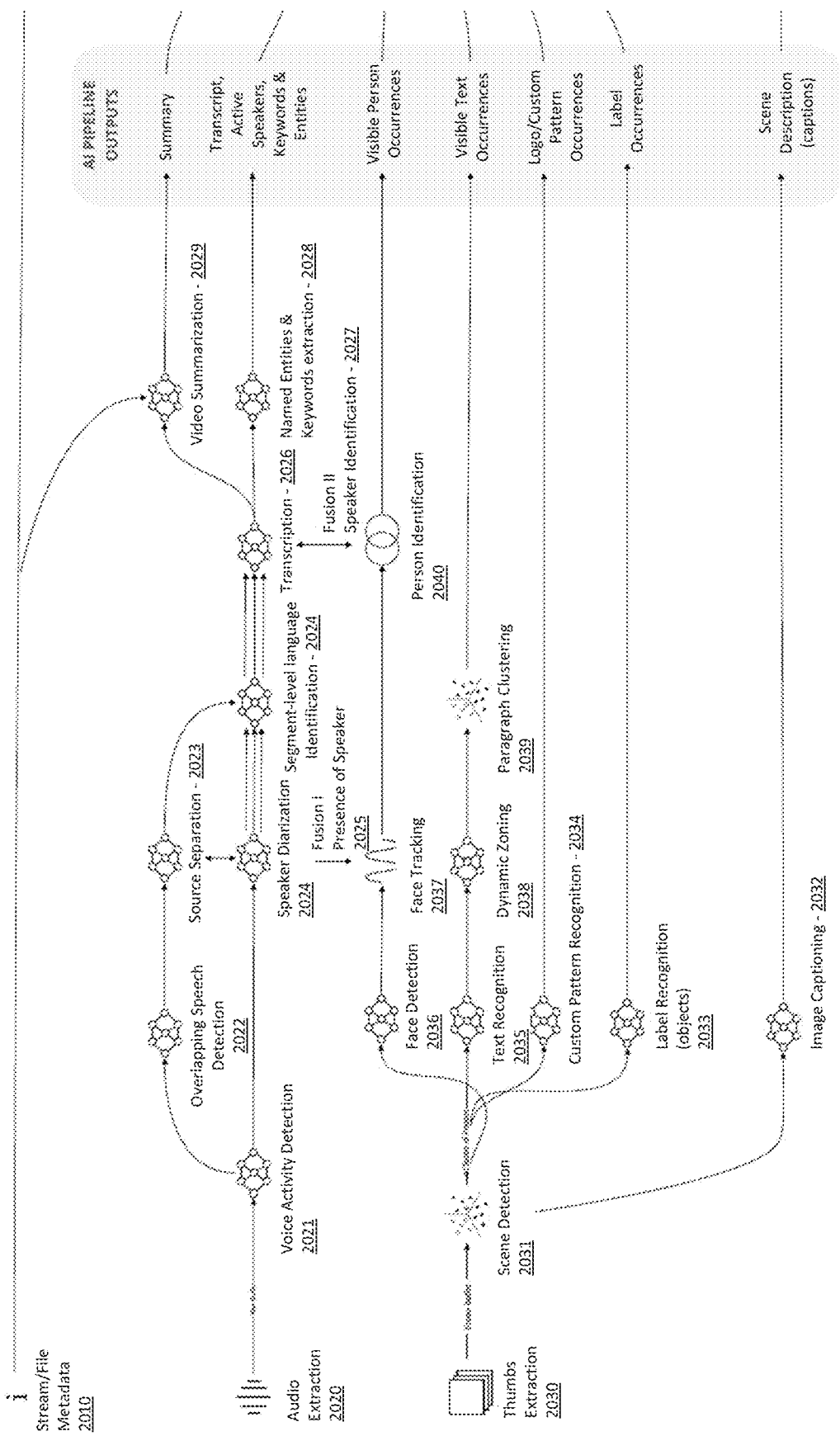
Figure 2B:
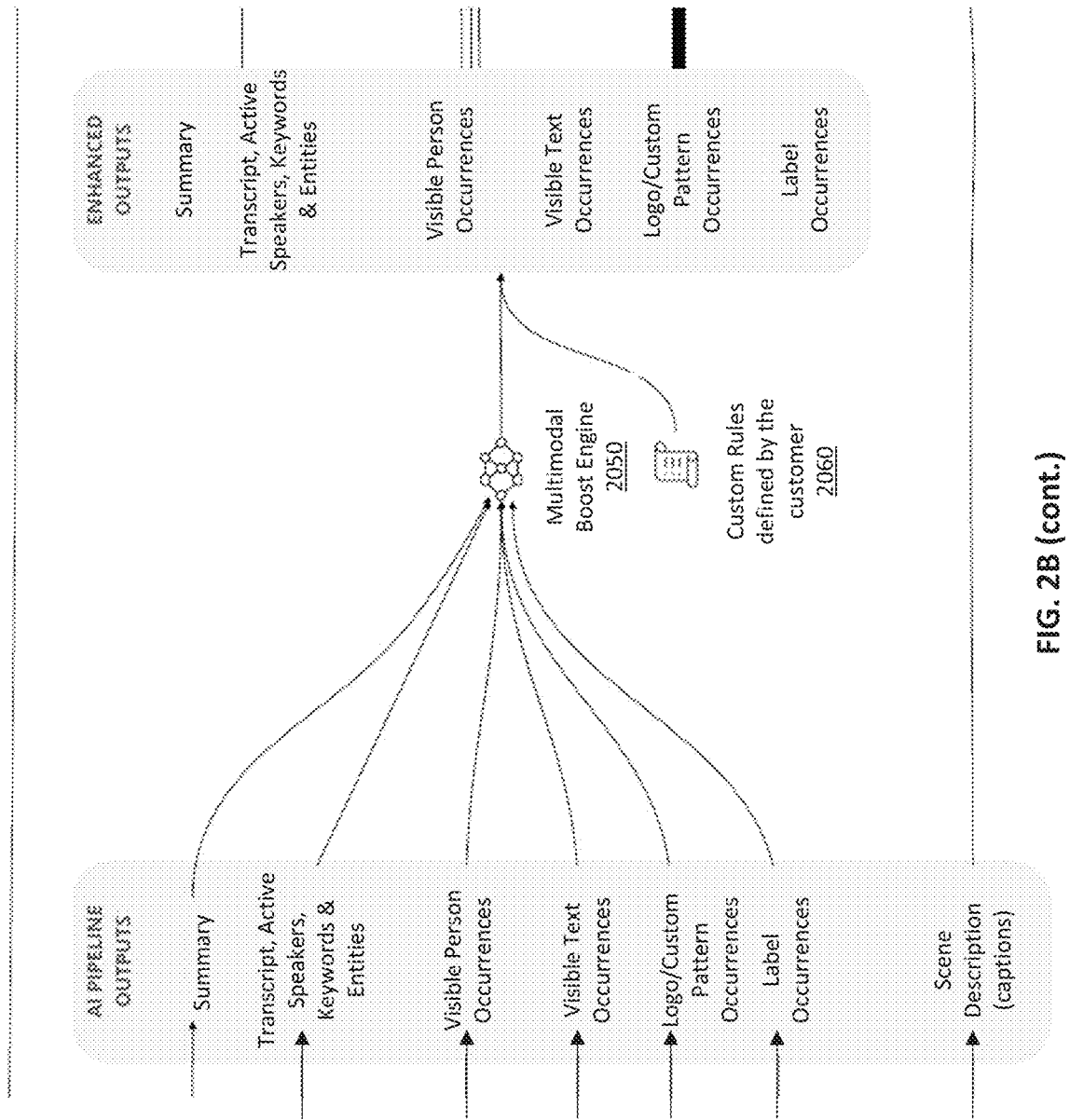
Figure 2B:
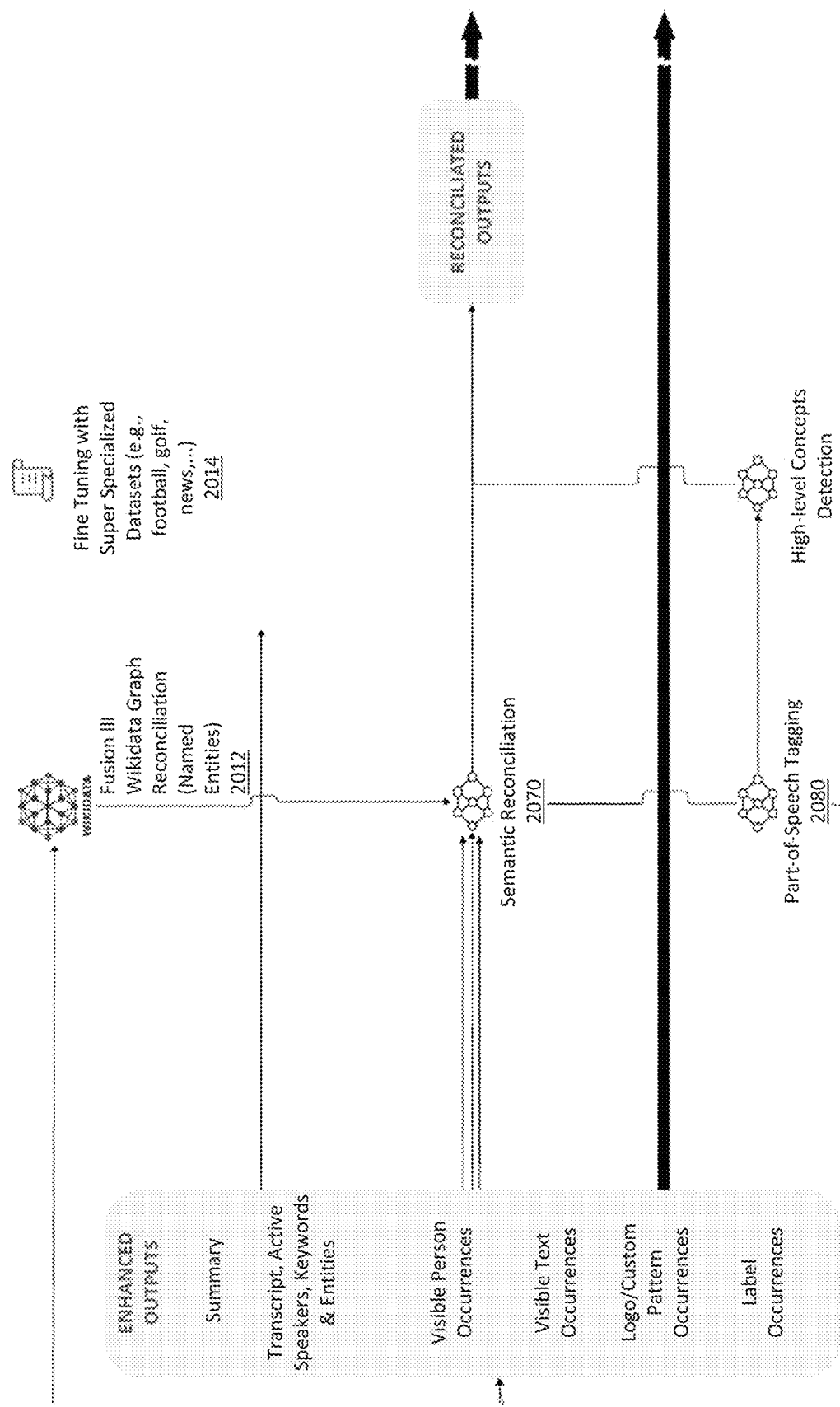

Referring now to FIG. 2A and 2B, an architecture for a video shot search platform 110 is depicted including the AI pipeline 100 is depicted in accordance with one or more embodiments of the present disclosure.

In some embodiments, a video shot search platform 110 may be configured to receive video shot queries 131 and return one or more shots of a live video stream and/or stored video file that is relevant to the video shot search queries 131. Accordingly, the video shot search platform 110 instantiates, e.g., via one or more containers and/or virtual machines, an AI pipeline having feature pipelines including, e.g., a shot clustering pipeline 101, an audio transcription/diarization pipeline 102, a face recognition pipeline 103, a text recognition pipeline 104, a customer pattern recognition pipeline 105, a label recognition pipeline 106 and/or an image captioning pipeline 107, and/or including an enhancement engine 108 to enhance AI pipeline outputs, and a semantic reconciliation engine 109 to reconcile the enhanced outputs with data entries in Wikidata 120.

In some embodiments, the term "container" refers to an entire runtime environment: an application, plus all its dependencies, libraries and other binaries, and configuration files needed to run the application, bundled into one package. By containerizing the application platform and its dependencies, differences in OS distributions and underlying infrastructure are abstracted away.

In some embodiments, the term "virtual machine (VM)" identifies at least one software component and/or a combination of at least one software component and at least one hardware component which are designed/programmed/configured to virtually emulate physical computer systems, such as, e.g., system virtual machines that provide a virtualization of a physical machine, a process virtual machine that is designed to execute computer programs in a virtual environment, or other duplication of real computing systems in a virtual environment.

The AI pipeline may store the enhanced and reconciled outputs in an object storage 114 in associated with a respective video shot of a live stream and/or stored video. In some embodiments, a search engine 117 may be used to search the object storage 114 to access one or more video shots having enhanced and reconciled outputs that match the video search query 131.

In some embodiments, the video shot search platform 110 may include hardware components such as a processor 116, which may include local or remote processing components. In some embodiments, the processor 116 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 116 may include data-processing capacity provided by the microprocessor. In some embodiments, the microprocessor may include memory, processing, interface resources, controllers, and counters. In some embodiments, the microprocessor may also include one or more programs stored in memory. In some embodiments, the video shot search platform 110 may include hardware and software components including, e.g., user client device 130 hardware and software, cloud or server hardware and software, or a combination thereof.

Similarly, the video shot search platform 110 may include object storage 114, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the object storage 114 may include, e.g., a suitable non-transient computer readable medium such as, e.g., random access memory (RAM) 113, read only memory (ROM) 112, one or more buffers and/or caches, among other memory devices or any combination thereof.

In some embodiments, the video shot search platform 110 may implement computer engines, e.g., utilizing one or more computer platforms, containers and/or virtual machines, to instantiate and execute the feature pipelines of the AI pipeline 100. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each feature pipeline of the AI pipeline 100 may include dedicated and/or shared software components, hardware components, or a combination thereof. For example, one or more feature pipelines may include a dedicated processor and storage. In some embodiments, one or more feature pipelines may share hardware resources, including the processor 116 and object storage 114 of the video shot search platform 110 via, e.g., a bus 115.

In some embodiments, video files and/or video streams may be accessed and/or received by the video shot search platform 110. The video shot search platform 110 may then store and index the video streams and/or video files in the object storage 114 for searching. To do so, in some embodiments, the video shot search platform 110 may use the AI pipeline 100 to generate, according to a video indexing storage schema, a semantic markup for each video shot based on the AI pipeline outputs, and index, according to the video indexing storage schema, a searchable video shot object storing the video shot with the semantic markup in the object storage 114.

Chunk Clustering

In some embodiments, the chunk clustering pipeline 101 may convert the input (chunk-based video pivot format, e.g., of live in progress media file) into a table of clustered frames with associated content type. For example, a one video hour file in entry may result in a table of, e.g., 20 chunks of a 2, 3, 4, 5, or more seconds each as an output. In some embodiments, the main challenge is to have an editorial split that is makes sense to users according to the content of the video.

Splitting Content into Shots (Shots)

In some embodiments, the shot clustering pipeline 101 may in a first pass, run a content-aware algorithm to split the content into individual shots for scene detection 2031. This algorithm analyzes each frame of the video (such as thumbnails extracted via thumb extraction 2030) and calculates a score that represents the degree of change between a current frame and a previous frame. If this score exceeds a certain threshold, then a shot change is detected. In some embodiments, the threshold may effect the sensitivity of the algorithm, and can be set on a scale between 0 and 100, or other scale. For example, in some embodiments, the threshold may be set as a value of 30 on the scale of 0 to 100, or other value to tune sensitivity, e.g., depending on the lighting, shot complexity, camera movement, etc. In some embodiments, the threshold may be a universal threshold, or may be customized for shot types. For example, in archive content in black and white, lighting is very different and therefore needs to be adapted, and thus for such shots, the threshold may have a higher value than for other shots. Thus, each shot type may have an associated shot profile that defines the threshold, among other algorithm parameters to customize the algorithm for the content.

In some embodiments, the content-aware algorithm takes into account both visual and audio changes in the video, and it is designed to be more robust than simpler algorithms that only look at changes in brightness or color. It can also be tuned to work well with different types of video content, such as movies, TV shows, or sports broadcasts.

In some embodiments, the content aware algorithm may employ, e.g., an open source library such as Pyscenes Detect, modified to take into account audio changes, which is detailed further below with reference to the audio transcription/diarization pipeline 102.

Classifying Chunks into Editorial Shots

In some embodiments, upon splitting the video into shots, the shot clustering pipeline 101 may identify the type of shot associated with each shot using a shot classifier to produce the detect scenes of scene detection 2031. In some embodiments, the shot classifier may separately detect videos of various types, e.g.: interview, close-up shot, extreme close-up shot, medium shot, wide shot, long shot, panorama shot, aerial shot, slow-motion shot, among others or any combination thereof.

In some embodiments, the shot clustering pipeline 101 may sub-sample multiple frames (e.g., 3, 4, 5, 6, 7, 8, 9, 19 frames or more) at specified locations within the shot duration (e.g., equally distanced locations relative to the duration, prespecified locations, or other locations or any combination thereof).

In some embodiments, the shot clustering pipeline 101 may vectorize each of the sub-sampled frames using a video understanding model (such as BLIP 1, 2), to create vectors, e.g., v1, v2, v3, etc.

In some embodiments, the shot clustering pipeline 101 may compute a new vector that is an average embedding of the previous vectors, e.g., vector "c", thus producing a centroid vector per shot (e.g., c1, c2, c3, etc.). The vector "c" may instead by the median, weighted median, weight average, sum, weighted sum, or other aggregation of the embeddings for any combination thereof.

In some embodiments, the shot clustering pipeline 101 may then use a distance function (e.g., cosine, Euclidean, Jaccard, etc.) to evaluate which vectors associated to each shot (c1, c2, c3) are close to each other according to a distance threshold and/or relative ranking of distances.

In some embodiments, if all C vectors can be grouped into an array of two elements (according specific cosine function thresholds, e.g., less than or equal to 10%), and if, between 1 and 3 faces are identified in this vector (or associated frame, using the same approach than the one describe in face detection) the shot may be labelled as an interview. In some embodiments, then each shot in the associated video may be deemed the same interview, and shots may be formed by splitting according to audio diarization produced by the audio transcription/diarization pipeline 102 detailed below (e.g., one question and one answer is one shot and so on).

Interview: In some embodiments, the shot clustering pipeline 101 may take a shot similarity approach to identify angle/reverse angle interviews.

a. In some embodiments, the shot clustering pipeline 101 may sub-sample multiple frames (e.g., 3, 4, 5, 6, 7, 8, 9, 19 frames or more) at specified locations within the shot duration (e.g., equally distanced locations relative to the duration, prespecified locations, or other locations or any combination thereof).

b. In some embodiments, the shot clustering pipeline 101 may vectorize each of the sub-sampled frames using a video understanding model (such as BLIP 1, 2), to create vectors, e.g., v1, v2, v3, etc.

c. In some embodiments, the shot clustering pipeline 101 may compute a new vector that is an average embedding of the previous vectors, e.g., vector "c", thus producing a centroid vector per shot (e.g., c1, c2, c3, etc.). The vector "c" may instead by the median, weighted median, weight average, sum, weighted sum, or other aggregation of the embeddings for any combination thereof.

d. In some embodiments, the shot clustering pipeline 101 may then use a distance function (e.g., cosine, Euclidean, Jaccard, etc.) to evaluate which vectors associated to each shot (c1, c2, c3) are close to each other according to a distance threshold and/or relative ranking of distances.

e. In some embodiments, if all C vectors can be grouped into an array of two elements (according specific cosine function thresholds, e.g., less than or equal to 10%), and if, between 1 and 3 faces are identified in this vector (or associated frame, using the same approach than the one describe in face detection) the shot may be labelled as an interview. In some embodiments, then each shot in the associated video may be deemed the same interview, and shots may be formed by splitting according to audio diarization produced by the audio transcription/diarization pipeline 102 detailed below (e.g., one question and one answer is one shot and so on).

Slow Motion shots: In some embodiments, the shot clustering pipeline 101 may use a classifier, such as, e.g., an SVM, neural network, decisions trees, random forest, or other classifier, to classify a shot as a slow-motion shot.

Deep Neural Network (DNN) Approach: In some embodiments, the shot clustering pipeline 101 may use approved data from users to create a dataset that can be used to train a DNN such as ResNet-50 or other DNN or any combination thereof, to automatically classify a shot according to one or more potential shot types. In some embodiments, the DNN may be trained on historical videos of various known shot types, e.g., as training pairs of shots with associated known shot types. In some embodiments, the DNN may be trained using an optimization algorithm such as, e.g., Hinge Loss, Multi-class SVM Loss, Cross Entropy Loss, Negative Log Likelihood, or other suitable loss function to determine the error of the predicted shot type based on the known shot type.

In some embodiments, under the DNN approach, the shot classification may include receiving a video stream made up of a series of frames and an audio stream.

In some embodiments, for each frame or a plurality of frames within the series of frames of the video stream, the DNN approach may use a content aware algorithm to receive as input a current frame, a previous frame and audio from the audio stream associated with the current frame and the previous frame, and output a score indicative of a degree of a predicted shot type.

In some embodiments, for each frame or a plurality of frames within the series of frames of the video stream, the DNN approach may apply the audio diarization pipeline 102 to identify speaker turns.

In some embodiments, under the DNN approach, the shot classification may utilize a DNN shot classifier to determine the predicted shot type associated with each shot, the shot type including one or more of interview, close-up shot, extreme close-up shot, medium shot, wide shot, long shot, panorama shot, aerial shot, slow-motion shot, among others or any combination thereof. In some embodiments, the DNN shot classifier may also attach the motion of the camera to each shot (either static or in motion). In some embodiments, the DNN shot classifier may include using a neural network trained to classify shot type based on the subset of frames of each shot.

In some embodiments, the DNN shot classifier may be a multi-label classify that predicts a shot type label indicative of any one or more of interview, close-up shot, extreme close-up shot, medium shot, wide shot, long shot, panorama shot, aerial shot, slow-motion shot, etc. shot types. In some embodiments, the DNN shot classifier may be a set of single-label classifiers, where each single-label classifier predicts whether to apply a corresponding label of a corresponding shot type. In some embodiments, the DNN shot classifier may be a combination of multi-label and single-label classifiers.

In some embodiments, the DNN approach may include a slow motion shot classifier configured, for each shot in the video stream, to utilize a classifier, such as, e.g., a neural network, a support vector machine (SVM), decision trees, a random forest, etc., to determine whether each shot contains a slow motion shot based at least in part on the subset of frames of each shot. In some embodiments, the slow motion shot classifier may use attributes of the shot, such as, e.g., shot duration and frame luminance and/or chrominance, to determine whether the shot is a slow motion shot. See, for example, Vahid Kiani, Hamid Reza Pourreza, "An Effective Slow-Motion Detection Approach for Compressed Soccer Videos", *International Scholarly Research Notices*, vol. 2012, Article ID 959508, 8 pages, 2012. https://doi.org/10.502/2012/959808, which is incorporated herein by reference in its entirety.

In some embodiments, upon splitting and classifying the shots, the shot clustering pipeline 101 may index, according to a video indexing storage schema, a searchable video shot object storing the video shot with the shots types.

Once all shots are classified and transformed to sequences, the shots are stored in a persistent storage (Database or JSON file along with the chunk manifest) and an event is generated for use by other local and/or remote systems.

Feature Pipelines

In some embodiments, the goal of the audio transcription/diarization pipeline 102 is to perform audio extraction 2020 to extract audio and extract relevant information from "in the wild" audios, including via voice activity detection 2021, overlapping speech detection 2022, source separation 2023, speaker diarization 2024, segment-level language identification 2024, transcription 2026, video summarization 2029 and/or named entities and keywords extraction 2028. The audio may be studio-quality setups or very noisy street interviews. In some embodiments, the audio transcription/diarization pipeline 102 may extract both structural information and speech content through speaker diarization 2024, language identification 2024 and speech recognition/transcription 2026.

Part 1. Retrieving Audio Structure

In some embodiments, for any video file, the audio transcription/diarization pipeline 102 may extract its audio and run speaker diarization 2024 to identify the number of speakers, and to separate the part spoken by each speaker. The audio transcription/diarization pipeline 102 may use an online diarization algorithm based on pyannote 2.0 and described J. M. Coria, H. Bredin, S. Ghannay, et S. Rosset, «Overlap-Aware Low-Latency Online Speaker Diarization Based on End-to-End Local Segmentation», 2021 IEEE Autom. Speech Recognit. Underst. Work. ASRU 2021, which is herein incorporated by reference in its entirety.

In some embodiments, the algorithm runs through the file (or the livestream) by reading chunks of audio (e.g., 0.1 sec, 0.2 sec, 0.3 sec, 0.4 sec, 0.5 sec, 0.6 sec, 0.7 sec, 0.8 sec, 0.9 sec, 1.0 sec other length chunks) on the associated chunked pivot file format (stored full or growing). For each chunk the audio transcription/diarization pipeline 102 detects the presence of voices and each time it detects a speaker change, it creates a new speech segment. For each segment a speaker identifier (e.g., a name, unique code, personal identification number (PIN), etc.) is added so the audio transcription/diarization pipeline 102 can track everything a person said.

In some embodiments, the audio transcription/diarization pipeline 102 may also take into account overlapping speech 2022 to determine when two or more speakers are talking on top of each other (which is very frequent in political debates) and if possible the audio transcription/diarization pipeline 102 may consider using source separation 2023 methods to extract and analyze separately both voices.

Part 2. Transcribing

In some embodiments, each time a new speech segment is created, if the language of the media has not been chosen by the user, the audio transcription/diarization pipeline 102 may run a language identification 2024 pipeline that uses the first seconds of the segment to detect in which language the audio transcription/diarization pipeline 102 may run the speech recognition. In some embodiments, the language identification pipeline may be based on a speech recognition machine learning model such as, e.g., the whisper2 model of A. Radford, J. W. Kim, T. Xu, G. Brockman, C. McLeavey, et I. Sutskever, «Robust Speech Recognition via Large-Scale Weak Supervision», 2022., which is incorporated herein by reference in its entirety.

In some embodiments, once the language is either chosen or identified, the audio transcription/diarization pipeline 102 may run speech recognition to determine what has been said. The audio transcription/diarization pipeline 102 may handle this by using both external speech-to-text providers and in-house finetuned models. The objective is to give as much flexibility and interoperability as possible for the user to use the model that suits him the most.

In some embodiments, Part 2 is designed so the segments can be processed in parallel, on CPU, GPU, neural processing unit (NPU) or other processing device or any combination thereof, enabling both energy efficiency and low-latency result appearance.

Part 3. Extracting Useful Editorial Concepts

In some embodiments, the audio transcription/diarization pipeline 102 may leverage the diarization 2024 and speech recognition/transcription 2026 to determine the complete structure and content of the audio of the media. To do so, the audio transcription/diarization pipeline 102 may determine precisely "who said what and when?". Once the audio transcription/diarization pipeline 102 has finished running on the entire media, the audio transcription/diarization pipeline 102 may extract several items of information that are relevant for an editorial use of the media and to make it properly searchable:

a. Automatic subtitles that follow broadcaster and/or third-party guidelines.
b. Transcript summary 2029: For this the audio transcription/diarization pipeline 102 may be a finetuned a T5 large language model (e.g., as per C. Raffel et al., «Exploring the limits of transfer learning with a unified text-to-text transformer», J. Mach. Learn. Res. 2020., which is incorporated herein by reference in its entirety) on thousands of ground truth summaries written by users.

c. Keywords and Topics 2028: For this the audio transcription/diarization pipeline 102 may use classification and clustering tools such as BERTopic, e.g., as per M. Grootendorst, «BERTopic: Neural topic modeling with a class-based TF-IDF procedure», 2022., which is incorporated by reference herein in its entirety.

In some embodiments, the goal of the face recognition pipeline 103 may be to take a shot as an input and apply face detection 2036 to output an array of detected persons with their associated given confidence. Accordingly, the face recognition pipeline 103 may use the chunk-based video format and extract frames between each timecode. In some embodiments, some or all frames may be either written locally or stored in memory depending on the size of the shot to minimize processing time.

In some embodiments, the face recognition pipeline 103 may, on each frame, use a deep learning-based object detection model that can detect faces (such as the implementation RetinaNet). Each face may be stored in array of bounding boxes. In some embodiments, these bounding boxes may then be tracked on each picture to track a particular face across frames for face tracking 2037 and reconcile the number of unique people in the scene. Face tracking 2037 may leverage speaker diarization 2024 by fusion to determine the presence of a speaker 2025 in the scene.

In some embodiments, by tracking the bounding box of a face, the face recognition pipeline 103 may choose the best picture (based on, e.g., brightness, sharpness, size and confidence of detection).

In some embodiments, the face recognition pipeline 103 may isolate face vectors for this feature and compare these vectors against a graph database (e.g., using a k-Nearest Neighbors approach) and compute the nearest vectors for person identification 2040. The nearest vector(s) may provide the name of the person and/or an identifier (e.g., an internal database ID, a Wikidata ID, or other identifier or any combination thereof). In some embodiments, the identifiers may facilitate disambiguating someone that would have the same name.

In some embodiments, the face recognition pipeline 103 may also detect the potential active speaker via fusion II-speaker identification 2027 using the transcription 2026, for further usage in the pipeline (data fusion with diarization), by looking at lips movements and audio features through multimodal transformers, such as those detailed in R. Tao, Z. Pan, R. K. Das, X. Qian, M. Z. Shou, et H. Li, Is Someone Speaking?, vol. 1, no 1. Association for Computing Machinery, 2021., which is incorporated herein by reference in its entirety.

In some embodiments, once the face recognition pipeline 103 generates all results, the face recognition pipeline 103 may keep each detected person and the associated confidence on a persistent storage, and generate an event. In some embodiments, results can be seen in the web browser and the module is starting with another shot.

In some embodiments, the text recognition pipeline 104 may detect text in frames of the video to facilitate various processes and to make the video shots searchable. To do so, in some embodiments, the text recognition pipeline 104 may employ text recognition 2035, e.g., using optical character recognition (OCR). In some embodiments, however, the text recognition pipeline 104 may face several challenges, such as, e.g., variety of fonts and alphabets, and having to perform OCR over video, where text can move and be partially visible. In some embodiments, the text recognition pipeline 104 may be configured as a lightweight processing pipeline where detection and recognition are separated. A detection analysis may be performed first, if no text or recognizable object (person, logo, etc.) is detected, then no recognition processing is initiated, thus saving time, processing resources, energy, etc.

In some embodiments, to address the challenges, the text recognition pipeline 104 may employ OCR over video. To do so, the text recognition pipeline 104 may receive the message that a new shot is available, and extract all frames from the chunk pivot format. In some embodiments, the text recognition pipeline 104 may extract text on each frame, and reconcile the extracted text. In some embodiments, the reconciliation may be done by calculating the similarity of all the extracted text, every second, without taking into account the bounding boxes. This allows for groups, where, for each group, the text recognition pipeline 104 may keep the text with the greatest confidence within the group. In some embodiments, the text recognition pipeline 104 may clean the text using an NLP pass. In some embodiments, the OCR may be based on Easy OCR that is supporting Latin and Arabic characters. In some embodiments, at the end of the shot, the text recognition pipeline 104 are keeping results on a persistent storage with detected text and their associated timecodes.

In some embodiments, for recognition of text in larger blocks of text, the block can be identified and recognized via dynamic zoning 2038 and paragraph clustering 2039. Dynamic zoning 2038 may dynamically identify text located in specific areas(zones) on a document or an image to extract zonally. Thus, dynamic zoning 2038 may identify groupings of text in detected areas within the image, and extract the text corresponding to the area.

Paragraph clustering 2039 may cluster recognized text into the paragraphs in which they belong, e.g., where text appears in a paragraph form, the paragraph clustering 2039 may assess the text and maintain the paragraph structure. To do so, the paragraph cluster 2039 may make use of word embeddings for the detected text and determine similarity, thus grouping text into a paragraph based on the word embeddings, e.g., based on semantic similarity, agglomerative clustering, Brown clustering, etc. Alternatively or in addition, multiple paragraphs may be clustered by vectoring each paragraph and grouping paragraphs based on, e.g., similarity of the vectors.

In some embodiments, the custom pattern recognition pipeline 105/2034 may be used to detect custom patterns (brand logos, signs, traffic signals, trademarks, etc.) on video. The custom pattern recognition pipeline 105 may receive the message that a new shot is available. The custom pattern recognition pipeline 105 may extract all frames from the chunk pivot format. The custom pattern recognition pipeline 105 may detect all custom patterns in the dedicated customer dataset (The custom pattern recognition pipeline 105 may be trained on a dedicated custom pattern dataset for each customer, with an assigned identifier and/or Wikidata identifier to ensure semantic reconciliation) on the frames. In some embodiments, the custom pattern recognition pipeline 105 may be configured as a lightweight processing pipeline where detection and recognition are separated. A detection analysis may be performed first, if no custom pattern is detected, then no recognition processing is initiated, thus saving time, processing resources, energy, etc. In some embodiments, each occurrence is then saved and kept in a persistent storage for further usage (index in the search engine, notification, media logging)

In some embodiments, the label recognition pipeline 106 may be used to detect labels on video via label (object) recognition 2033. The label recognition pipeline 106 may receive the message that a new shot is available. The label recognition pipeline 106 may extract all frames from the chunk pivot format. The label recognition pipeline 106 may detect all labels in the dedicated customer dataset. In some embodiments, to detect the labels, the label recognition pipeline 106 may include one or more machine learning models trained on a dedicated label dataset for each user, with an assigned identifier and/or Wikidata identifier to ensure semantic reconciliation. In some embodiments, the labels may include, e.g., every day items to concepts or actions: football, sports venue, tie, microphone, public speech, military, official, interview, face hair, beard, body of water, grass field, athlete(s), electronic device, blue/red/yellow/black/green/other colors, tackle, display device/screen, footwear, hard hat, vehicle, book, among others relevant to a user-specific dataset or across all datasets, or any combination thereof.

In some embodiments, the label recognition pipeline 106 may be configured as a lightweight processing pipeline where detection and recognition are separated. A detection analysis may be performed first, if no label is detected, then no recognition processing is initiated, thus saving time, processing resources, energy, etc. In some embodiments, each occurrence is then saved and kept in a persistent storage for further usage (index in the search engine, notification, media logging)

In some embodiments, the image captioning pipeline 107 may take as an input a shot and output a vector matching a description of the picture to perform image captioning 2032. In some embodiments, the image captioning pipeline 107 may receive the message that a new shot is available. In some embodiments, the image captioning pipeline 107 may extract multiple frames (e.g., 2, 3, 4, 5, 6, 7, 8, 9, 10, etc.) at predetermined intervals (e.g., equally spaced relative to shot duration, at predefined locations, or other intervals or any combination thereof) throughout the video shot, such as, e.g., three frames from the shot at 25%/50%/75% of the shot duration. In some embodiments, the image captioning pipeline 107 vectorize each frame using a video understanding model (such a BLIP) and compute an average vector. In some embodiments, the vector may then be kept on a persistent storage for the next phase along with the shot type.

Shot Enhancement

In some embodiments, the enhancement engine 108 may perform data fusion between all modalities, to either re-compute confidence of existing modalities or apply new indexing entities. Thus, the enhancement engine 108 may employ multimodal boosts and/or multimodal rules.

Shot Enhancement-Multimodal Boosts

In some embodiments, the enhancement engine 108 may include a multimodal boost engine 2050. Multimodal boosts use one or more modalities to re-compute confidence of a particular modality. For example, the enhancement engine 108 may apply multimodal boosts from pre-existing metadata to person, objects. In some embodiments, if the title of a media file includes an exact match of the entity (person last name or full name, entity name e.g., logo), the confidence is boosted, e.g., by 10%, 15%, 20%, 25%, 30%, 35%, 40% or other suitable boost. In some embodiments, if the metadata of the content is including an exact match of the entity (person last name or full name or object name), the confidence is boosted, e.g., by 10%, 15%, 20%, 25%, 30%, 35%, 40% or other suitable boost. In some embodiments, boost for an exact match of a title may be greater than a boost for the exact match of the metadata.

In some embodiments, multimodal boosts may boost based on transcription to boost a person, objects. In some embodiments, if someone is saying the name of the entity, the enhancement engine 108 may boost confidence, e.g., by 10%, 15%, 20%, 25%, 30%, 35%, 40% or other suitable boost. In some embodiments, to do so the enhancement engine 108 may use a regular expression to match the name (last name of full name/entity name) on each transcript segment.

In some embodiments, multimodal boosts may boost based on recognized text to boost person, objects. In some embodiments, if the name of the person is written in a shot, the enhancement engine 108 may boost confidence, e.g., by 10%, 15%, 20%, 25%, 30%, 35%, 40% or other suitable boost. To do so the enhancement engine 108 may use a regular expression to match the entity name (person last name of full name, object) on detected text per shot that previously been sanitized. The enhancement engine 108 may apply a sanitization algorithm (removing stop words, non alphanumeric characters) to improve matching.

In some embodiments, multimodal boosts may boost based on topicality. In some embodiments, each person that exists in the object storage 114 has a Wikidata entity that is associated with therewith. If the topicality of the shot is matching the topicality of the person, then confidence is boosted, e.g., by 10%, 15%, 20%, 25%, 30%, 35%, 40% or other suitable boost. In some embodiments, the topicality boost is determined and applied by computing topicality based on model inspired by Stanford Core Tools NLP. The output is a string matching the possible value of the Wikidata property P106 (Occupation) or other Wikidata property or any combination thereof. In some embodiments, for each person detected on the shot, the enhancement engine 108 may query the Wikidata graph and checking if the property P106 is matching the topicality of the shot.

In some embodiments, multimodal boosts may boost based on other properties from the Wikidata graph to improve confidence further.

Thus, in some embodiments, for a particular shot of a video stream, the enhancement engine 108 may obtain artificial intelligence (AI) pipeline outputs from an AI pipeline, including:
  a. recognized face labels and associated facial recognition confidence scores, from a facial recognition model (e.g., as detailed above), identifying recognized persons in the particular shot,
  b. text detection and identification labels and associated text recognition confidence scores, from a text detection model (e.g., as detailed above), representing text-containing objects in the particular shot,
  c. image captions and associated image caption confidence scores, from an image captioning model (e.g., as detailed above), of image-containing objects in the particular shot,
  d. custom pattern labels and associated custom pattern label confidence scores, from a visual pattern recognition model (e.g., as detailed above), identifying custom pattern-containing objects in the particular shot, e. a transcription, from a natural language processing (NLP) model (e.g., as detailed above), of speech in the particular shot, and f. concept labels and associated concept label confidence scores, from the NLP model (e.g., as detailed above), representing concepts in the transcription.

For at least one facial recognition confidence score of the facial recognition confidence scores, the enhancement engine 108 may determine a match between at least one respective recognized face label and at least one of: the detected text, an image caption of the image captions, a custom pattern label of the custom pattern labels, or a concept label of the concept labels. In some embodiments, based on a presence of the match, the enhancement engine 108 may add a facial recognition confidence boost to at least one facial recognition confidence score, the facial recognition confidence boost being a predefined increase at least one facial recognition confidence score.

the enhancement engine 108 may apply the at least one respective recognized face label to the video shot to identify the associated person in the video shot where the at least one facial recognition confidence score with the facial recognition confidence boost exceeds a facial recognition threshold.

For at least one text recognition confidence score, the enhancement engine 108 may determine a match between at least one respective recognized text and at least one of: the recognized face labels, an image caption of the image captions, a custom pattern label of the custom pattern labels, or a concept label of the concept labels. In some embodiments, based on a presence of the match, the enhancement engine 108 may add a text recognition confidence boost to at least one text recognition confidence score, the text recognition confidence boost being a predefined increase at least one text recognition confidence score.

In some embodiments, based on a presence of the match, the enhancement engine 108 may apply the at least one respective recognized text label to the video shot to identify the associated text in the video shot where the at least one text recognition confidence score with the text recognition confidence boost exceeds a text recognition threshold.

For at least one image caption confidence score, the enhancement engine 108 may determine a match between at least one respective image caption and at least one of: the recognized face labels, a recognized text, a custom pattern label of the custom pattern labels, or a concept label of the concept labels. In some embodiments, based on a presence of the match, the enhancement engine 108 may add an image caption confidence boost to at least one image caption confidence score, the image caption confidence boost being a predefined increase at least one image caption confidence score.

In some embodiments, the enhancement engine 108 may apply the at least one respective image caption label to the video shot to identify the associated text in the video shot where the at least one image caption confidence score with the image caption confidence boost exceeds an image caption threshold.

For at least one custom pattern label confidence score, the enhancement engine 108 may determine a match between at least one respective custom pattern label and at least one of: the recognized face labels, a recognized text, an image caption, or a concept label of the concept labels. In some embodiments, based on a presence of the match, the enhancement engine 108 may add a custom pattern label confidence boost to at least one custom pattern label confidence score, the custom pattern label confidence boost being a predefined increase at least one custom pattern label confidence score.

In some embodiments, the enhancement engine 108 may apply the at least one respective custom pattern label to the video shot to identify the associated text in the video shot where the at least one custom pattern label confidence score with the custom pattern label confidence boost exceeds a custom pattern label threshold.

For at least one custom label confidence score, the enhancement engine 108 may determine a match between at least one respective custom label t and at least one of: the recognized face labels, a recognized text, a custom label, or a custom pattern label of the custom pattern labels. In some embodiments, based on a presence of the match, the enhancement engine 108 may add a custom label confidence boost to at least one custom label confidence score, the custom label confidence boost being a predefined increase at least one custom label confidence score.

In some embodiments, the enhancement engine 108 may apply the at least one respective custom label to the video shot to identify the associated text in the video shot where the at least one custom label confidence score with the custom label confidence boost exceeds a custom label threshold.

In some embodiments, the multimodal boost is determined for every feature pipeline output based on matches to outputs from any one or more of the other feature pipelines. In some embodiments, the multimodal boosts are cumulative, so a boost is applied for every modality to which a given feature matches.

In some embodiments, the confidences scores for each modality may be used to determine matches in search, e.g., by weighting results in a ranking according to the confidence of the labels matching the search query. In some embodiments, the thresholds for recognition for each modality may be, e.g., 60%, 65%, 70%, 75%, 80%, 85%, 90%, 95%, or other threshold. The threshold may be the same for all modalities or different, e.g., each modality having a modality-specific threshold value. In some embodiments, a user and/or administrator may manually configured the thresholds.

In some embodiments, the enhancement engine 108 may apply enhancements based on one or more custom rules 2060 defined by the customer or by any other suitable user or entity or any combination thereof. The custom rules may include thresholds, boost values for confidence scores, among others or any combination thereof.

In some embodiments, the enhancement engine 108 may apply generate, according to a video indexing storage schema, a semantic markup for the video shot based on the at least one respective recognized face label and the AI pipeline outputs.

In some embodiments, the enhancement engine 108 may index, according to the video indexing storage schema, a searchable video shot object storing the video shot with the semantic markup.

Shot Enhancement—Multimodal Rules

In some embodiments, the enhancement engine 108 may implement multimodal rules. In some embodiments, the multimodal rules may include a set of rules 2060 set by a user to force semantic inference of entities that were not picked up properly by the AI Feature Pipeline (see, for example, FIGS. 12A and 12B as detailed below). In some embodiments, every time the system sees an exact match or a close match (e.g., using a distance measure such as cosine distance, Euclidean distance, Jaccard distance, Levenshtein distance, etc.), the system may add the occurrence of this entity on the shot.

Shot Enhancement—Extracting Landmarks

Figure 26:
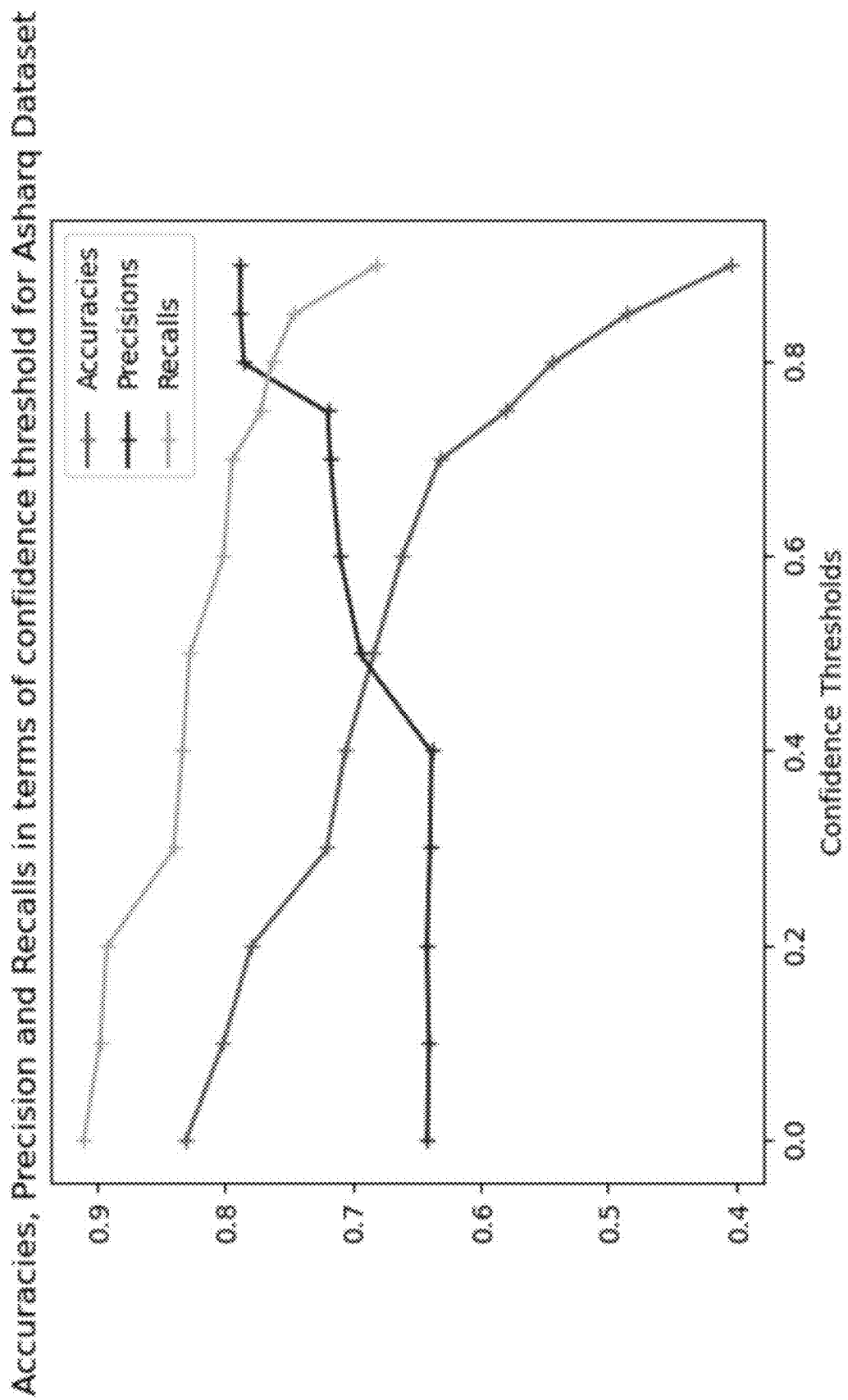
FIG. 26 illustrates a plot of performance in landmark detection of the landmark detection framework for a second data set in accordance with one or more embodiments of the present disclosure.
Figure 27:
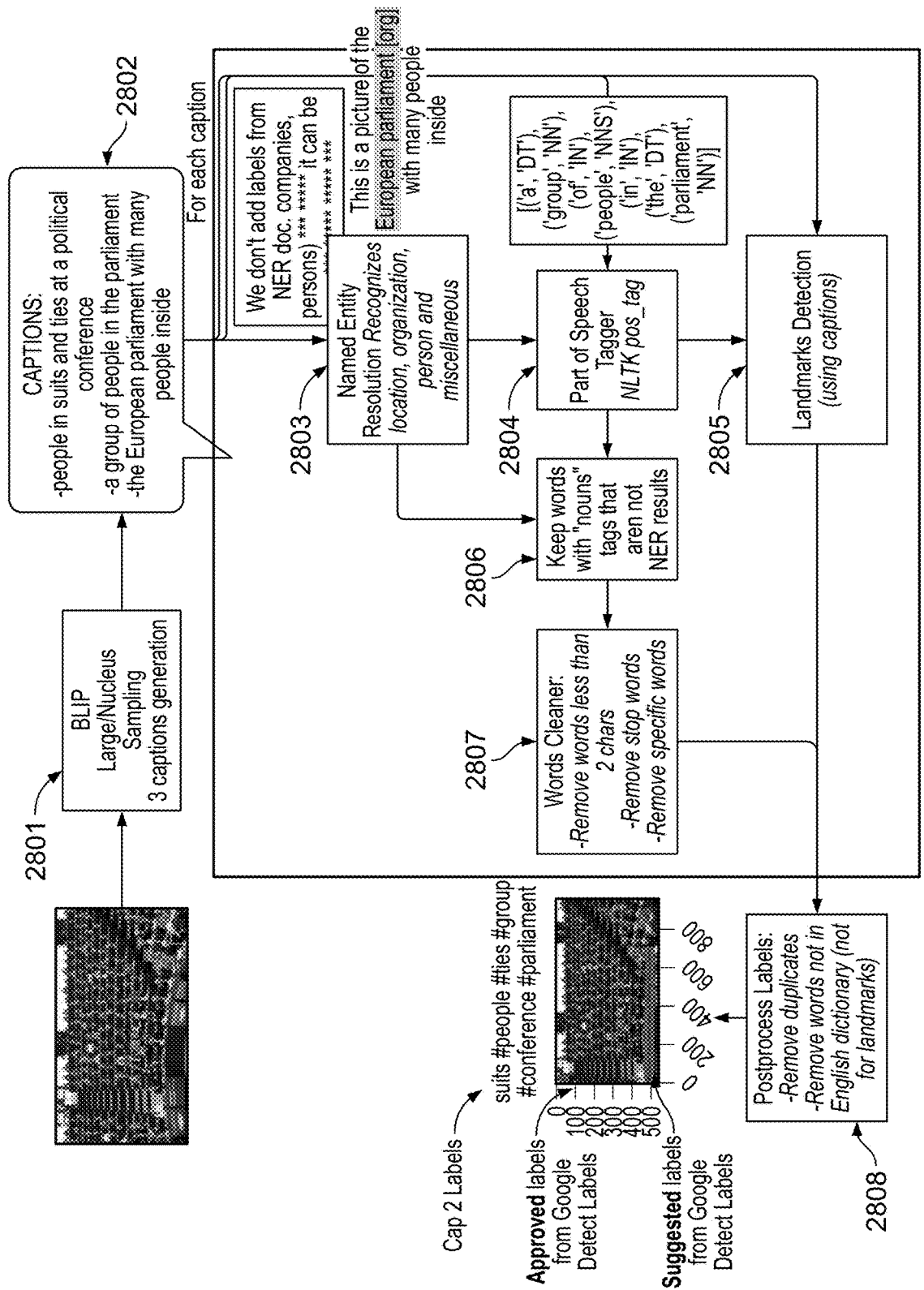
FIG. 27 depicts another flowchart of a landmark detection framework in accordance with one or more embodiments of the present disclosure.

In some embodiments, the enhancement engine 108 may use the image caption vector to output landmarks in the form of text and/or the landmark Wikidata identifier, e.g., according to the framework illustrated in FIG. 27 as detailed below. In some embodiments, generating several text description and performing POS Tagging enable isolating named entities of landmark, and thus the enhancement engine 108 may either match these named entities against an internal list or, in the case of no match but the enhancement engine 108 match a "landscape" a "building" or some "architecture", the enhancement engine 108 may call a third party dataset (such as Google Vision Landmark) to detect the landmark and save it on our list for further usage. (see, e.g., FIGS. 13-30 as detailed below). In some embodiments, this process may also be used to extract keywords and reconcile the keywords with an associated Wikidata entity (to ensure proper match and potential translation in other languages, especially in Arabic).

Shot Enhancement—Shot Description

In some embodiments, the enhancement engine 108 may generate a shot description to describe best the shot. In some embodiments, the enhancement engine 108 may take as an input the following: vector coming from the captioning, type of shot coming from the shot classifier, and enhanced and boosted Person detection from Multimodal Boosts or Multimodal Rules. In some embodiments, the goal is to generate an output including a semantic text description that is best describing the shot, just as a user would do. In some embodiments, logic may be as follow:

The enhancement engine 108 may first detect and collect every person of interest: the enhancement engine 108 may take each bounding boxes of faces that where its area covers more than 20% of the area of the picture.

The enhancement engine 108 may use the type of shot and collect the face name to prompt the model and transform the vector.

In some embodiments, the enhancement engine 108 may, for a particular shot of a video stream, obtain the AI pipeline outputs from an AI pipeline, including:
a. a shot caption vector, from a video understanding model, of a semantic concept associated with the particular shot, where the video understanding model is configured to produce frame vectors by vectorizing a subset of frames of the particular shot and average the frame vectors to produce an average vector representing the shot caption,
b. recognized face labels and associated facial recognition confidence scores, from a facial recognition model, identifying recognized persons in the particular shot,
c. a shot type classification, from a shot classifier, identifying a type of shot looking at the type of shot and other pipeline output. For example, the shot type classification may include an interview classification where the similarity metric between each shot is within a predetermined threshold value, and a maximum number of recognized face labels are associated with each shot (e.g., consistent faces are regularly (re)detected on the next shots).

In some embodiments, the enhancement engine 108 may generate a semantic markup describing the particular shot based on the recognized face labels, the shot caption and the shot type classification. In some embodiments, the enhancement engine 108 may generate the semantic markup by:
a. generating a person descriptor for the recognized face labels, the person descriptor being a natural language descriptor representative of the recognized face labels;
b. generating a person vector for the recognized face labels, the person vector being a vector form of the recognized face labels;
c. generating shot type descriptor for the shot type classification, the shot type descriptor being a natural language descriptor representative of the shot type classification;
d. generating a shot type vector for the shot type classification, the shot type vector being a vector form of the shot type classification, where, in some embodiments, the transformation happens through an encoder/decoder system that can map both image and text to a common vector subspace;
e. converting the shot caption vector to text, e.g., using a decoder model trained to go from vector subspace to text; and
f. embedding the person descriptor with the person vector and the shot type descriptor with the shot type vector in a shot description include the shot caption, where embedding the person descriptor with the person vector tags the shot description with the associated recognized face labels for clickable linking to other data including the recognized face labels, and embedding the shot type descriptor with the shot type vector tags the shot description with the associated shot type classification for clickable linking to other data including the shot type classification.

In some embodiments, the enhancement engine 108 may index, according to the video indexing storage schema, a searchable video shot object storing the video shot with the semantic markup. In some embodiments, the semantic markup applied to a shot description may be interpreted upon index of the shot description. In some embodiments, the processing of the semantic markup may include, e.g., retrieving associated data such as, e.g., aliases, synonyms, descriptions, etc. and adding the associated data to the indexed document of the searchable video shot object, e.g., as an array or other suitable data structure. In some embodiments, the enhancement engine 108 may apply an automated translation engine to translate data from one language to another, e.g., to store the data in multiple languages in one or more arrays or other suitable data structures. In some embodiments, the markup may then be sanitized and the associate value may be stored in the search index with the searchable video shot object.

An example of the semantic markup for applying a shot description may be as follows:
{Type of Shot} of {List of People} {Image Description Vector to Text}
Which would give:
Close-Up Shot of Tiger Woods
Close-Up Shot of Tiger Woods giving a press conference on stage
Which, in the semantic markup, becomes:
[Close-Up Shot](label:61ae3df8c7294673ff3dbbcf) of [Tiger Woods](person.61be3df8c7294673ff3dbbca) giving a press conference on stage
In some embodiments, this markup may be used to provide a rich display such that it is possible to isolate entities and make them clickable, display tooltip. In some embodiments, this markup may be faceted in our search engine

Semantic Reconciliation

In some embodiments, the semantic reconciliation engine 109 may, for a particular shot of a video stream, obtain the AI pipeline outputs from the AI pipeline including expert machine learning-specific markup labels associated with the plurality of expert machine learning models. The expert machine learning-specific markup labels associated with the plurality of expert machine learning models may include: recognized face labels and associated facial recognition confidence scores, from a facial recognition model, identifying recognized persons in the particular shot, and a transcription, from a natural language processing (NLP) model, of speech in the particular shot.

In some embodiments, the semantic reconciliation engine 109 may include Wikidata graph reconciliation 2012, for example. To do so, the semantic reconciliation engine 109 may perform semantic reconciliation 2070 by querying, with the recognized face labels, an external data source, e.g., such as a Wikidata graph, having a plurality of entities, each entity having at least one property including an occupation property (e.g., P106) to obtain the property data associated with the persons of the recognized face labels.

In some embodiments, the semantic reconciliation engine 109 may determine a topicality of the particular shot based on a topic classification and cluster tool applied to the transcription. For example, in some embodiments, the video may include metadata including, e.g., subjects of the video such as, e.g., topic (politics, entertainment, sport, etc.), types of people or activities appearing in the video (e.g., politicians, actors, sports highlights, points scored, etc.), among other metadata descriptive of the video. In some embodiments, the topic may be referenced against external data source entries via one or more external data source properties, such as, e.g., property P101 of the Wikidata graph, to identify matching entries. In some embodiments, the property may be compared against people, labels, audio, logos or other items identified by the AI pipeline, and where the property matches, the semantic reconciliation engine 109 may verify the topic and/or provide a multimodal boost.

In some embodiments, the semantic reconciliation engine 109 may determine, based on a similarity measure, a similarity metric indicative of a similarity between the property data and the topicality. For example, in some embodiments, by exploiting semantic fields with related synonyms, a similarity between property data and topicality may be assessed. Additionally, in some embodiments, external data source IDs may include other occupations, titles (current and past), etc., thus enabling the semantic reconciliation engine 109 to identify a nexus between a property data item, such as a person, and other property data items, such as a profession of the person or other topicality (e.g., "Michael Schumacher" may be matched to "Formula 1" and/or "race" as well as with "movies" as he starred in "Asterix" and was a voice actor in "Cars").

In some embodiments, the semantic reconciliation engine 109 may, for at least one facial recognition confidence score of the facial recognition confidence scores, determine a match between the property data and the topicality based on the similarity metric. In some embodiments, based on a presence of the match, adding a facial recognition confidence boost to the at least one facial recognition confidence score, the facial recognition confidence boost being a predefined increase the at least one facial recognition confidence score.

In some embodiments, the semantic reconciliation engine 109 may apply the at least one respective recognized face label to the video shot to identify the associated person in the video shot where the at least one facial recognition confidence score with the facial recognition confidence boost exceeds a facial recognition threshold.

In some embodiments, the semantic reconciliation engine 109 may generate, according to a video indexing storage schema, a semantic markup for the video shot based on the at least one respective recognized face label and the AI pipeline outputs. In some embodiments, the semantic markup may include modifying the image caption of the image captioning 2032 process detailed above. For example, parts-of-speech of words in the image caption may be identified and tagged. Based on the parts of speech, e.g., proper nouns, verbs, etc., items from semantic reconciliation 2070 may be merged into the image caption based on a match between the property data and the parts of speech.

In some embodiments, the tags may be expert ML-specific markup tags that denote a type of label. For example, the face detection model may output face labels which may be inserted into the image caption using a face detection tag that marks the face label as a recognized person. Thus, the tags enable machine interpretability of the text of the image caption because the inserted labels from the expert machine learning models may be marked or otherwise computationally identifiable as being a particular type of information associated with a particular expert machine learning model.

The semantic markup may be further refined via high-level concept detection 2090, such as, e.g., via semantic analysis and/or classification using one or more machine learning models.

In some embodiments, the semantic reconciliation engine 109 may index, according to the video indexing storage schema, a searchable video shot object storing the video shot with the semantic markup.

In some embodiments, the semantic reconciliation engine 109 may index, according to the video indexing storage schema, a searchable video shot object storing the video shot with the semantic markup, In some embodiments, the search engine 117 may search the object storage 114 based on the video shot query 131. In some embodiments, the search engine 117 may receive the video shot search query 131 from the client device 130 via a network interface 111 and over a network.

In some embodiments, one or more machine learning models and/or algorithms detailed above may be fine-tuned with specialized knowledge 2014. For example, one or more models may be implemented that are specially trained for topics such as golf, football, news, politics, movies, television, science(s), among others or any combination thereof.

In some embodiments, the client device 130 may interact with the video shot search platform 110 using one or more suitable local and/or network communication protocols, such as, e.g., a messaging protocol, a networking protocol, one or more application programming interfaces (APIs), or other suitable technique for communicating between computing systems or any combination thereof. For example, the client device 130 may interact with the video shot search platform 110 over a network including the Internet using the HyperText Transport Protocol (HTTP) to communicate one or more API requests to cause the video shot search platform 110 to use the search engine 117 to search video shots according to the features output by the AI pipeline 100. In another example, the video shot search platform 110 is connected to the user device 102 via a local network, such as, e.g., Ethernet, Local Area Network (LAN), wireless LAN (WLAN), WiFi, Bluetooth, or other suitable networking technology or any combination thereof, and communicate via API requests and/or database queries in a suitable database query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages). In some embodiments, any suitable combination of local, networked, cloud, distributed or other computing architecture may be employed to return the search results in response to the video shot query 131 for display via the client device 130 on the user device 102.

In some embodiments, the network may include any suitable computer network, including, two or more computers that are connected with one another for the purpose of communicating data electronically. In some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the goal of the search engine 117 is to maximize the use of full text search queries, but instead of returning media files, the search engine 117 has the ability to return the right shot within a full media (it could be the quote from a politician in front of a specific building for example).

In some embodiments, another objective for this system is to have a response in less than a threshold response time, such as, e.g., 100 ms, which is a challenge for a customer having more than, e.g., 30000 hthes—this would mean searching through more than 100 GB of text and vectors and return the right results.

In some embodiments, the search engine 117 may employ a search system such as Open Search. In some embodiments, to reduce the response time (e.g., to below 100 ms) across an archive (e.g., exceed tens, hundreds or thousands of gigabytes of data) and return shots on top of complete media, the search engine 117 may, e.g.:

a. Use plain text search indexes (e.g., based on the search system such as Open Search).
b. Have the capacity to return shots (as opposed to full media) based on cross modalities, where the chunk-based pivot format enables storage of huge amount of video data into atomic element that can be returned. In some embodiments, doing so enables scaling horizontally. Because there are many different elements, it becomes easy to load balance the charge across several machines (as opposed to a single one).
c. Use specific hardware that provides fast access time (and write time for live streams) on disk (memory will not be able to shard huge index sizes properly on itself), for example, by using clusters of machines that are using SSD NVME for object storage 114. In some embodiments, these types of drives provide an access time of 10 microseconds or less when querying the indexes.

In some embodiments, while plain text search queries are by default looking for text elements, the video shot search platform 110 may store each vector matching the image shot description. This vector is specific to the model that is used, hence when performing a text query, the search engine 117 may move to a vector search, where:

a. The search query 131 is encoded to a vector using the image captioning pipeline 107 that has been used to generate image captions and/or using one or more word embedding models such as word2vec or other semantic embedding models and/or techniques or any combination thereof. The encoding may be performed using a dedicated webserver with a graphical processing unit (GPU) to perform fast answer time.
b. When executing the request, the search engine 117 may compare the distance between the query vector and the destination vectors, e.g., using a suitable similarity measure. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The comparison between vectors may be performed according to a clustering model, such as, e.g., k-Nearest Neighbors, DBSCAN, k-Means, among others or any combination thereof.
c. The shot are then ordered based on:
  i. Distance values
  ii. And filtered based on a max distance value In some embodiments, this approach may enable a fully semantic search where the system may actually try to understand which shot looks closer to the query. In some embodiments, because such queries employ many of parameters (e.g., arrays of vectors can contain between 256 and 1024 parameters), access to disk is beneficial to response to the query in fewer than, e.g., 100 ms. Thus, the SSD NVME may ensure matching this answer time when computing distance between one vector and up to 160 millions (for 30.000 hthes).

Figure 3:
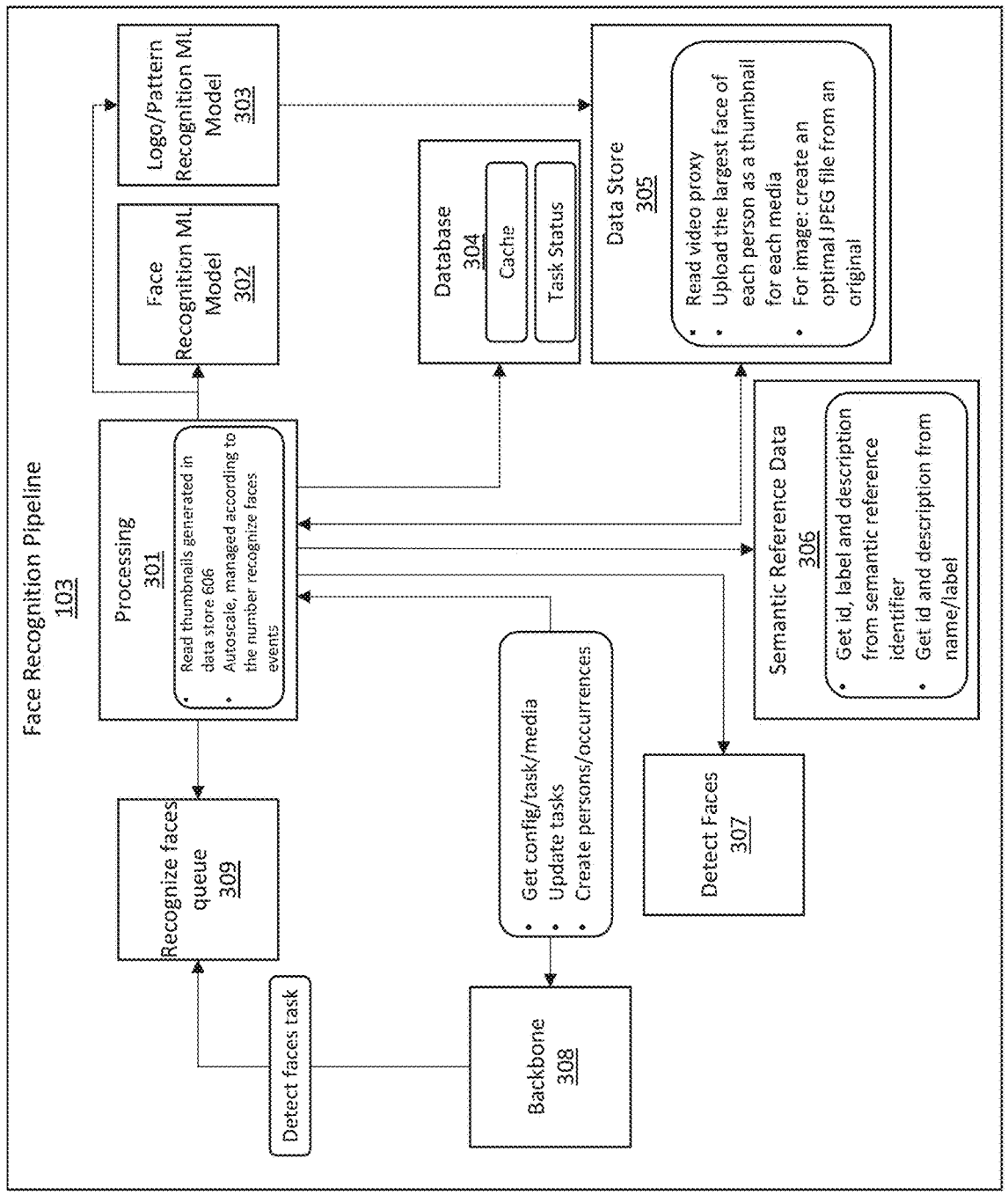
FIG. 3 depicts an exemplary cloud architecture for the video shot search platform 110 in accordance with one or more embodiments of the present disclosure.
Figure 4:
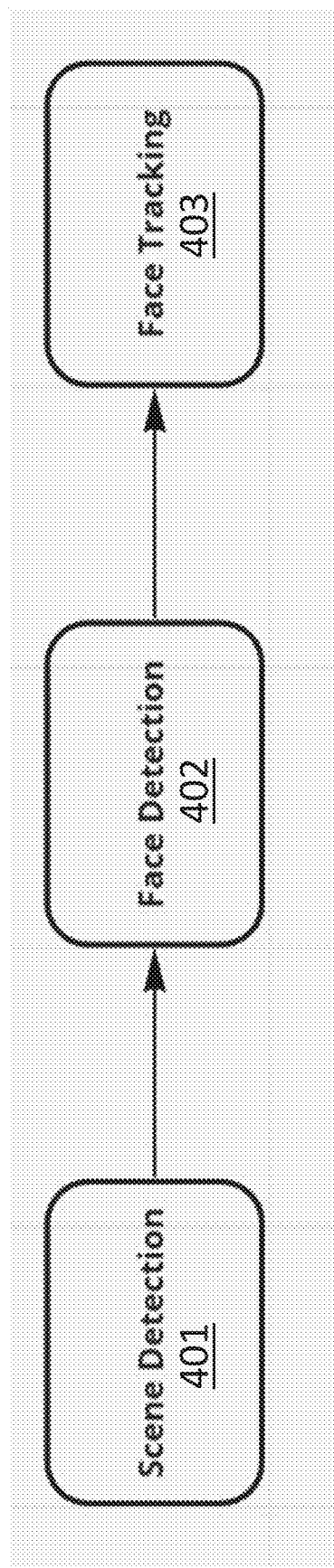
FIG. 4 depicts an exemplary face recognition pipeline 103 of the video shot search platform 110 in accordance with one or more embodiments of the present disclosure.
Figure 5:
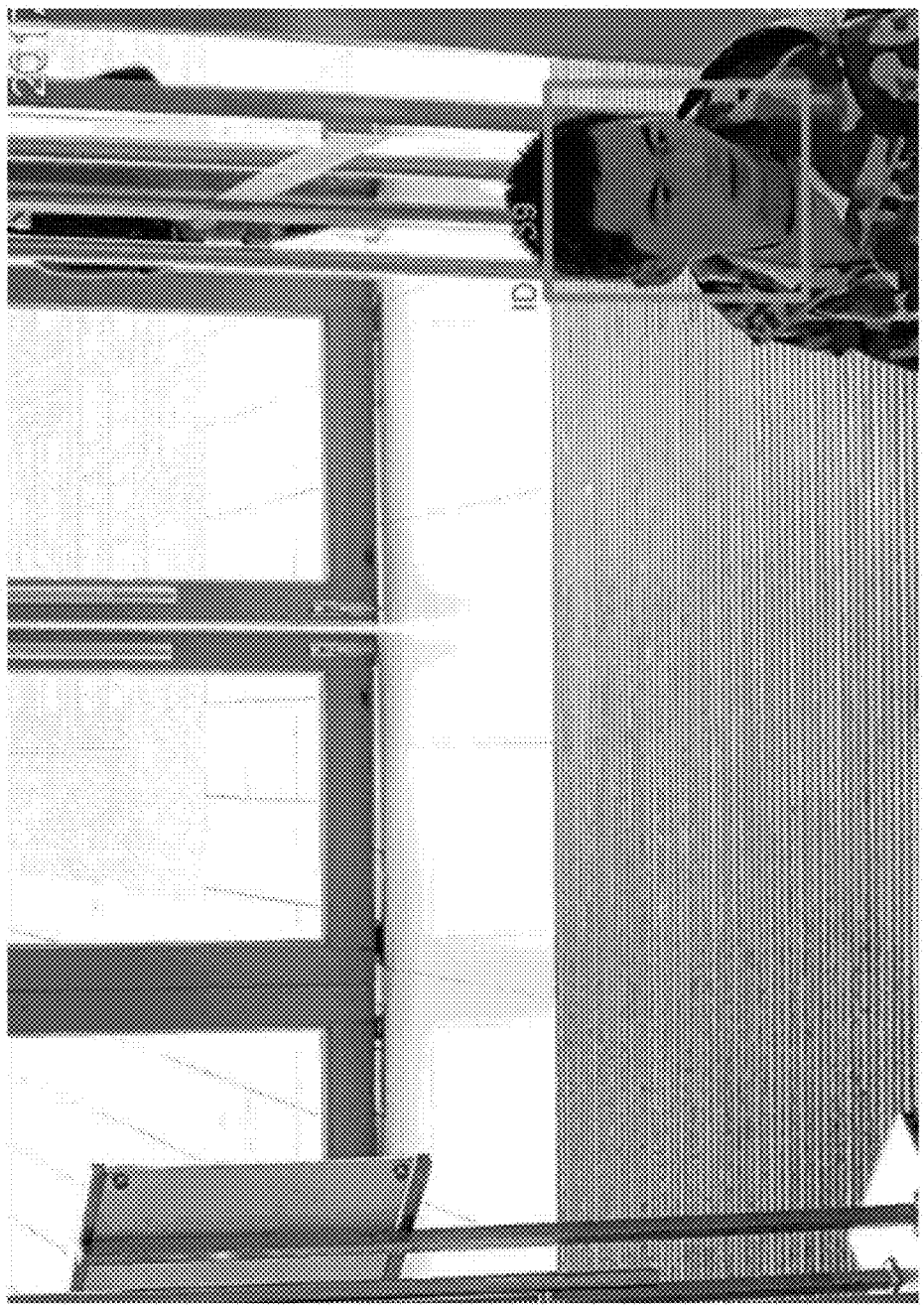
FIG. 5 illustrates face recognition by the face recognition pipeline 103 in accordance with one or more embodiments of the present disclosure.
Figure 6:
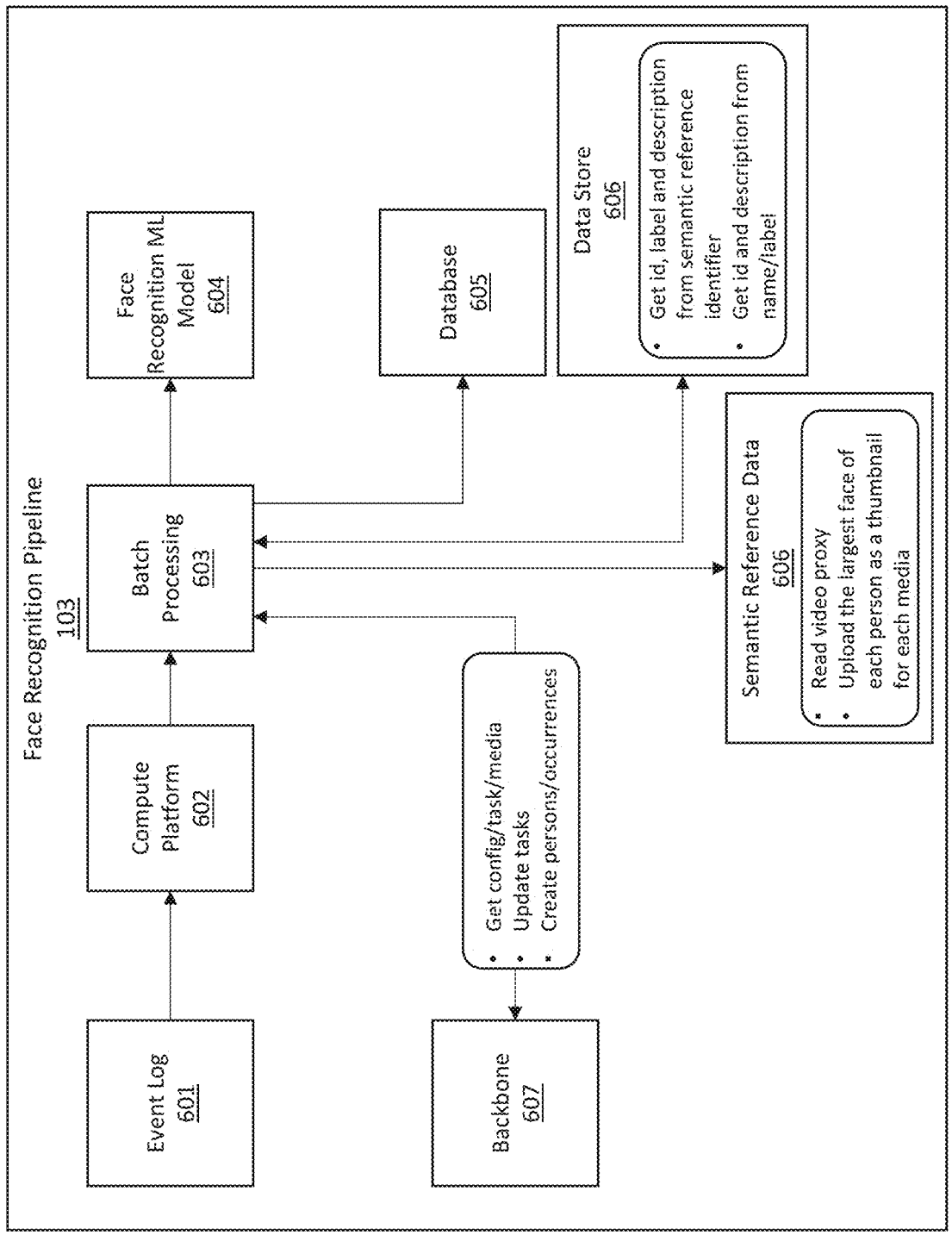
FIG. 6 depicts an exemplary cloud orchestration for the face recognition pipeline 103 of the video shot search platform 110 in accordance with one or more embodiments of the present disclosure.

Referring now to FIG. 3, an exemplary cloud architecture for the video shot search platform 110 is depicted in accordance with one or more embodiments of the present disclosure. Referring now to FIG. 4, an exemplary face recognition pipeline 103 of the video shot search platform 110 is depicted in accordance with one or more embodiments of the present disclosure. Referring now to FIG. 5, face recognition by the face recognition pipeline 103 is depicted in accordance with one or more embodiments of the present disclosure. Referring now to FIG. 6, an exemplary cloud orchestration for the face recognition pipeline 103 of the video shot search platform 110 is depicted in accordance with one or more embodiments of the present disclosure.

In some embodiments, the face recognition pipeline 103 is a pipeline for face recognition in videos, whose goal includes to reduce calls to third-party face recognition services. It will replace "perception" for the persons_detection tasks for video media.

In some embodiments, the objective is to reduce costs, to hold OKR, on the face recognition. Typically, face recognition and celebrity recognition is expensive, requiring high compute resources. Currently a majority of the costs are attributable to calls to third-party datasets, the rest being the cost of the infra.

Glossary a. Active Speaker detection (ASD): detect whether the face in the screen is speaking or not
b. Third-party recognition service: All cloud provider services for image and video analysis
c. Cloud Provider Search Face: third-party recognition service for face detection
d. Cloud Provider Collections: third-party recognition service for face recognition (what we use to identify the people present in our thesaurus). Requires a detect faces beforehand to send only the face. Requires one call per face detected on each frame.
e. Cloud Provider Celebrities: cloud provider recognition service for celebrity recognition. No face detection required. Returns all identified celebrities on an image in a single call.
f. Ingestion task: Executed when a media is submitted to the platform. Reads the original media generates the proxy, proxy-dash, extract thumbs and generates the cover and the skimmer.
g. Persons_detection task: Task executed by the perception team to identify persons in a media.
h. Logo detection task: may be launched by the persons_detection task, which queries an object detection model installed on the system.

In some embodiments, the detect faces tasks, are launched by the backbone 308. The backbone sends a message to a "recognize-faces-input" queue to recognize faces queue 309 for processing by the processing 301 resource(s). The queue may include facial recognition tasks for individuals including celebrities, politicians, athletes, or any other persons that the face recognition ML model 302 is trained to recognize.

In some embodiments, data for a face detection and/or recognition task may be provided by an event log 601 including the queue 309 of recognize-faces-input. The data may include, e.g., a media type, a shot length, a date, a time, among other data regarding the media in which faces are to be detected, or any combination thereof. In some embodiments, a backbone 308 may provide configuration, task and/or media data, maintain updates to each task and create persons and occurrences based on the face detection and face tracking. In some embodiments, this data may be informed by semantic reference data 306, e.g., in external data sources such as wikidata, IMDB, among others or any combination thereof. For example, the processing 301 may compare detected faces to the semantic reference data 606.

A compute platform 602 may operate on the queue by orchestrating each task for compute using processing 301. Here, processing 301 is shown for the data processing resource, though other forms of processing may be employed, such as real-time, continuous, streaming, or other processing or any combination thereof.

In some embodiments, the processing 301 may include, e.g., extracting frames from the video of each task in the queue, performing scene detection to identify a scene, performing face detection on each frame, performing face tracking by linking the face detection across the frames of the scene, and extracting a best face for each tracked face. In some embodiments, the best face may be defined by a minimum degree of artifacts, such as a minimum of blurring, shadow, obfuscation or blocking by objects in the frames, among other artifacts that result in low quality imagery or any combination thereof.

In some embodiments, the perform face detection and tracking, the processing 301 may include calls to the face recognition ML model 302. The face recognition ML model 302 may be a local model, a remote model, a model provided via software-as-a-service, a third-party model, or any combination thereof.

Each call to the face recognition ML model 302 may incur a computation cost due to the resource intensive nature of machine learning-based inferencing. Indeed, as detailed above, where the face recognition ML model 302 is a third-party service, each call may incur a financial cost. Thus, reducing the number of calls to the face recognition ML model 302 may improve the efficiency of the face detection and tracking tasks.

In some embodiments, the processing 301 of the face recognition pipeline 103 may reduce the calls to third-party recognition service. To do so, the processing 301 may perform shot detection as depicted in FIG. 5. Scene detection 401 enables to cut the media into several scenes. This may be performed as a preliminary step to face tracking. In some embodiments, the face recognition pipeline 103 may perform face detection 402 using a face recognition ML model 302 to detect a face, which facilitates face tracking 403. In some embodiments, the face recognition pipeline 103 may perform face tracking 403. In some embodiments, face tracking 403 may be performed for each scene, using the results of Face detection 402 and Scene detection 401 to follow the faces in the same scene.

Similarly, to perform logo and/or pattern recognition, the processing 301 of the face recognition pipeline 103 may reduce calls to third-party recognition service. To do so, the processing 301 may perform shot detection as depicted in FIG. 5 to cut the media into several shots.

The cost reduction may be linked to the type of media, and the shorter the shots, the lower the savings. For example, there may be cases where the average shot duration is below, e.g., 10 seconds. Such cases may include a "television news" media, where the average duration of a shot is 7 seconds. In such a case, calls to the third-party recognition service may be reduced by 7 or more. In some embodiments where a single shot media with the same person(s) still visible, the reduction may be proportional to the duration in seconds of the media. e.g. divide by 600 for a ten minutes media. Shot detection can be used in a GUI, but also for future analyzes that will take this parameter into account in order to improve detection results.

Thus, in some embodiments, the face recognition pipeline 103 may be easily scalable with cloud provider processing 301. In some embodiments, the face recognition pipeline 103 may be cost optimized, e.g., by removing object storage on waiting for a task.

In some embodiments, the face recognition pipeline 103 could ultimately give more effective recognition results:

detect faces being much more effective than recognize faces, it is possible to track faces which at certain times are not recognizable.

In some embodiments, the processing 301 may include Active Speaker detection (ASD) by detecting whether the face in the screen is speaking or not. This allows for linking the transcript to the person speaking on the screen.

In some embodiments, a status of tasks may be tracked and logged in a database 304. The database 304 may also store a cache of task processes and/or task-related data. Additionally, a data store 305 may read a video proxy, upload a largest face of each person as a thumbnail for each media item, and in the case of an image, create an optimal JPEG file from an original image during analysis of the image.

In some embodiments, the persons_detection tasks, are launched by the backbone 607. The backbone sends a message to a "recognize-faces-input" queue at the compute infrastructure 603. The queue may include facial recognition tasks for individuals including celebrities, politicians, athletes, or any other persons that the face recognition ML model 604 is trained to recognize.

In some embodiments, data for a face detection and/or recognition task may be provided by an event log 601 including the queue of recognize-faces-input. The data may include, e.g., a media type, a shot length, a date, a time, among other data regarding the media in which faces are to be detected, or any combination thereof. In some embodiments, a backbone 607 may provide configuration, task and/or media data, maintain updates to each task and create persons and occurrences based on the face detection and face tracking. In some embodiments, this data may be informed by semantic reference data 606, e.g., in external data sources such as wikidata, IMDB, among others or any combination thereof. For example, the batch processing 603 may compare detected faces to the semantic reference data 606.

A compute platform 602 may operate on the queue by orchestrating each task for compute using batch processing 603. Here, batch processing 603 is shown for the data processing resource, though other forms of processing may be employed, such as real-time, continuous, streaming, or other processing or any combination thereof.

In some embodiments, the batch processing 603 may include, e.g., extracting frames from the video of each task in the queue, performing scene detection to identify a scene, performing face detection on each frame, performing face tracking by linking the face detection across the frames of the scene, and extracting a best face for each tracked face. In some embodiments, the best face may be defined by a minimum degree of artifacts, such as a minimum of blurring, shadow, obfuscation or blocking by objects in the frames, among other artifacts that result in low quality imagery or any combination thereof.

In some embodiments, the perform face detection and tracking, the batch processing 603 may include calls to the face recognition ML model 604. The face recognition ML model 604 may be a local model, a remote model, a model provided via software-as-a-service, a third-party model, or any combination thereof.

Each call to the face recognition ML model 604 may incur a computation cost due to the resource intensive nature of machine learning-based inferencing. Indeed, as detailed above, where the face recognition ML model 604 is a third-party service, each call may incur a financial cost. Thus, reducing the number of calls to the face recognition ML model 604 may improve the efficiency of the face detection and tracking tasks.

In some embodiments, the batch processing 603 of the face recognition pipeline 103 may reduce the calls to third-party recognition service. To do so, the batch processing 603 may perform shot detection as depicted in FIG. 5. Shot detection enables to cut the media into several shots. This may be performed as a preliminary step to face tracking. In some embodiments, the face recognition pipeline 103 may perform face detection 402 using a face recognition ML model 302 to detect a face, which facilitates face tracking 403. In some embodiments, the face recognition pipeline 103 may perform face tracking 403. In some embodiments, face tracking 403 may be performed for each scene, using the results of Face detection 402 and Scene detection 401 to follow the faces in the same scene. The cost reduction may be linked to the type of media, and the shorter the shots, the lower the savings. For example, there may be cases where the average shot duration is below, e.g., 10 seconds. Such cases may include a "television news" media, where the average duration of a shot is 7 seconds. In such a case, calls to the third-party face recognition service may be reduced by 7 or more. In some embodiments where a single shot media with the same person(s) still visible, the reduction may be proportional to the duration in seconds of the media. e.g. divide by 600 for a ten minutes media. Shot detection can be used in a GUI, but also for future analyzes that will take this parameter into account in order to improve detection results.

In some embodiments, a status of tasks may be tracked and logged in a database 605. The database 605 may also store a cache of task processes and/or task-related data. Additionally, a data store 606 may read a video proxy, upload a largest face of each person as a thumbnail for each media item, and in the case of an image, create an optimal JPEG file from an original image during analysis of the image.

In some embodiments, the face recognition pipeline 103 may be easily scalable with cloud provider batch processing 603.

In some embodiments, the face recognition pipeline 103 may be cost optimized, e.g., by removing object storage on waiting for a task.

In some embodiments, the face recognition pipeline 103 could ultimately give more effective recognition results: detect faces being much more effective than recognize faces, it is possible to track faces which at certain times are not recognizable.

In some embodiments, the batch processing 603 may include Active Speaker detection (ASD) by detecting whether the face in the screen is speaking or not. This allows for linking the transcript to the person speaking on the screen.

Referring now to FIG. 7, an example of text recognition by the text recognition pipeline 104 of the video shot search platform 110 is depicted in accordance with one or more embodiments of the present disclosure.

In some embodiments, the text recognition pipeline 104 may include OCR and STR: Text detection and recognition. In some embodiments, OCR (optical character recognition) works well on scanned documents where the text is horizontal, well-contrasted with the background, and uses standard fonts. It doesn't require the use of neural networks to achieve good performance.

In some embodiments, STR (shot text recognition) recognizes text in natural shots. It's a special form of OCR that's difficult due to complex backgrounds, different text orientations, various fonts, and imperfect image conditions (uneven lighting, motion blur, etc.). It may employ the use of neural networks.

In some embodiments, the text recognition pipeline 104 may include three steps:
  a. Text detection and localization: "Is there any text and where is it?" (returns bounding boxes)
  b. Text extraction from the background to prepare data for OCR. (processing lighting differences, complex backgrounds, distortions, . . . ).
  c. Text recognition. Final step to convert character images into ASCII values.

Figure 8:
FIG. 8 illustrates custom pattern recognition by the custom pattern recognition pipeline 105 of the video shot search platform 110 in accordance with one or more embodiments of the present disclosure.
Figure 8:
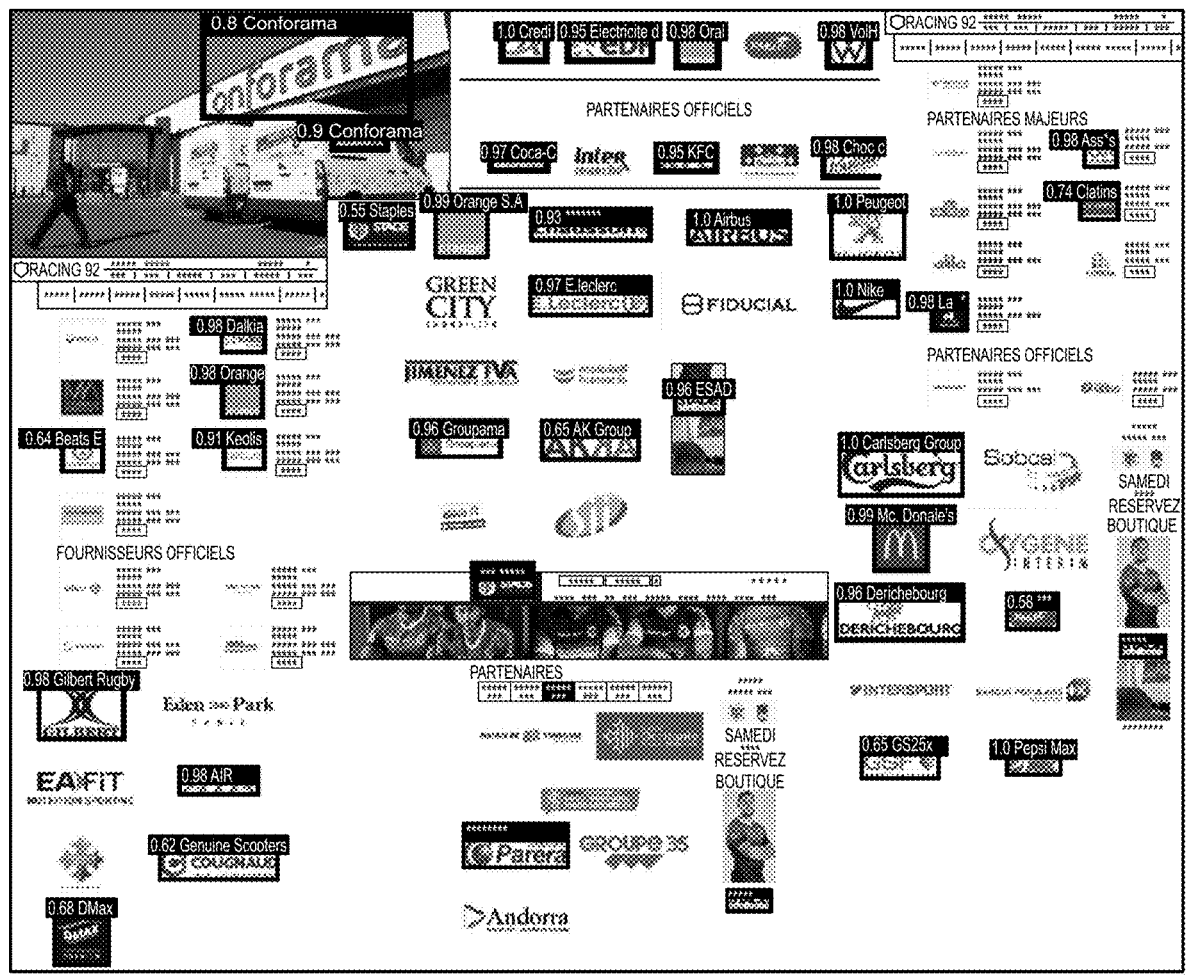
Figure 9:
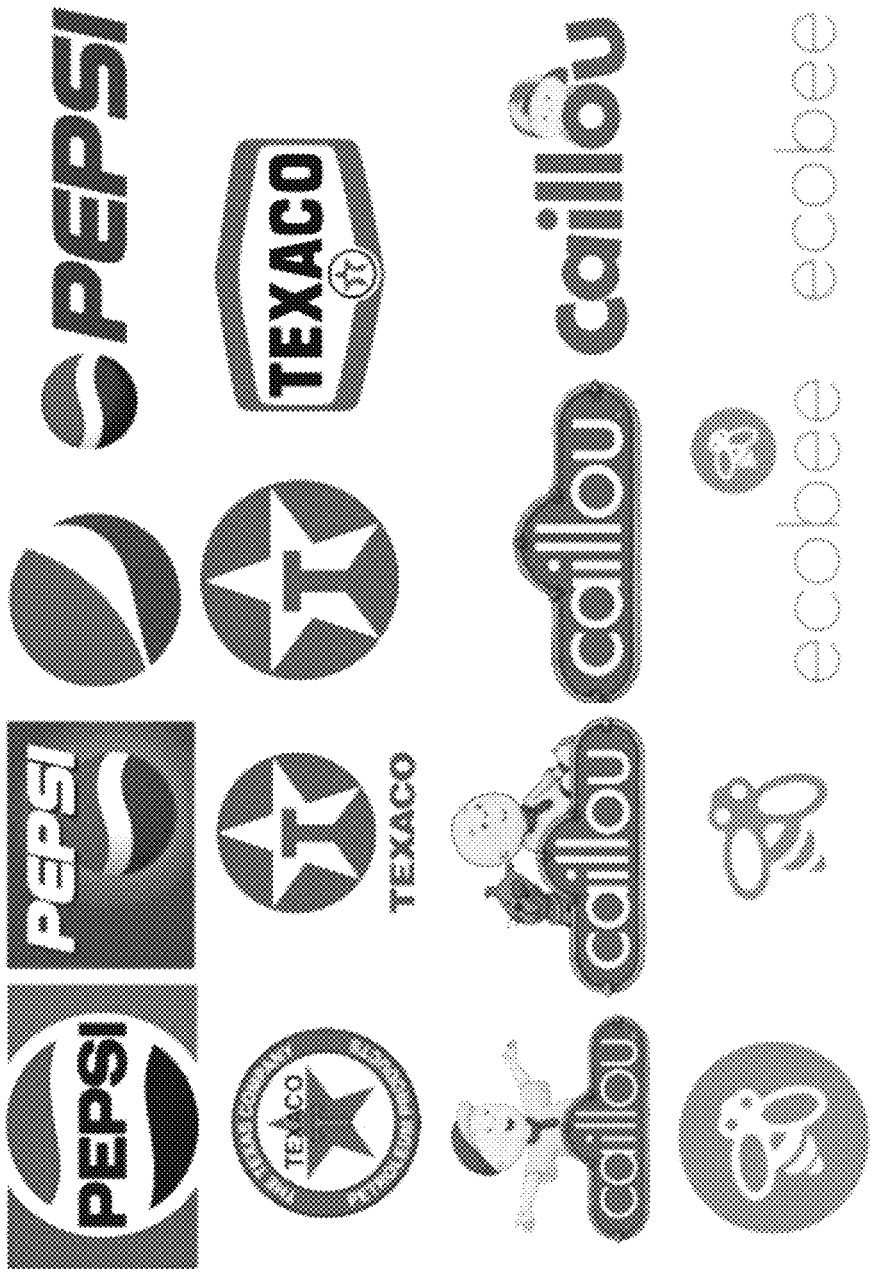
FIG. 9 illustrates custom pattern recognition by the custom pattern recognition pipeline 105 of the video shot search platform 110 in accordance with one or more embodiments of the present disclosure.
Figure 10:
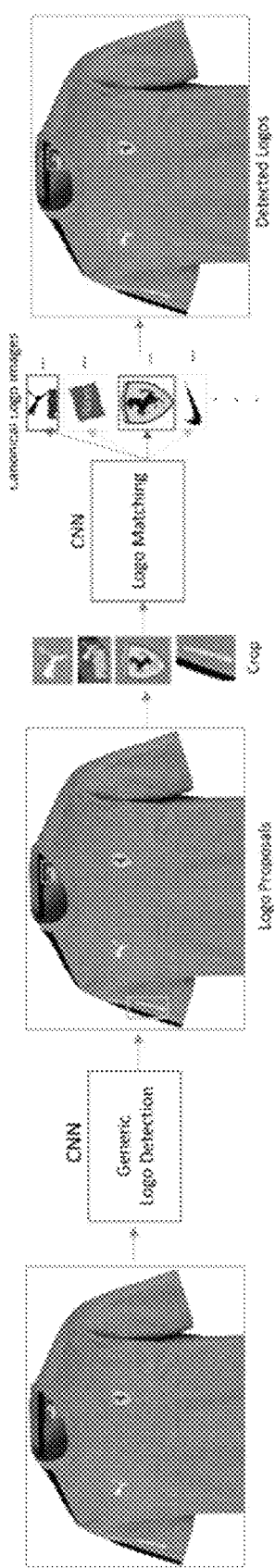
FIG. 10 depicts a logo detection framework of the custom pattern recognition pipeline 105 of the video shot search platform 110 in accordance with one or more embodiments of the present disclosure.
Figure 11:
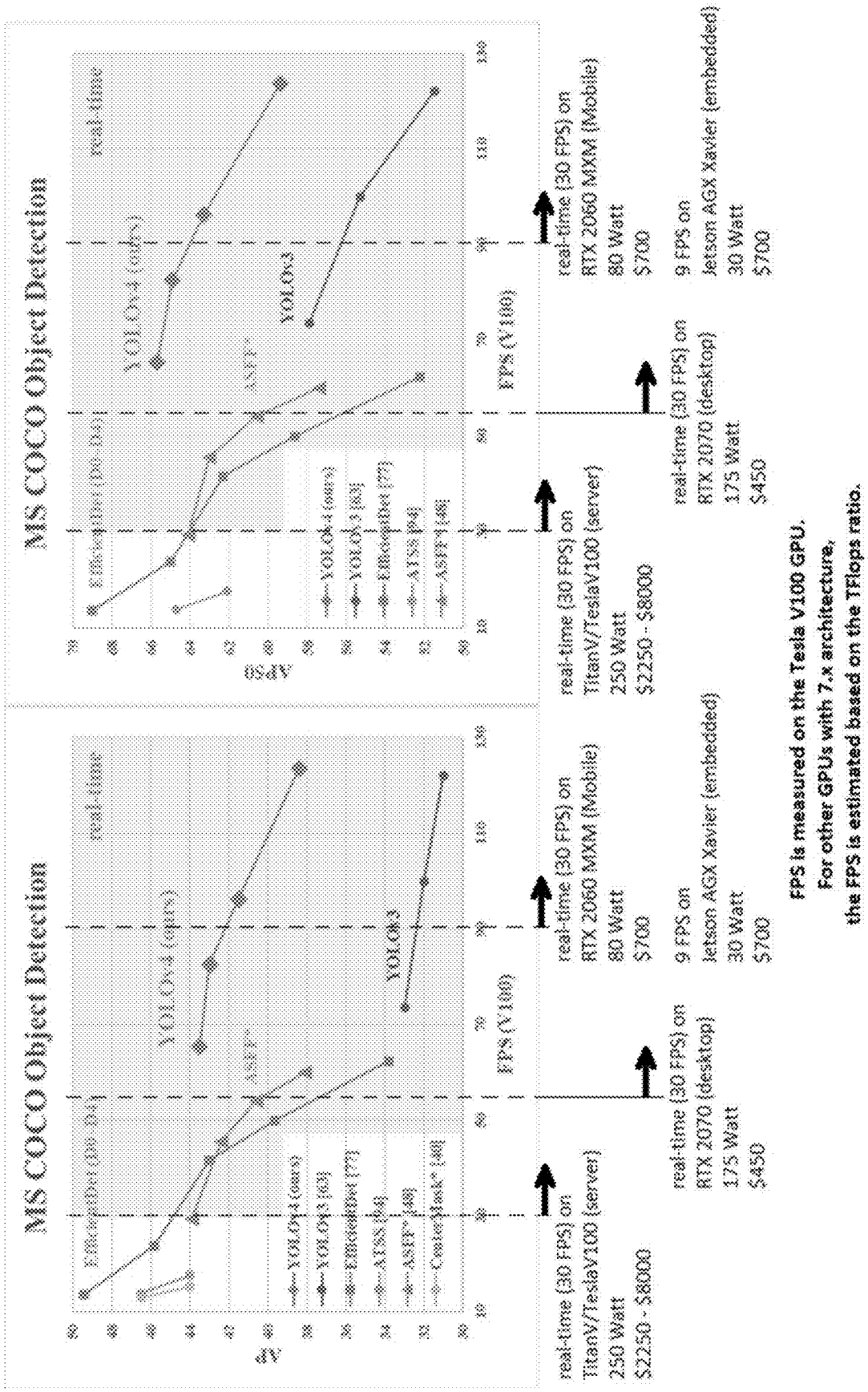
FIG. 11 depicts logo detection performance of possible logo detection machine learning architectures of the custom pattern recognition pipeline 105 of the video shot search platform 110 in accordance with one or more embodiments of the present disclosure.

Referring now to FIG. 8-11. In FIG. 8, custom pattern recognition by the custom pattern recognition pipeline 105 of the video shot search platform 110 is depicted in accordance with one or more embodiments of the present disclosure. In FIG. 9, custom pattern recognition by the custom pattern recognition pipeline 105 of the video shot search platform 110 is depicted in accordance with one or more embodiments of the present disclosure. In FIG. 10 a logo detection framework of the custom pattern recognition pipeline 105 of the video shot search platform 110 is depicted in accordance with one or more embodiments of the present disclosure. In FIG. 11, logo detection performance of possible logo detection machine learning architectures of the custom pattern recognition pipeline 105 of the video shot search platform 110 is depicted in accordance with one or more embodiments of the present disclosure.

In some embodiments, the custom pattern recognition pipeline 105 may enable users to teach machines to detect complex 2D patterns present in videos.

In some embodiments, the custom pattern recognition pipeline 105 may beneficial for advertisers, Media monitoring and analysis of notoriety, Detection of the use of old logos, Fraudulent use, Sports rights-holders: Automatic provision of new content to sponsors via brand detection, Journalists: Analysis of the presence and recurrence of symbols during demonstrations, Documentalists: Automation of content indexing, Editors: Automatic blurring of brands, among other use cases.

Most customers require the use logo detection to achieve the following:
  a. Journalists: to illustrate stories, e.g.: if one is telling a story about the price of oil, one will need shot with logos of Exxon, Shell, Saudi Aramco, or other story about a company.
  b. Sponsors/Sport: when sponsoring a club, one will require the use of shot containing a specific player or action and the brand logo for communication.

In some embodiments, the custom pattern recognition pipeline 105 may be multimodal: Detection confidence must be able to be reinforced with other elements external to detection. For example if one is to create the brand logo "Société Générale," each time the entity named "Société Générale" is heard in the transcription or present in the media metadata, the confidence calculation must take it into account. In some embodiments, the custom pattern recognition pipeline 105 may use OCR, when justified, to improve detection confidence.

In some embodiments, the custom pattern recognition pipeline 105 may be pragmatic: First create a minimal prototype before framing the rest. (e.g., could be limited to photos and a manually created dataset)

In some embodiments, the custom pattern recognition pipeline 105 may be a fun and self-taught learning: The dataset created by the user is an item of great value. The more fun and addictive the learning experience is, the greater the value created. When the user uses In some embodiments, the custom pattern recognition pipeline 105 may be Semantic and Universal: The created entities must contain a universal identifier (such as a Wikidata ID) to promote thesaurus docking projects. In some embodiments, the custom pattern recognition pipeline 105 may differentiate logos by version or date (use case: e.g., exhibition by logo version, monochrome version . . . ) "Flavor", identify old logo versions, etc.

In some embodiments, the custom pattern recognition pipeline 105 may be cloud-agnostic: The developed technology must be deployable on another cloud provider.

In some embodiments, the custom pattern recognition pipeline 105 may be Controlled and Measured: Performance measurement over time democratize the complexity of these technologies.

In some embodiments, the custom pattern recognition pipeline 105 may be Compatible, Reversible, and Interoperable Datasets to give the client the ability to export their created datasets in the XML PASCAL VOC format (interoperability).

In some embodiments, the custom pattern recognition pipeline 105 may enable Collaborative Learning where several people must be able to learn a dataset simultaneously.

In some embodiments, the custom pattern recognition pipeline 105 may enable Energy Saving because the use of a binary format dataset instead of XML to speed up processing. Quick parsing, and loading in RAM only of the relevant section.

In some embodiments, the custom pattern recognition pipeline 105 may enable Design & Engineering, Together: The technology involved is complex. In order to make the most of it, the talents working on design and engineering to understand and share their respective issues and constraints. E.g., anticipate the time it takes to load when learning a new pattern, management and calculation of confidence.

In some embodiments, the custom pattern recognition pipeline 105 may be performance generic logo detection, e.g., via a convolutional neural network (CNN), and then logo matching to a set of canonical logo images (e.g., see, FIG. 9 as an example). The custom pattern may be matched using low dimensional CNN embeddings learned for matching custom pattern images.

In some embodiments, detection may be performed using, e.g., Single Shot Multibox Detector, which is a method for detecting objects in images using a single deep neural network.

The tasks of object detection, localization and classification are performed in a single forward pass of the network. SSD creates bounding boxes at different aspect ratios and scales. At the time of prediction, the network generates scores for the presence of each object category in the bounding boxes, and then makes adjustments to the box to better match the shape of the object.

In addition, the network combines predictions from multiple feature maps with different resolutions to handle objects of different sizes. Its advantage lies in its speed compared to methods that use an additional object proposal step.

In some embodiments, an OCR model, such as YOLO or others, may be trained to have 200 to 400 logo examples for each logo, taken from images or videos that correspond to the detection context. Training may include labeling these logos, verifying the dataset with scripts, then manually, adjusting the parameters, and training the model. In some embodiments, the model may be refined by testing and/or evaluating, and then finding the confidence thresholds. The trained model may be installed in production, on a new GPU instance, and logo labels may be created in the thesaurus, then link these new label IDs to the detections made by the model.

Figure 12A:
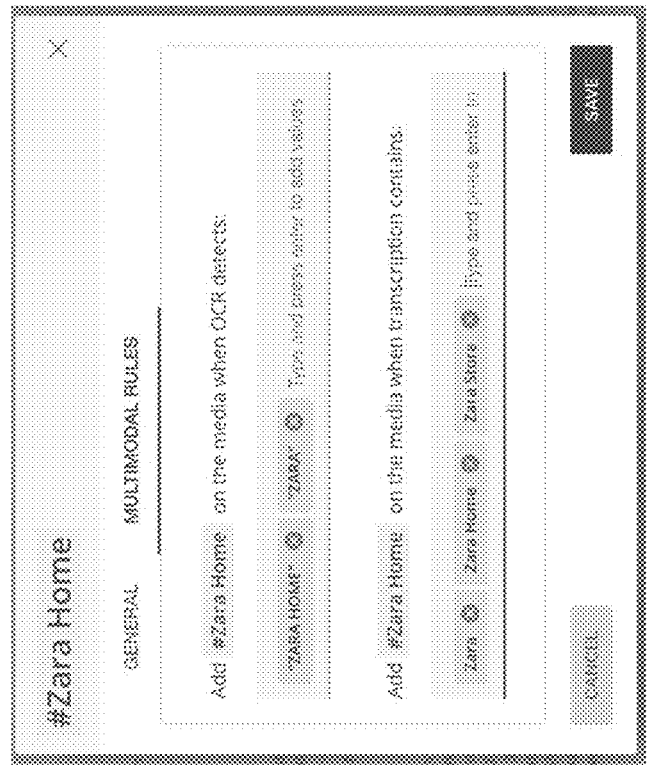
FIGS. 12A and 12B illustrate configurable multimodal rules for modifying tags of video shots processed by the AI pipeline 100 based on detected features accordance with one or more embodiments of the present disclosure.
Figure 12B:
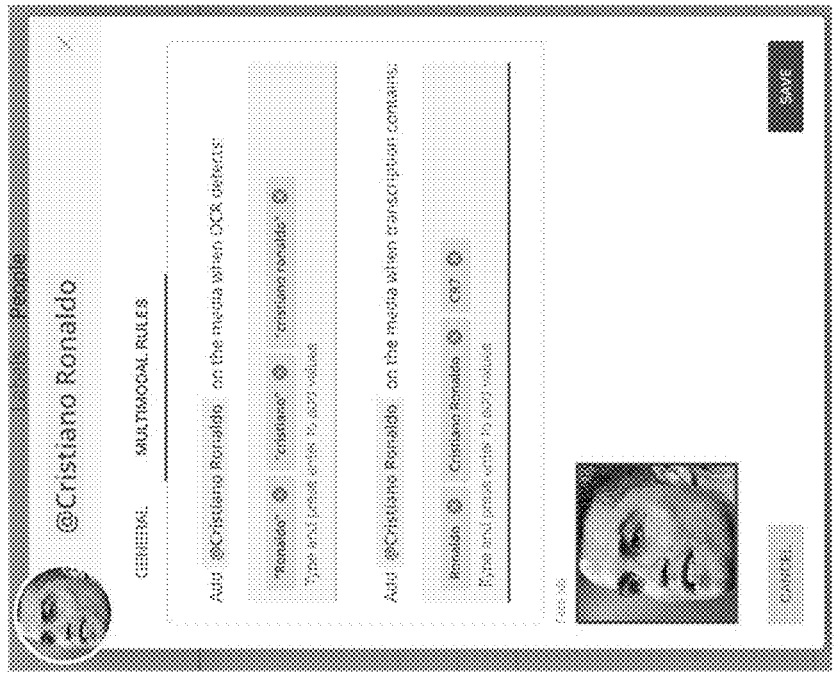
Figure 13:
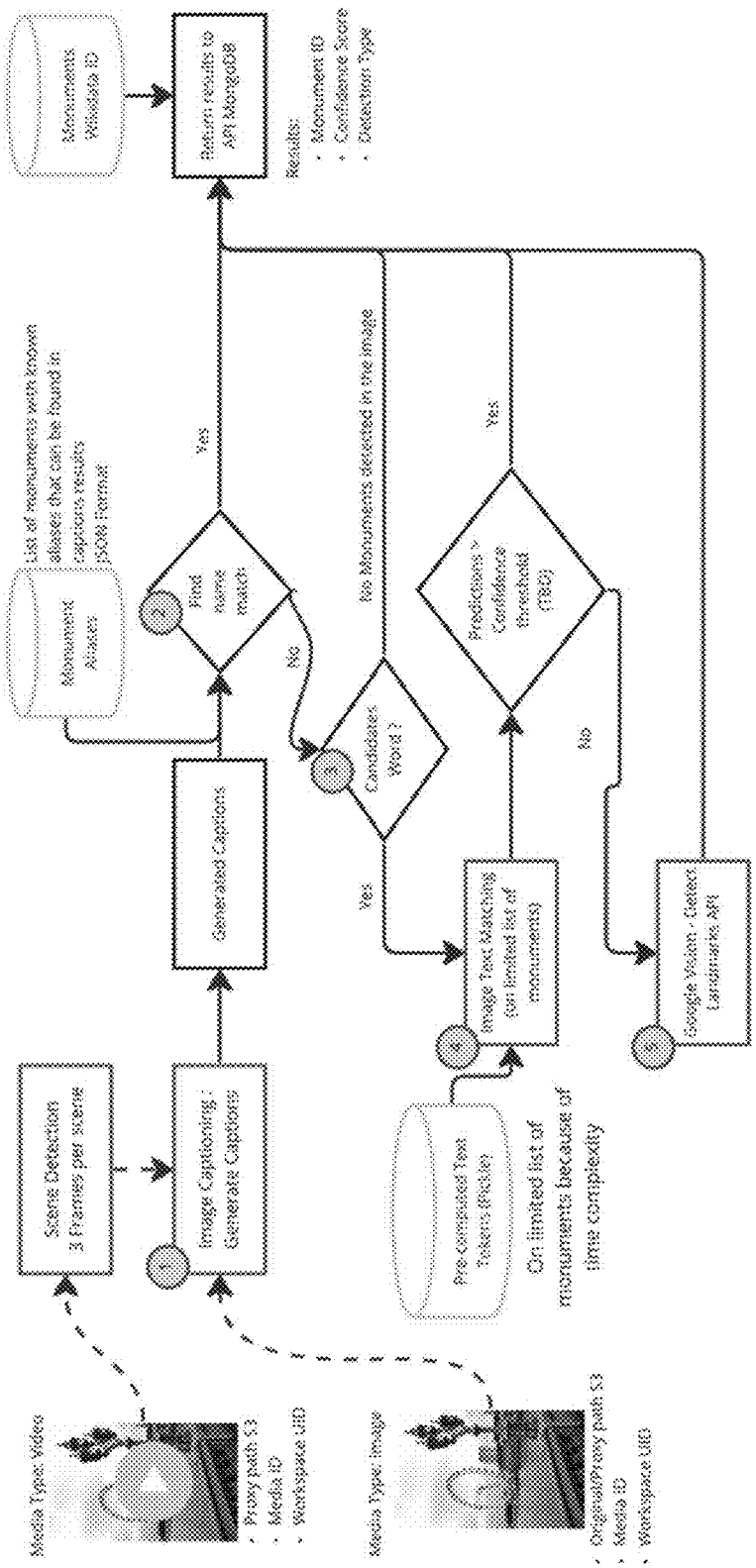
FIG. 13 depicts a flowchart of a landmark detection framework in accordance with one or more embodiments of the present disclosure.
Figure 14:
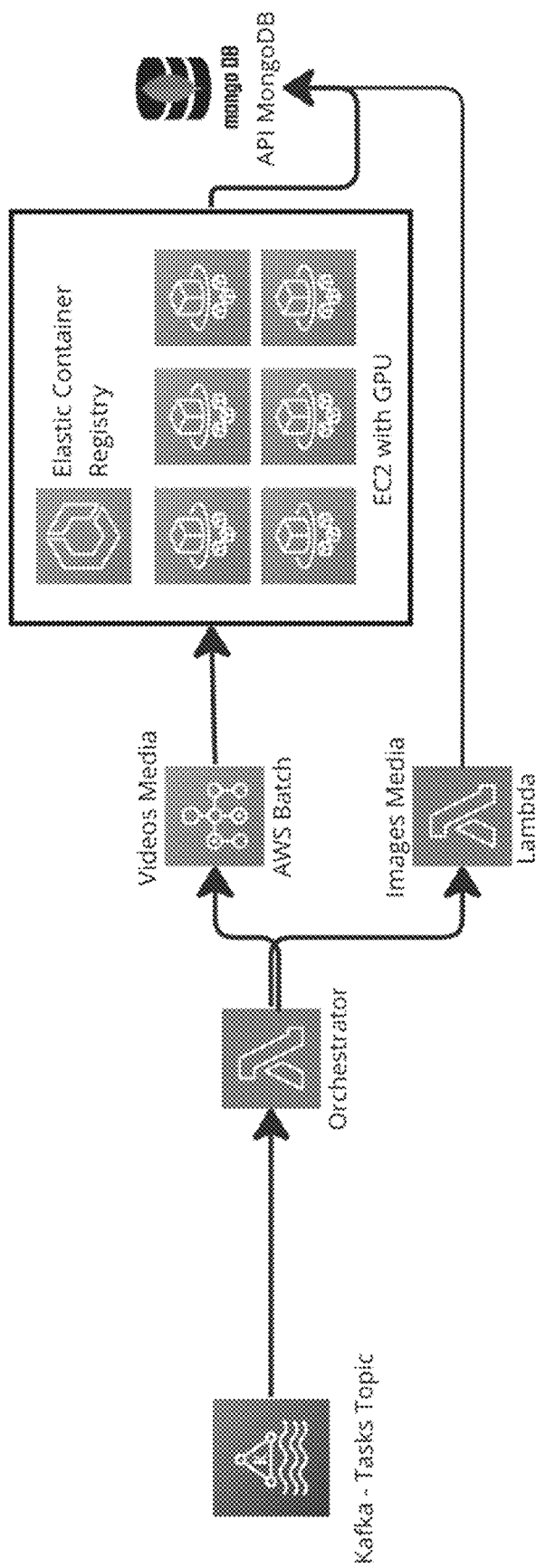
FIG. 14 depicts an exemplary cloud architecture for landmark detection in accordance with one or more embodiments of the present disclosure.

Referring now to FIG. 12A and 12B illustrate configurable multimodal rules for modifying tags of video shots processed by the AI pipeline 100 based on detected features accordance with one or more embodiments of the present disclosure.

Figure 15:
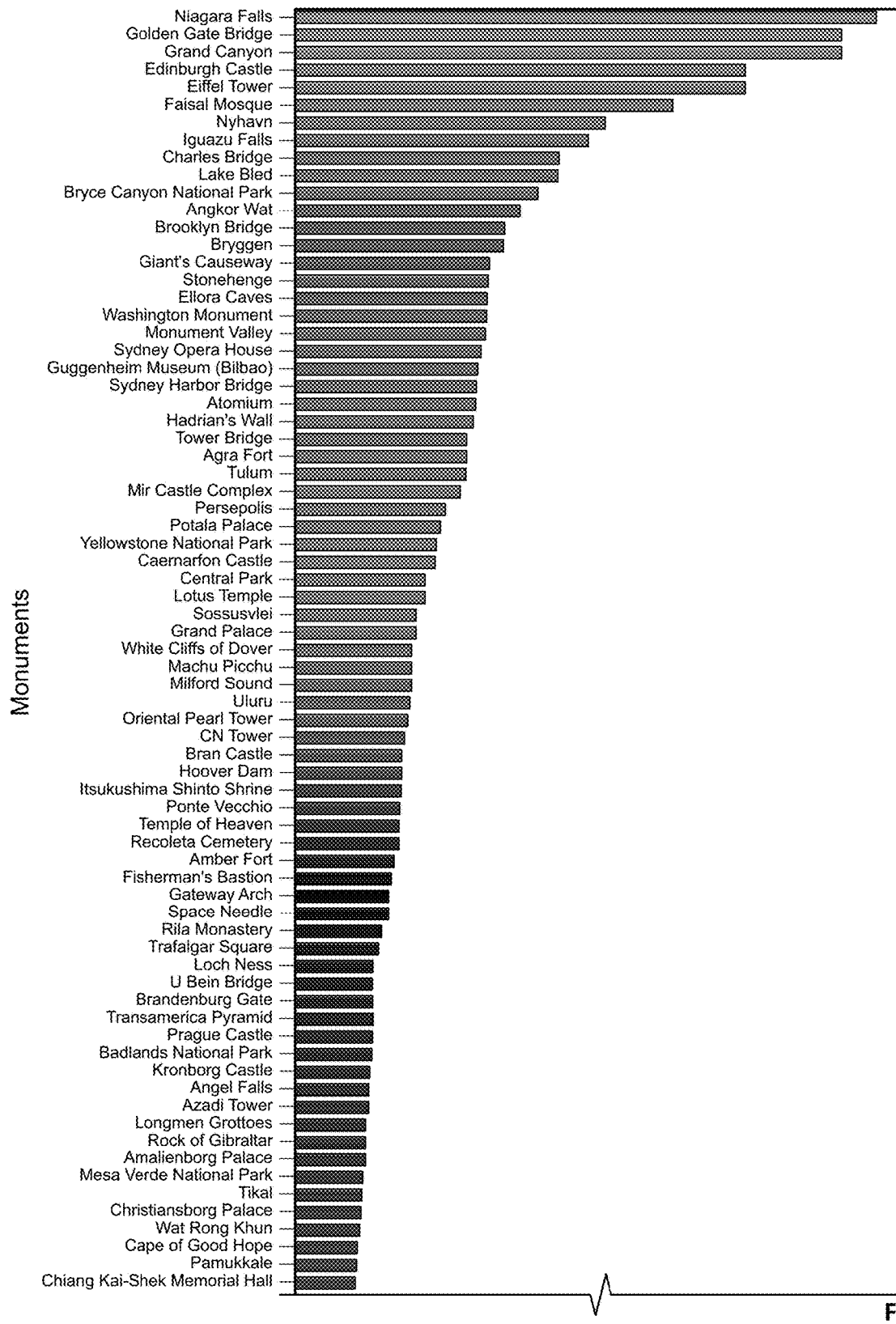
FIG. 15 illustrates a plot of a frequency of occurrence by count of landmarks in one or more datasets in accordance with one or more embodiments of the present disclosure.
Figure 15:
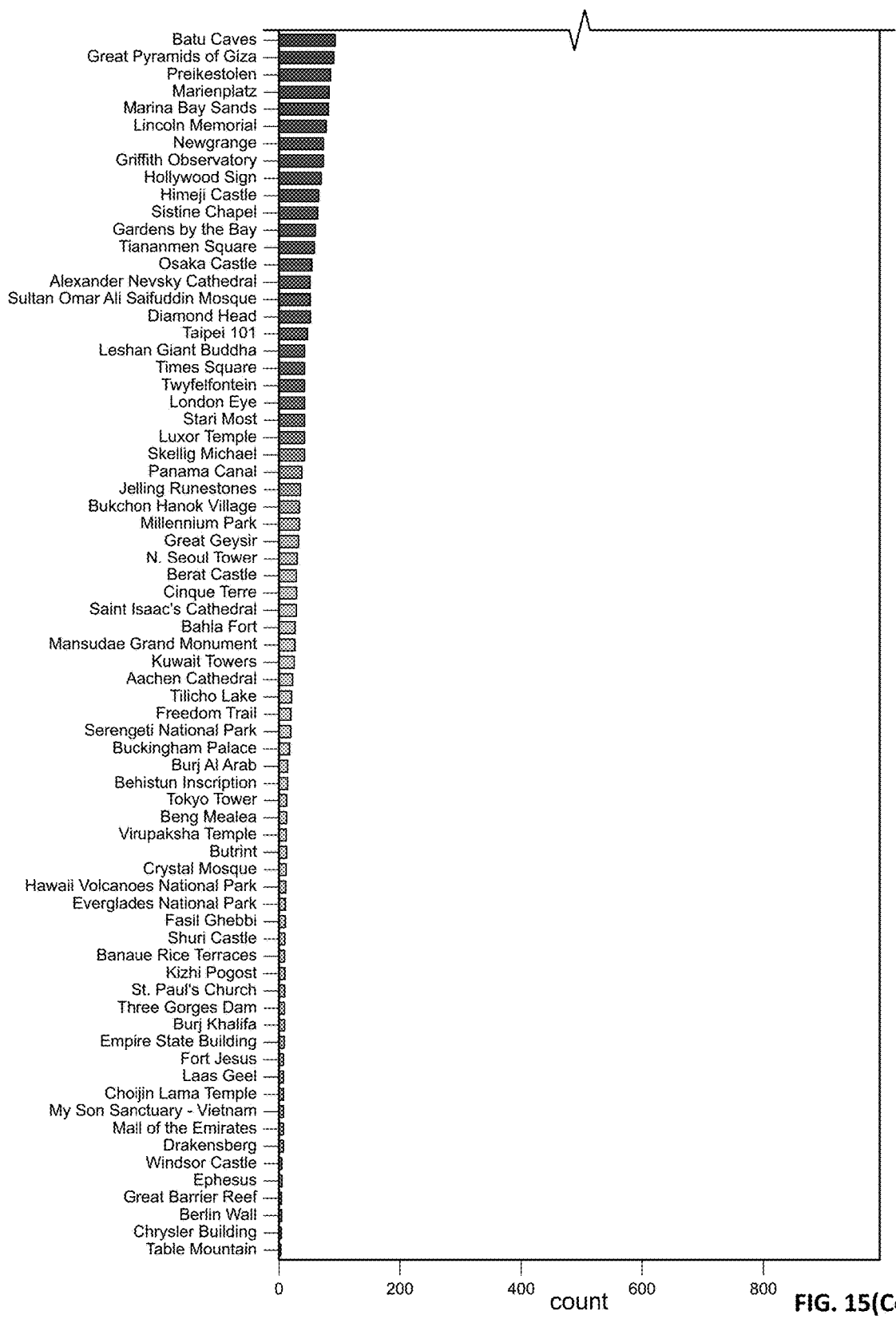
Figure 16:
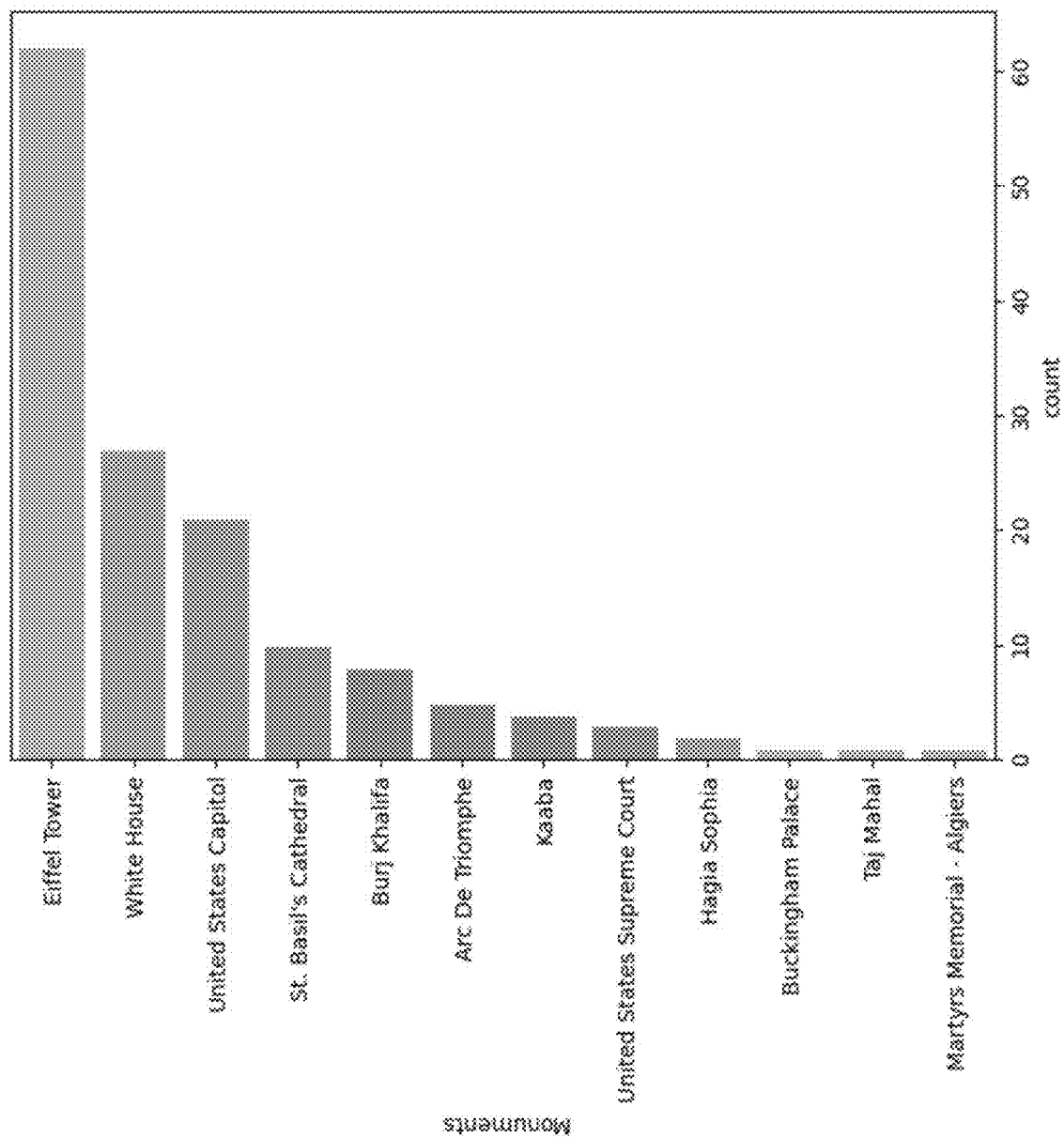
FIG. 16 illustrates a plot of a frequency of occurrence by count of landmarks in one or more datasets in accordance with one or more embodiments of the present disclosure.
Figure 17:
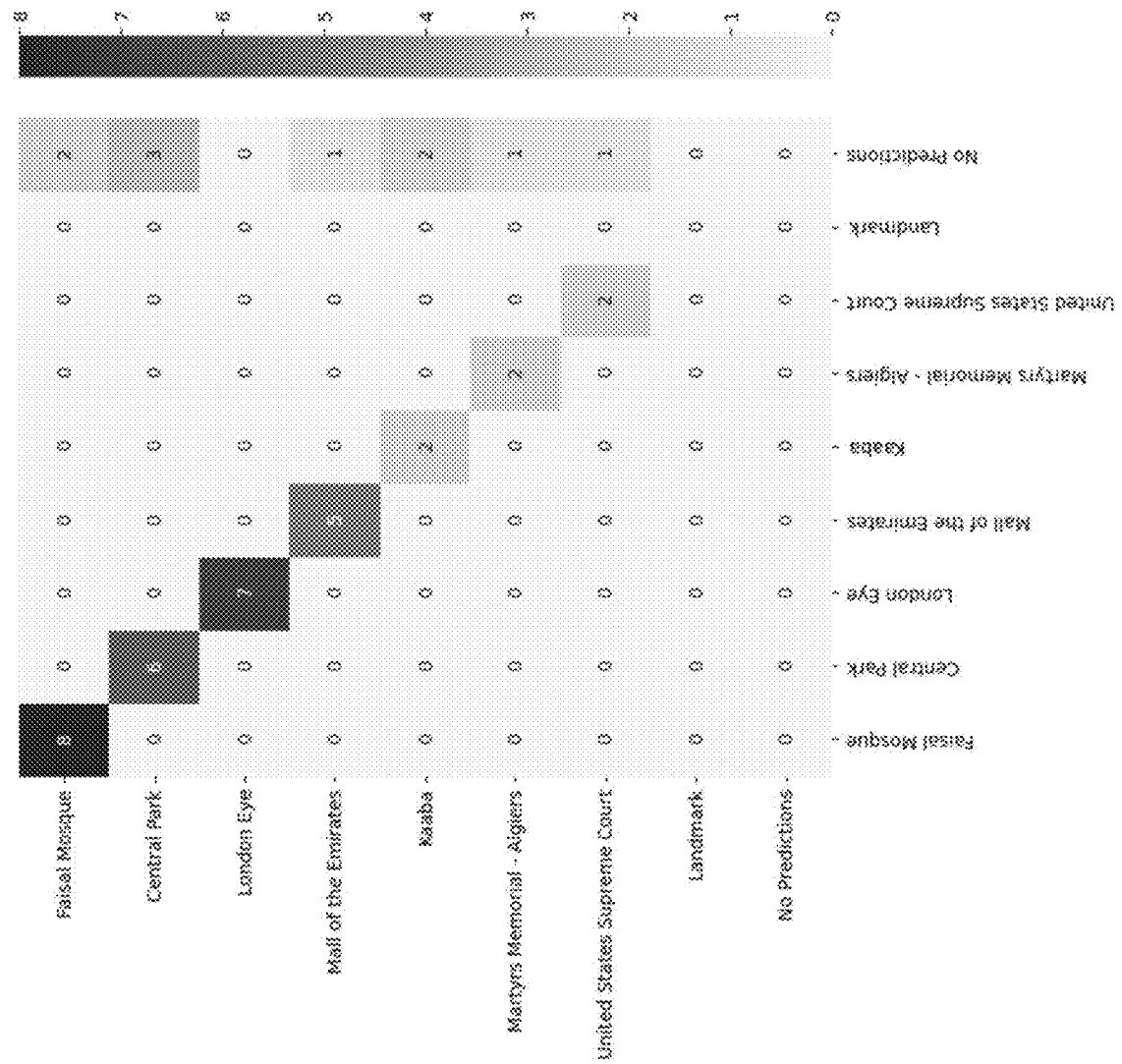
FIG. 17 depicts an example confusion matrix for a first machine learning-based landmark detection model in accordance with one or more embodiments of the present disclosure.
Figure 18:
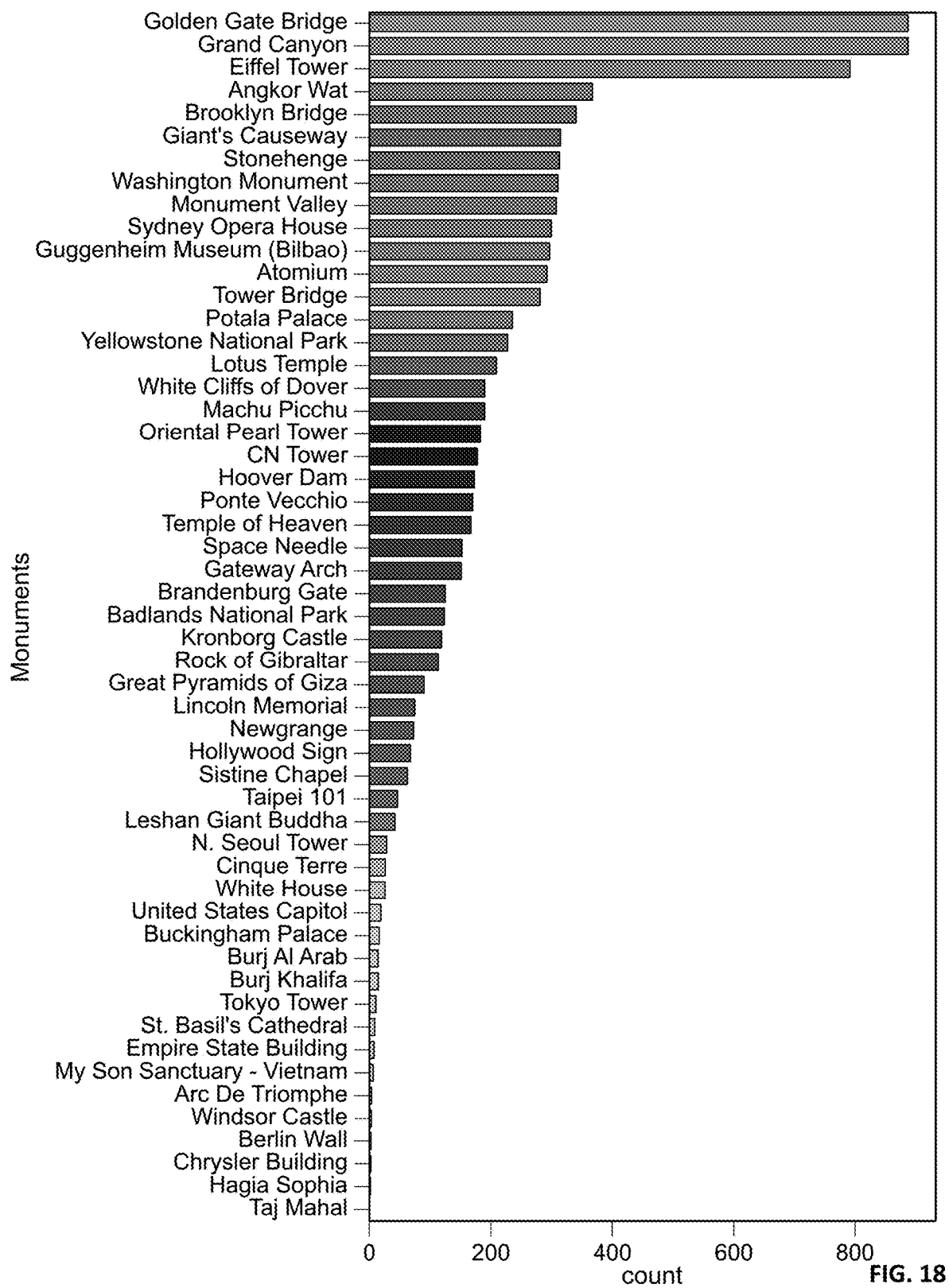
FIG. 18 illustrates a plot of a frequency of occurrence by count of landmarks in one or more datasets in accordance with one or more embodiments of the present disclosure.
Figure 19:
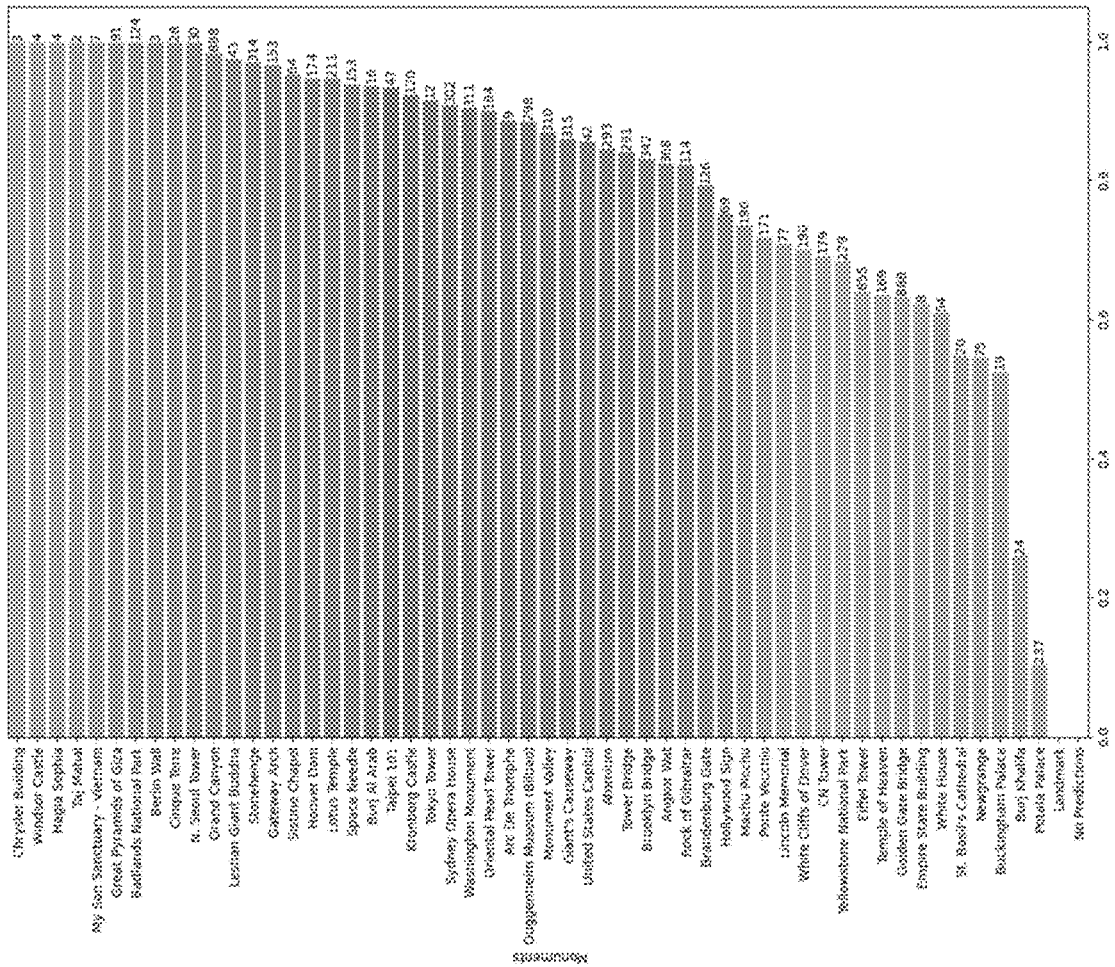
FIG. 19 illustrates a plot of a frequency of occurrence by count of landmarks in one or more datasets in accordance with one or more embodiments of the present disclosure.
Figure 20:
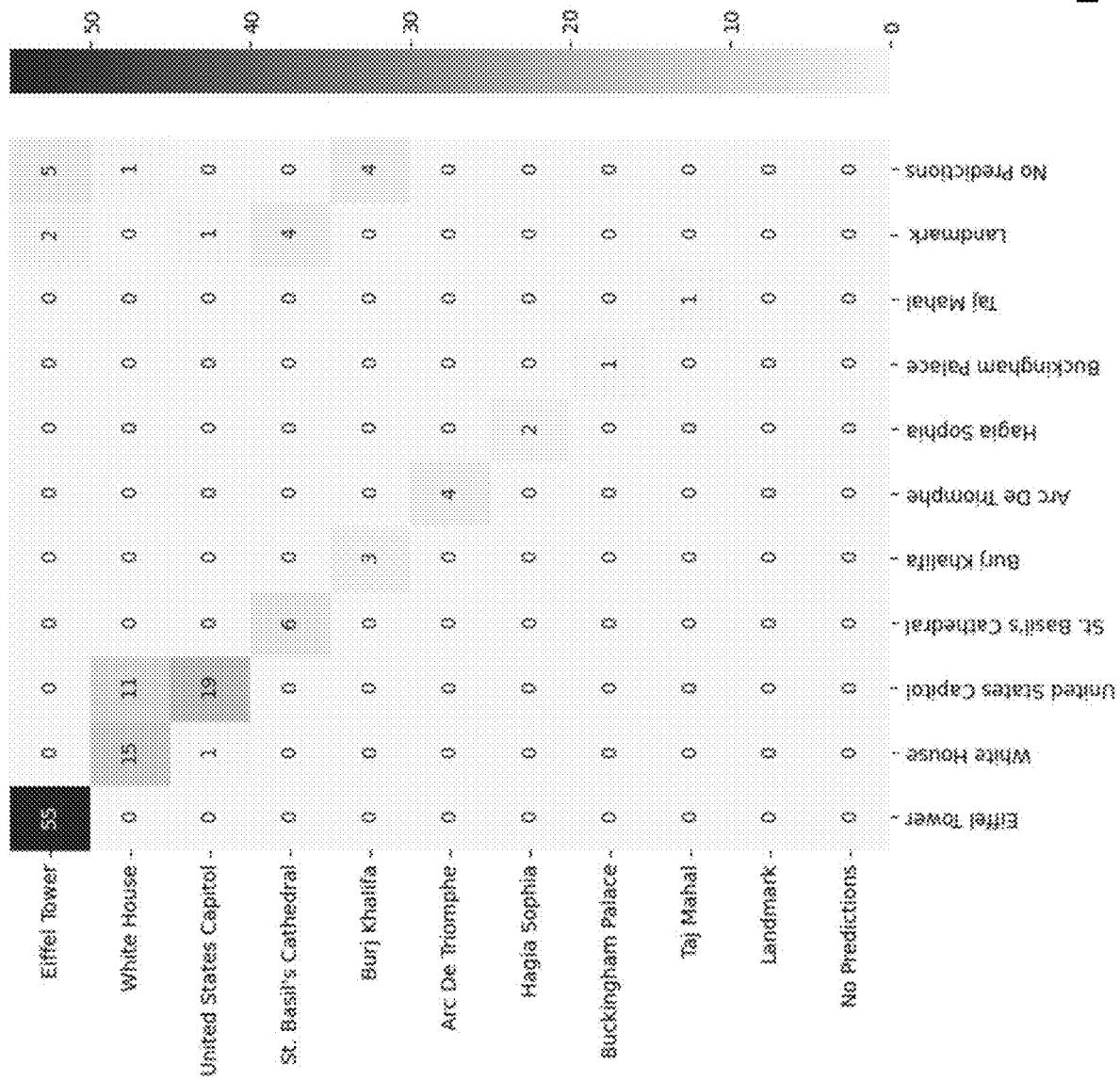
FIG. 20 depicts an example confusion matrix for a second machine learning-based landmark detection model in accordance with one or more embodiments of the present disclosure.
Figure 21:
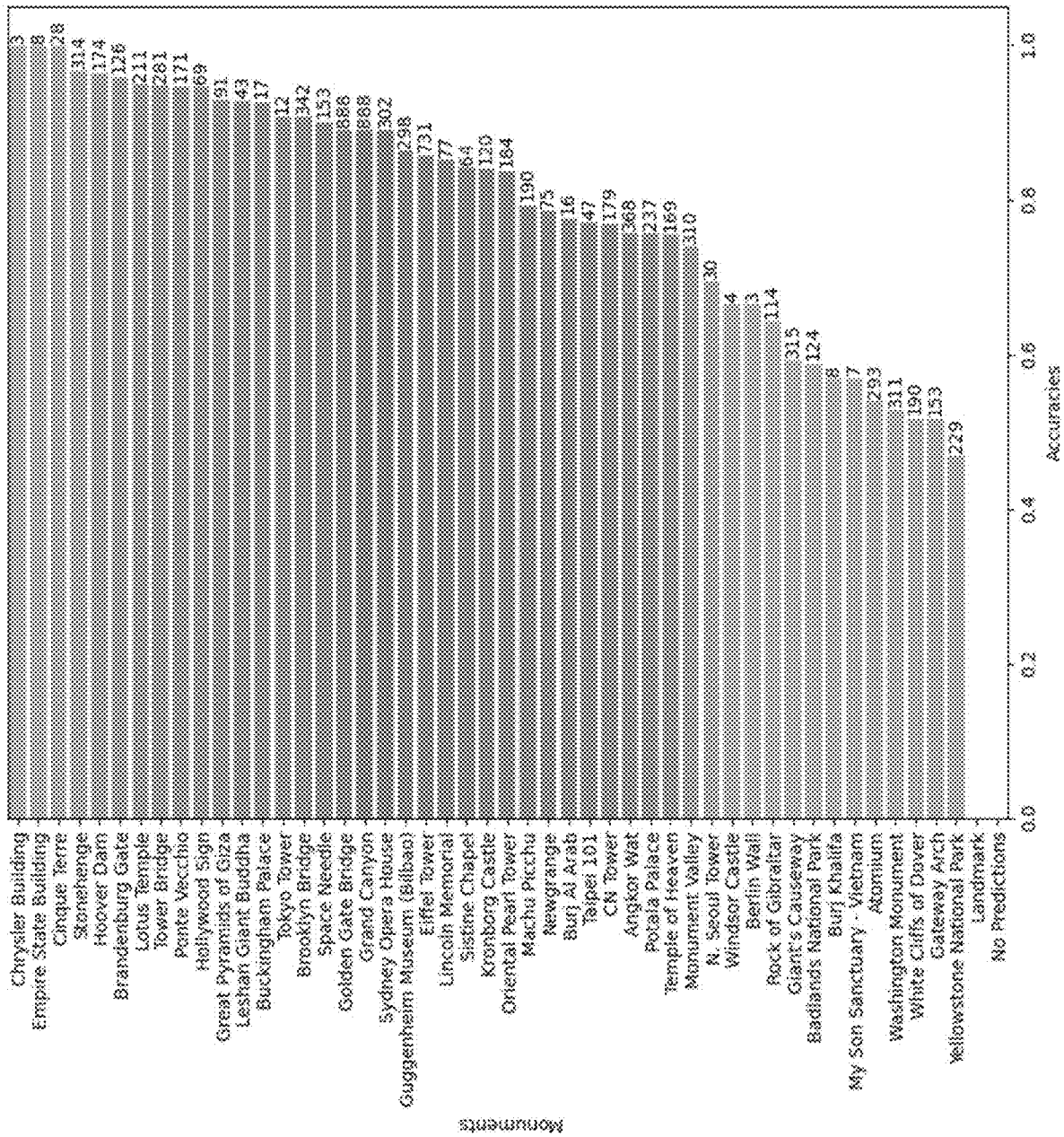
FIG. 21 illustrates a plot of a frequency of occurrence by count of landmarks in one or more datasets in accordance with one or more embodiments of the present disclosure.
Figure 22:
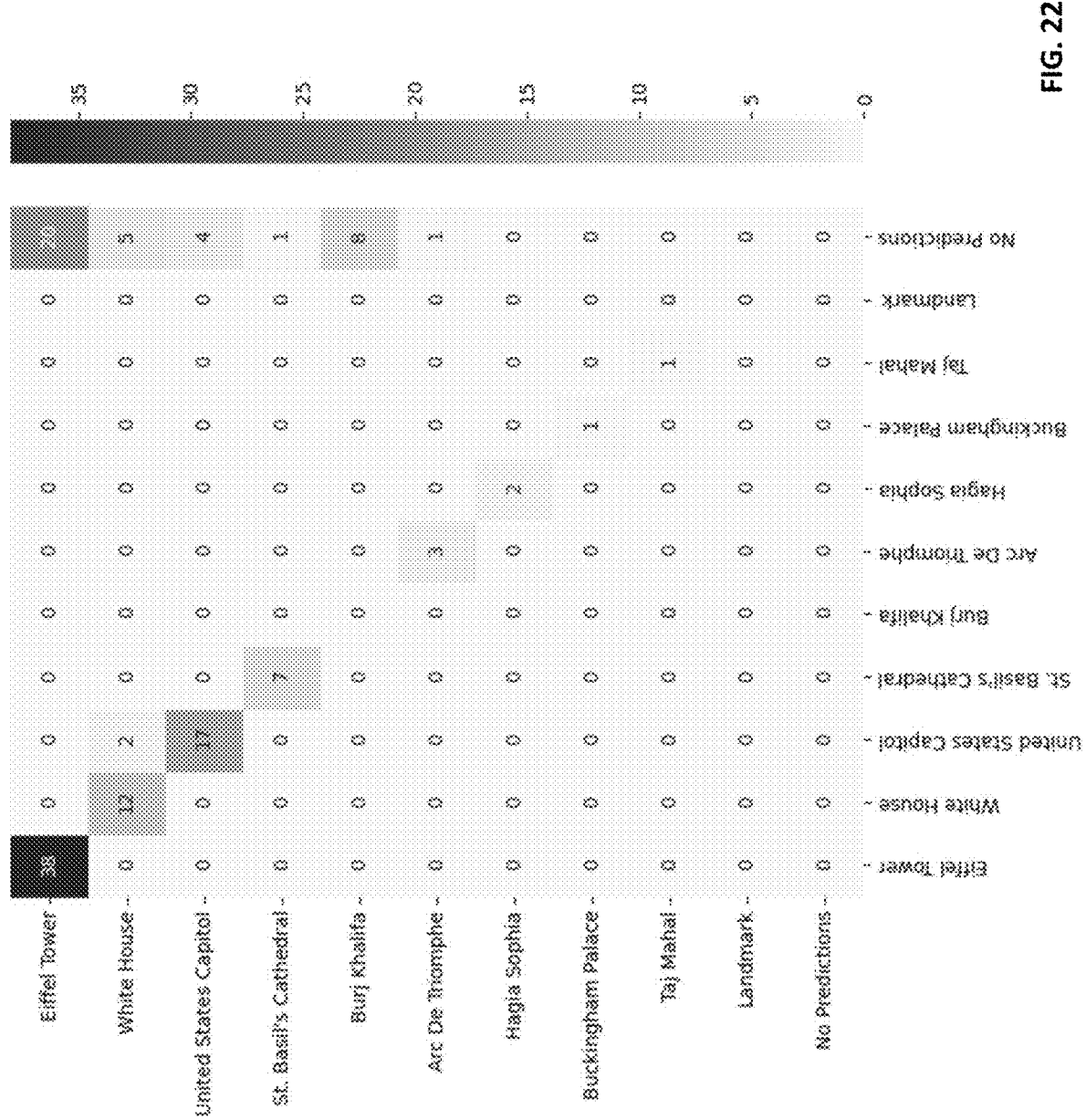
FIG. 22 depicts another example confusion matrix for the first machine learning-based landmark detection model in accordance with one or more embodiments of the present disclosure.
Figure 23:
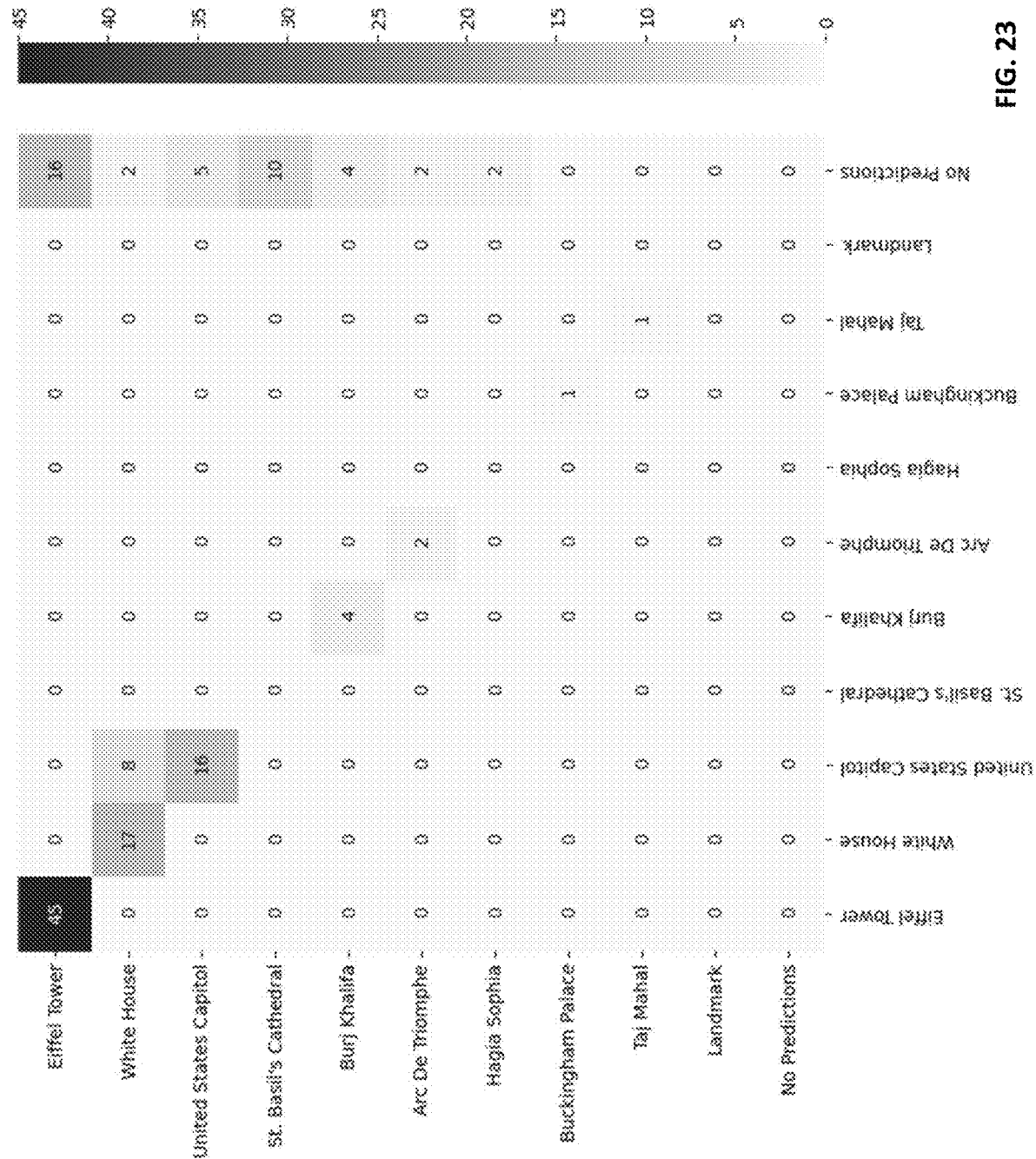
FIG. 23 depicts an example confusion matrix for a third machine learning-based landmark detection model in accordance with one or more embodiments of the present disclosure.
Figure 24:
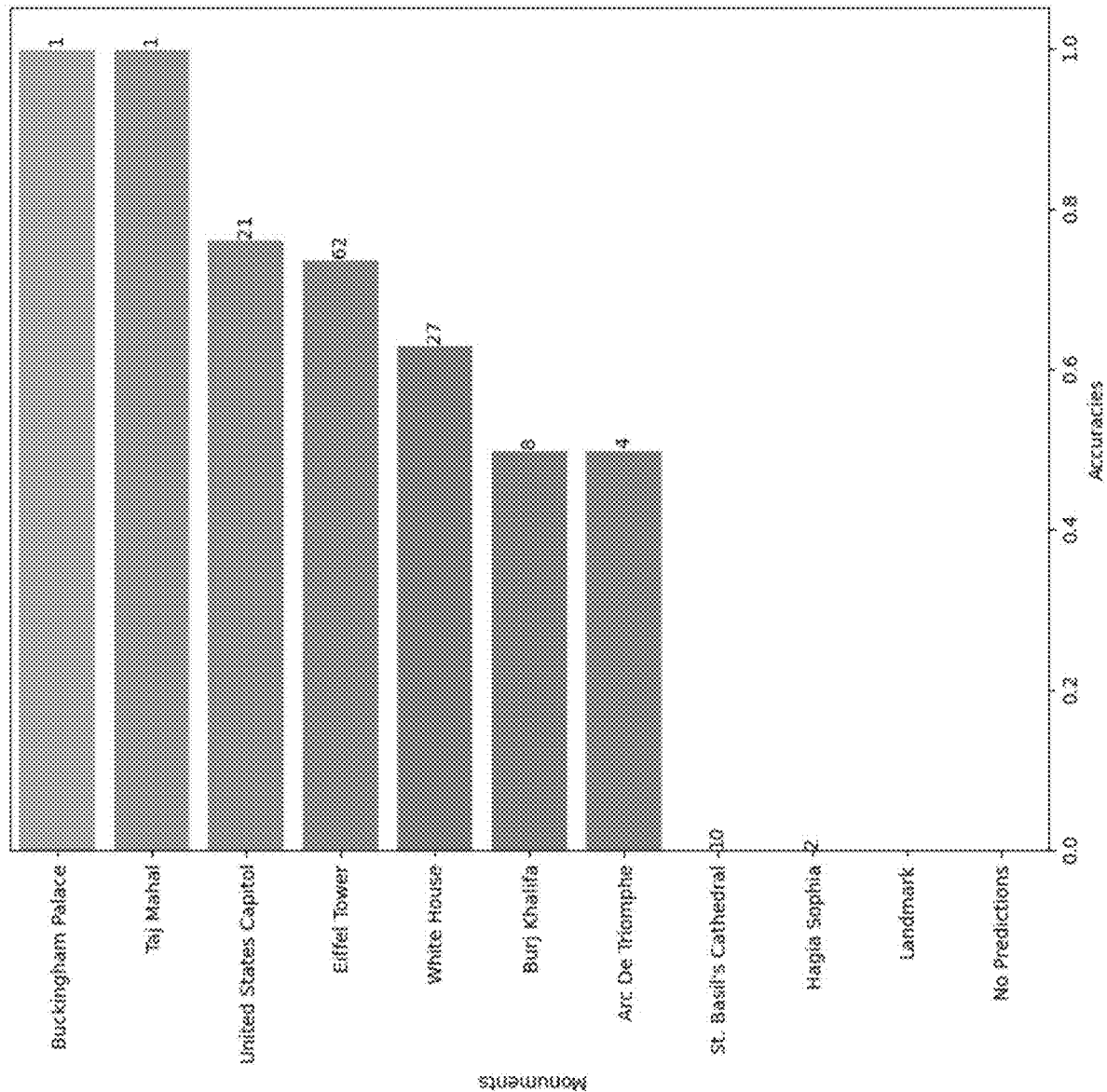
FIG. 24 illustrates a plot of detection accuracy by landmark in one or more datasets in accordance with one or more embodiments of the present disclosure.
Figure 25:
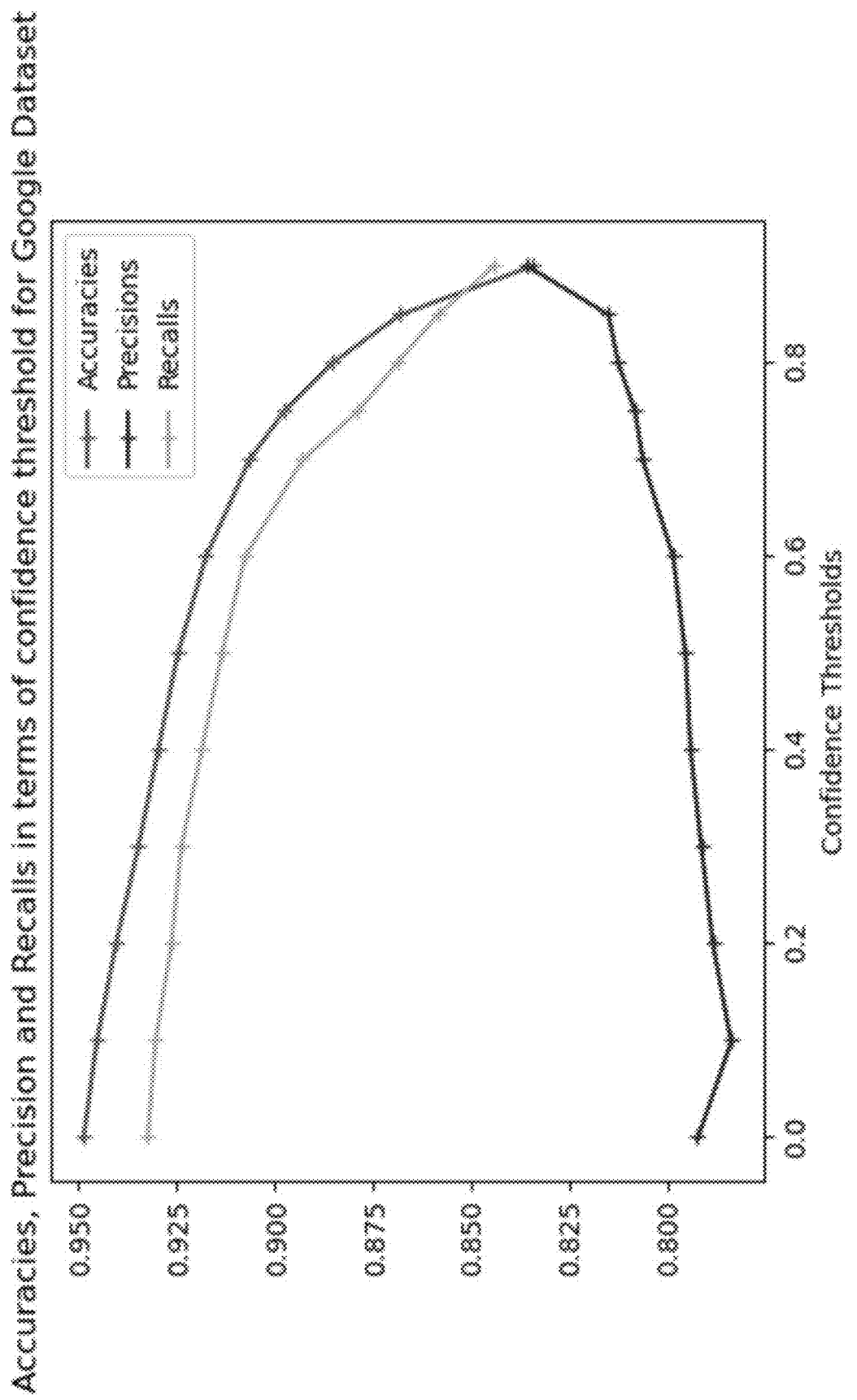
FIG. 25 illustrates a plot of performance in landmark detection of the landmark detection framework for a first data set in accordance with one or more embodiments of the present disclosure.

Referring now to FIG. 13 through 30, FIG. 13 depicts a flowchart of a landmark detection framework is depicted in accordance with one or more embodiments of the present disclosure. In FIG. 15, an exemplary cloud architecture for landmark detection is depicted in accordance with one or more embodiments of the present disclosure. In FIG. 15, a plot of a frequency of occurrence by count of landmarks in one or more datasets is depicted in accordance with one or more embodiments of the present disclosure. In FIG. 16, a plot of a frequency of occurrence by count of landmarks in one or more datasets is depicted in accordance with one or more embodiments of the present disclosure. In FIG. 17, an example confusion matrix for a first machine learning-based landmark detection model is depicted in accordance with one or more embodiments of the present disclosure. In FIG. 18, a plot of a frequency of occurrence by count of landmarks in one or more datasets is depicted in accordance with one or more embodiments of the present disclosure. In FIG. 19, a plot of a frequency of occurrence by count of landmarks in one or more datasets is depicted in accordance with one or more embodiments of the present disclosure. In FIG. 20, an example confusion matrix for a second machine learning-based landmark detection model is depicted in accordance with one or more embodiments of the present disclosure. In FIG. 21, a plot of a frequency of occurrence by count of landmarks in one or more datasets is depicted in accordance with one or more embodiments of the present disclosure. In FIG. 22, another example confusion matrix for the first machine learning-based landmark detection model is depicted in accordance with one or more embodiments of the present disclosure. In FIG. 23, an example confusion matrix for a third machine learning-based landmark detection model is depicted in accordance with one or more embodiments of the present disclosure. In FIG. 24, a plot of detection accuracy by landmark in one or more datasets is depicted in accordance with one or more embodiments of the present disclosure. In FIG. 25, a plot of performance in landmark detection of the landmark detection framework for a first data set is depicted in accordance with one or more embodiments of the present disclosure. In FIG. 26, a plot of performance in landmark detection of the landmark detection framework for a second data set is depicted in accordance with one or more embodiments of the present disclosure. In FIG. 27, another flowchart of a landmark detection framework is depicted in accordance with one or more embodiments of the present disclosure.

Landmark detection is a new cognitive feature to empower indexation capabilities. Detecting the landmark in an image also means the possibility of knowing the location of the shot media (city and country). Landmarks may refer to famous human-made buildings (monuments, bridges, temples, cathedrals, skyscrapers, etc.) or famous natural landscapes. There are thousands of landmarks around the world.

In some embodiments, the landmark detection framework may include one or more of several configurations using AI captioning. To enhance the performance of detection, a JSON file has been created to compile aliases of monuments names found in the results of AI captioning. In some embodiments, the base and large BLIP1 model may be tested. The text decoding strategies between Beam and Nucleus may also be tested. Nucleus may include a stochastic decoding strategies that generates more diverse results whereas Beam strategy generates safer and most likely responses. Such tests may be performed on the same datasets as described above. Performances are interesting to have with such a model. However, one drawback is that a dictionary of aliases and synonyms has to be created to find matching monuments. It can be seen as a model being fine-tuned each time after adding a new class.

Indeed, often when a journalist or producer is working on a story, they need to indicate to their audience WHERE the action is happening. Talking about new elections in the USA? One will surely need a shot of the Congress or the White House. A Secretary of State is visiting India? one'll likely look for a shot of the Taj Mahal with the Secretary of State's face visible. For a story on Harry and Meghan, oneit is likely one would want to cut to an aerial shot of Buckingham Palace. Need to talk about a tourism boom in Arizona? One will need shots of the Grand Canyon.

In some embodiments, landmark recognition may include obtaining image captions for an image, such as a still image or video frame. The image captions may be generated with a machine learning model such as BLIP 2801. Similar to detailed above, the caption may be augmented via semantic reconciliation, including named entity resolution 2803 whereby one or more machine learning models recognize the location, organization, person or other items or any combination thereof based on training of the model(s). Additionally, parts-of-speech may be tagged 2804 similar to as detailed above. Named entities may be matched to parts-of-speech, and the caption may be augmented to merge the named entities into the caption. In some embodiments, tagged nouns may be kept 2806, and words may be cleaned via a word cleaner 2807. In some embodiments, the word cleaner may, e.g., remove words less than 2 characters, remove stop words, remove specific predefined words, among other filters or any combination thereof.

In some embodiments, one or more landmark detection models and/or one or more aliases of monuments names (detailed above) may be trained and/or configured to identify one or more landmarks in the image for landmark detection 2805 (e.g., based on the captions, the image or both). The landmark name may be merged into the caption based on the parts of speech and then the labels may be postprocessed 2808. Postprocessing may include removing duplicates, removing words not in the English dictionary (or other language) or than for landmarks, among other post processing steps or any combination thereof.

In some embodiments, the landmark detection framework enables journalists and others to pull up the perfect shot of a landmark from their archive in less than 2 seconds.

Glossary a. Caption: descriptive text associated to an image
b. Image Captioning: Artificial Intelligence algorithm to generate a caption to an input image.
c. Image Text Matching: Artificial intelligence algorithm to compute a similarity score between an input image and an input text. The score is between 0 and 1 with 1 meaning a perfect similarity.

d. Google Vision: all Google cloud services for image and video analysis
e. Google Detect Landmarks API: One of Google Vision service, specific to the detection of landmarks. Returns Freebase ID or Google Knowledge Graph ID when a monument is detected.
f. AWS Rekognition: all AWS cloud services for image and video analysis AWS Detect Labels: One of AWS Rekognition service which can detect labels and also monuments.

In some embodiments, the landmark detection framework may recognize many famous landmarks (>400).

In some embodiments, the landmark detection framework may return a confidence score.

In some embodiments, the landmark detection framework may create or return an existing label from workspace thesaurus.

In some embodiments, the landmark detection framework may minimize costs.

In some embodiments, the landmark detection framework may be monitored: logs for costs, info and debug; ratio approved monuments.

In some embodiments, the landmark detection framework may be using higher resolution images to improve results from existing detection and recognition frameworks.

In some embodiments, the landmark detection framework may include a way to post process detection results: voting strategy (very unlikely to have two different landmarks in two consecutive frames), multimodal rules (TBD).

In some embodiments, the landmark detection framework may be connected to shot detection to limit the calls (pick key frames from one shot).

In some embodiments, the landmark detection framework may be part of the features around image captioning Add more famous monuments in our custom monuments detection (requires testing generated captions to check if aliases may be needed) One or more embodiments leverages the image captioning model to detect monuments. It is used because experiments showed it has good detection performances on a set of monuments. The idea is to use it to limit the API calls to Google Vision, hence to limits costs. The detection pipeline is detailed in the technical design.

In some embodiments, a new type of task is created once the ingest is done which may launch an instance. In some embodiments, the instance is used to distinguish images and videos media types. For images, the monument detection is done in another lambda. For video media type, batch jobs with GPU are launched. In some embodiments, the landmark recognition framework may use the instance for images to avoid the boot time from batch processing (e.g., 3 to 6 minutes). The container includes the detection pipeline detailed in the technical design.

In some embodiments, the landmark recognition framework may have 5 main steps:
a. Generate the captions from the input image
b. Check if the monument or an alias of the monument is within the caption. If so, we return this result
c. If we don't find a monument: check if the caption has a candidate word referring to a monument or landmark (building, tower, temple . . . ). If we don't find a candidate word, the detection is over and we return that no landmark was detected.
d. If we find a candidate word, we use image text matching to get a landmark prediction from a limited list of monuments. If the prediction confidence score is above a threshold to define, the container returns the monument with its freebase or Google Knowledge Graph ID.
e. If the prediction score is under the confidence threshold to define, the container calls Google Vision Detect Landmarks API. Confidence score, detected monument ID, name and detection method are returned for monitoring purposes.

In some embodiments, for video media, a first algorithm of content-based shot detection is used. For each shot, 3 frames are retrieved at 25%, 50% and 75% of the shot timestamp. On each of the three frames, the monument detection pipeline is launched sequentially. If a monument is detected, the occurrence will have the associated timestamps of the shot.

In some embodiments, the task is customizable for future use cases using a parameter to choose to use monument detection or not.

Regarding the identifiers, Google Vision returns Freebase or Google Knowledge Graph ID which also can be searchable in with a Wikidata query. For the custom list of landmarks that the solution is able to recognize without Google Vision, a dictionary of monuments with their Wikidata ID will be manually created.

In some embodiments, inputs of the image may be workspace_uid, media_id, media_type, boolean value for using monument detection feature.

In some embodiments, image captioning and image text matching may be two separated models that are packaged in a single model to avoid two model loading time (30 seconds to load one model).

Monuments Aliases and Monuments Wikidata ID may be one JSON with the following schema:

```
{
"Eiffel Tower":{
"wikidata_id": "q243",
"aliases": ["eiffr tower", "eiff tower",...]
}
"Burj Khalifa": ...
}
```

In some embodiments, using API to access MongoDB, occurrences of detected monuments are stored in LabelOccurences table with confidence score, "proposed" status, timestamps, the Landmarks Detection Review 7 type of detection information ("google_vision", "newsbridge_caption", "newsbridge_itm" in source category maybe?). Generated captions may be stored in Annotations table with a new category "caption" which is not displayed to the user.

In some embodiments, the landmark recognition framework may including modifying the prompt for an image were the Eiffel Tower was not detected. Instead of having the based prompt set to "a picture of", it was replaced by "a picture of the monument of". It doesn't detect the Eiffel Tower: Caption generated with default prompt: "the author on his television show"/"the president of france"/"a man wearing a grey suit and standing next to a river with a bridge and" Caption with modified prompt: "paris in the middle of the night"/"paris taken from an abc news report source"/ "paris with an image of jean-georges de lavelet and"

Image Text Matching (ITM):

In some embodiments, during training of models such as BLIP or CLIP, the image and the associated caption are embedded in a feature space so that vectors representing image and associated caption are really close and similar. The idea of the approach here is to compute the similarity between vectors of pre-generated monuments captions ("a picture of the Eiffel tower") with the one of the image.

In some embodiments, the landmark recognition framework may exhibit a great boost in accuracy relative to conventional techniques.

In some embodiments, the landmark recognition framework may exhibit confidence scores with a low risk of false positives (false positives usually have confidence score close to the ground truth one).

In some embodiments, the landmark recognition framework may be used where the user needs to detect a limited set of monuments.

In some embodiments, the confidence threshold may be defined following tests in a real case scenario. For instance, this plot shows performance depending on different confidence threshold on the Google dataset. We can see that the precision (representing the false positive rate) doesn't evolve much at lower thresholds. We want to have a trade of between accuracy recall and precision so a good start for a confidence threshold could be a value between 0.5 and 0.9.

Figures 28A, 28B:
FIGS. 28A and 28B depict an example shot description based on outputs of the AI pipeline for a video shot in accordance with one or more embodiments of the present disclosure.

Referring now to FIG. 28A and 28B depict an example shot description based on outputs of the AI pipeline for a video shot is depicted in accordance with one or more embodiments of the present disclosure.

Figure 29:
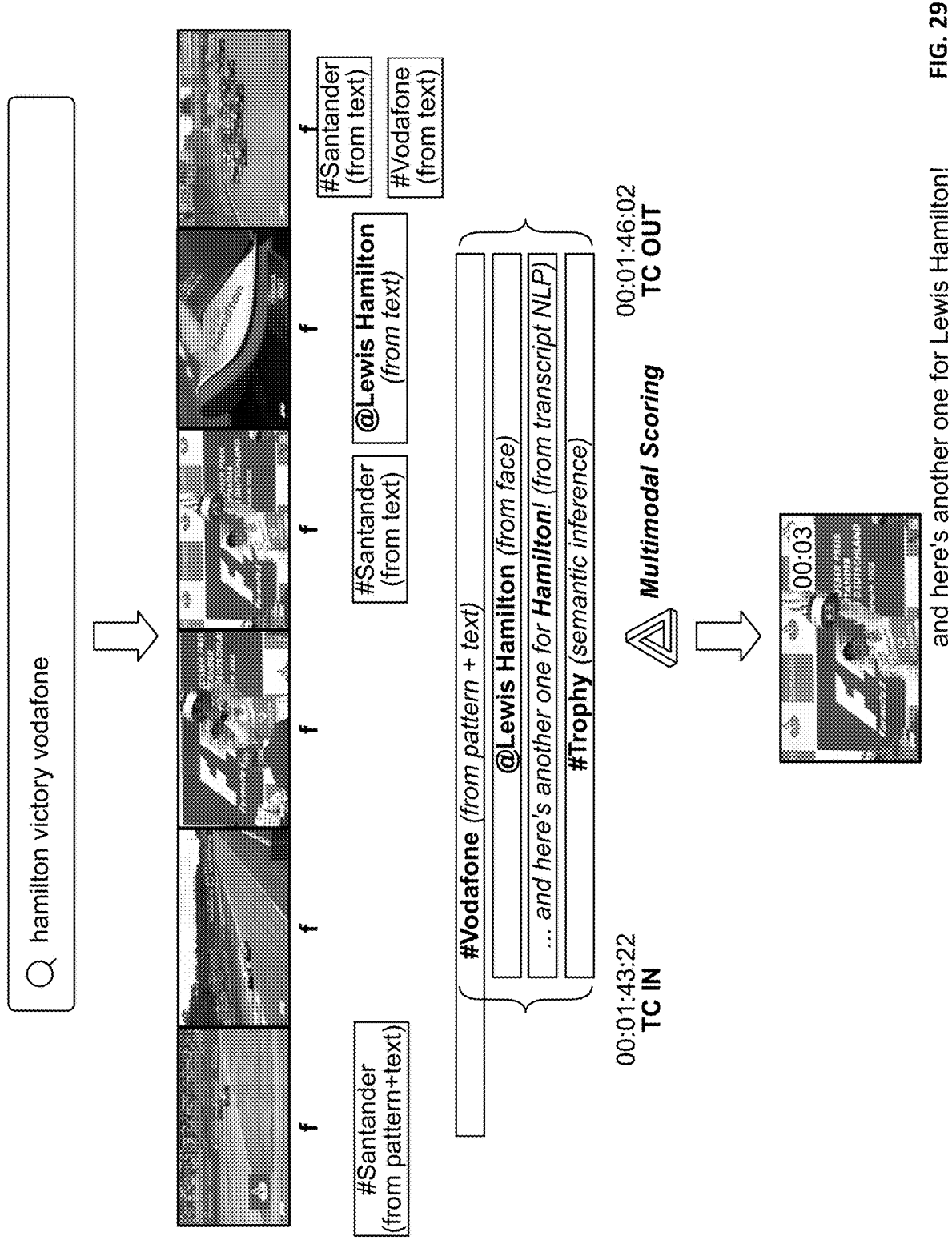
FIG. 29 illustrates operation of the video shot search platform 110 in matching a search query to a video shot in accordance with one or more embodiments of the present disclosure.

Referring now to FIG. 29, operation of the video shot search platform 110 in matching a search query to a video shot is depicted in accordance with one or more embodiments of the present disclosure.

Figure 30:
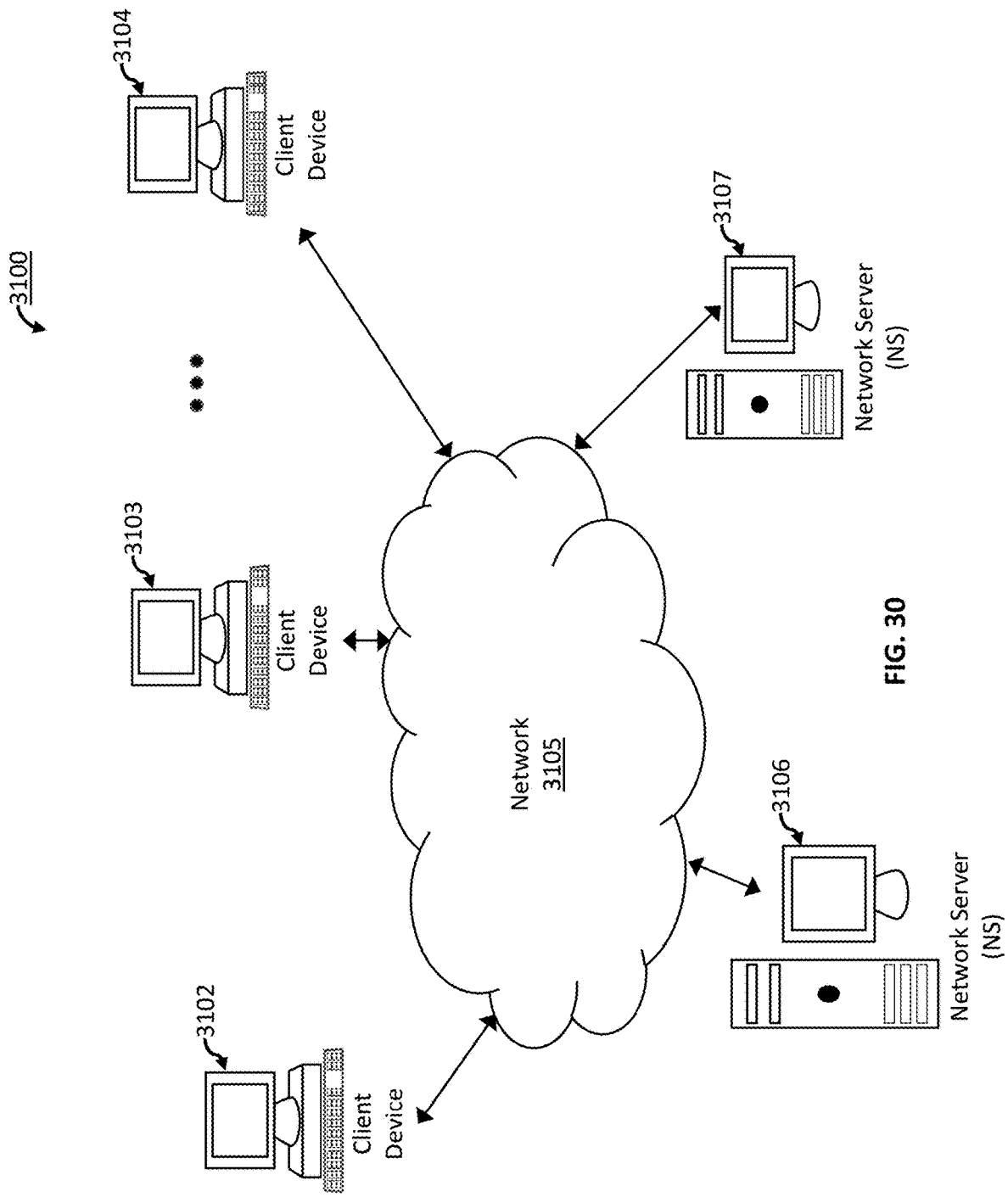
FIG. 30 depicts a block diagram of an exemplary computer-based system and platform for AI-accelerated video shot search in accordance with one or more embodiments of the present disclosure.

FIG. 30 depicts a block diagram of an exemplary computer-based system and platform 3100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 3100 may be configured to manage a large number of members and concurrent transactions, as detailed herein. In some embodiments, the exemplary computer-based system and platform 3100 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 30, client device 3102, client device 3103 through client device 3104 (e.g., clients) of the exemplary computer-based system and platform 3100 may include virtually any computing device capable of receiving and sending a message over a network (e.g., cloud network), such as network 3105, to and from another computing device, such as servers 3106 and 3107, each other, and the like. In some embodiments, the client devices 3102 through 3104 may be personal computers, multiprocessor systems, microprocessor-based or programmable consumer electronics, network PCs, and the like. In some embodiments, one or more client devices within client devices 3102 through 3104 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 3102 through 3104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 3102 through 3104 may include may run one or more applications, such as Internet browsers, mobile applications, voice calls, video games, videoconferencing, and email, among others. In some embodiments, one or more client devices within client devices 3102 through 3104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 3102 through 3104 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 3102 through 3104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 3105 may provide network access, data transport and/or other services to any computing device coupled to it. In some embodiments, the exemplary network 3105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 3105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 3105 may include and implement, as an alternative or in conjunction with one or more of the above, a WiMAX architecture defined by the WiMAX forum. In some embodiments and, optionally, in combination of any embodiment described above or below, the exemplary network 3105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 3105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 3105 may also include mass storage, such as network attached storage (NAS), a storage area network (SAN), a content delivery network (CDN) or other forms of computer or machine readable media.

In some embodiments, the exemplary server 3106 or the exemplary server 3107 may be a web server (or a series of servers) running a network operating system, examples of which may include but are not limited to Apache on Linux or Microsoft IIS (Internet Information Services). In some embodiments, the exemplary server 3106 or the exemplary server 3107 may be used for and/or provide cloud and/or network computing. Although not shown in FIG. 30, in some embodiments, the exemplary server 3106 or the exemplary server 3107 may have connections to external systems like email, SMS messaging, text messaging, ad content providers, etc. Any of the features of the exemplary server 3106 may be also implemented in the exemplary server 3107 and vice versa.

In some embodiments, one or more of the exemplary servers 3106 and 3107 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 3101 through 3104.

In some embodiments and, optionally, in combination of any embodiment described above or below, for example, one or more exemplary computing client devices 3102 through 3104, the exemplary server 3106, and/or the exemplary server 3107 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 31:
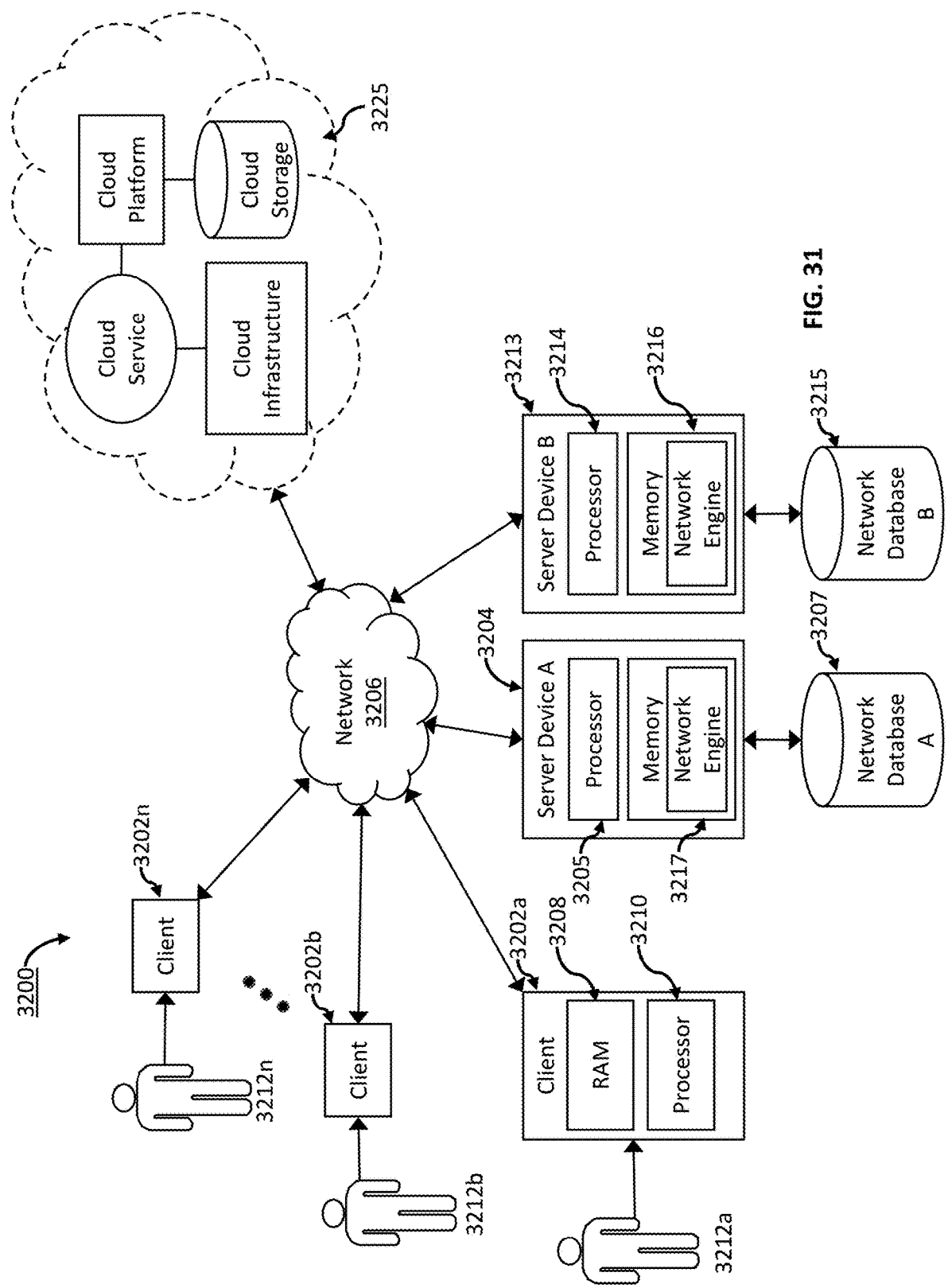
FIG. 31 depicts a block diagram of another exemplary computer-based system and platform for AI-accelerated video shot search in accordance with one or more embodiments of the present disclosure.

FIG. 31 depicts a block diagram of another exemplary computer-based system and platform 3200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 3202a, client device 3202b through client device 3202n shown each at least includes a computer-readable medium, such as a random-access memory (RAM) 3208 coupled to a processor 3210 or FLASH memory. In some embodiments, the processor 3210 may execute computer-executable program instructions stored in memory 3208. In some embodiments, the processor 3210 may include a microprocessor, an ASIC, and/or a state machine. In some embodiments, the processor 3210 may include, or may be in communication with, media, for example computer-readable media, which stores instructions that, when executed by the processor 3210, may cause the processor 3210 to perform one or more steps described herein. In some embodiments, examples of computer-readable media may include, but are not limited to, an electronic, optical, magnetic, or other storage or transmission device capable of providing a processor, such as the processor 3210 of client device 3202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 3202a through 3202n may also comprise a number of external or internal devices such as a mouse, a CD-ROM, DVD, a physical or virtual keyboard, a display, or other input or output devices. In some embodiments, examples of client devices 3202a through 3202n (e.g., clients) may be any type of processor-based platforms that are connected to a network 3206 such as, without limitation, personal computers, digital assistants, personal digital assistants, smart phones, pagers, digital tablets, laptop computers, Internet appliances, and other processor-based devices. In some embodiments, client devices 3202a through 3202n may be specifically programmed with one or more application programs in accordance with one or more principles/methodologies detailed herein. In some embodiments, client devices 3202a through 3202n may operate on any operating system capable of supporting a browser or browser-enabled application, such as Microsoft™, Windows™, and/or Linux. In some embodiments, client devices 3202a through 3202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 3202a through 3202n, user 3212a, user 3212b through user 3212n, may communicate over the exemplary network 3206 with each other and/or with other systems and/or devices coupled to the network 3206. As shown in FIG. 31, exemplary server devices 3204 and 3213 may include processor 3205 and processor 3214, respectively, as well as memory 3217 and memory 3216, respectively. In some embodiments, the server devices 3204 and 3213 may be also coupled to the network 3206. In some embodiments, one or more client devices 3202a through 3202n may be mobile clients.

In some embodiments, at least one database of exemplary databases 3207 and 3215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 32:
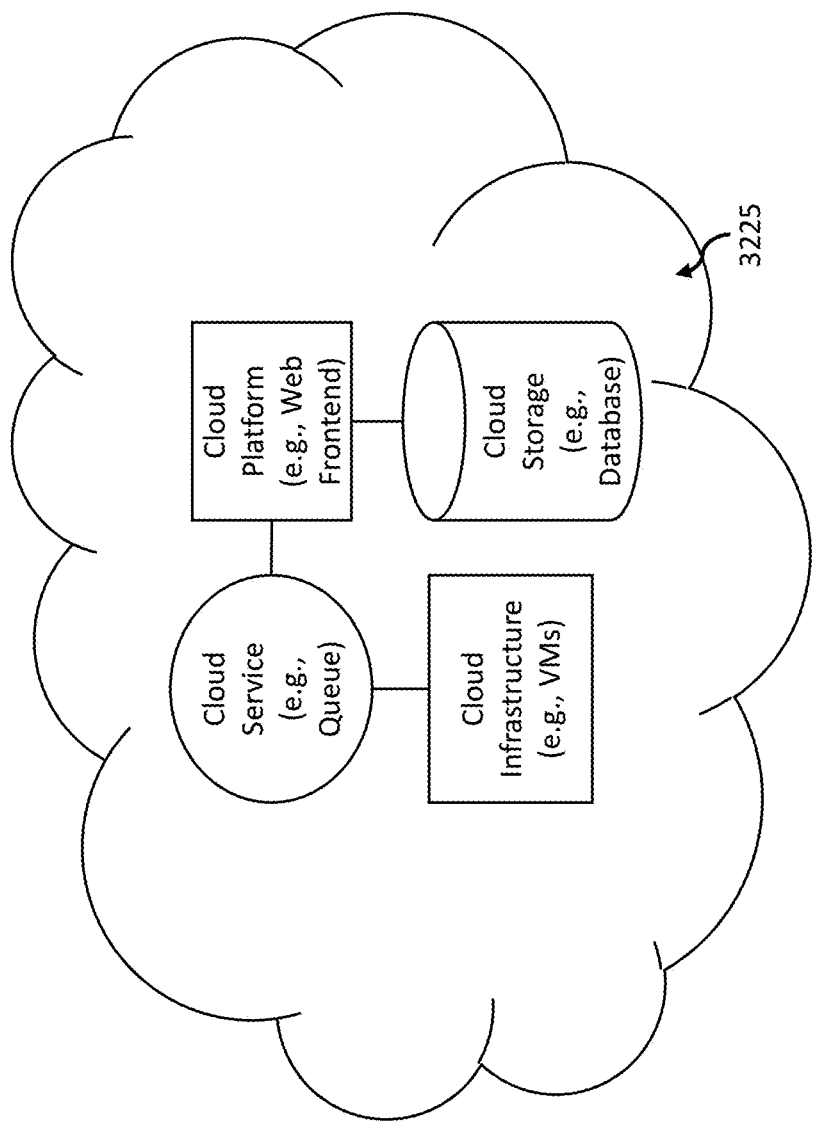
FIG. 32 depicts illustrative schematics of an exemplary implementation of the cloud computing/architecture(s) in which embodiments of a system for AI-accelerated video shot search may be specifically configured to operate in accordance with some embodiments of the present disclosure.
Figure 33:
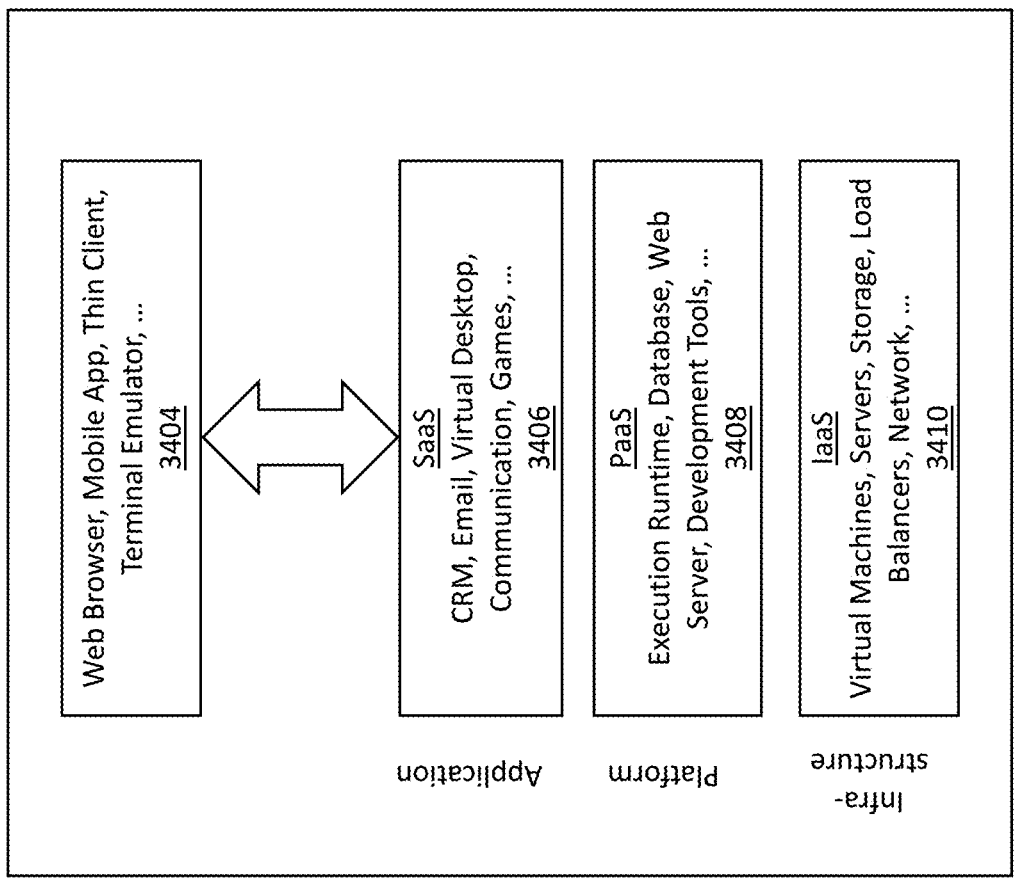
FIG. 33 depicts illustrative schematics of another exemplary implementation of the cloud computing/architecture(s) in which embodiments of a system for AI-accelerated video shot search may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 3225 such as, but not limiting to: infrastructure a service (IaaS) 3410, platform as a service (PaaS) 3408, and/or software as a service (SaaS) 3406 using a web browser, mobile app, thin client, terminal emulator or other endpoint 3404. FIGS. 32 and 33 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Embodiments of the present disclosure may include any one or more of the following clauses:

Clause 1. A method comprising: receiving, by at least one processor, a digital video comprising a sequence of a plurality of video frames; inputting, by the at least one processor, at least one video frame into a video frame encoder to output at least one video frame vector for the at least one video frame; determining, by the at least one processor, a similarity value between the at least one video frame and at least one adjacent video frame in the sequence based at least in part on a similarity between the at least one video frame vector and at least one adjacent video frame vector of the at least one adjacent video frame; determining, by the at least one processor, at least one scene within the sequence of the plurality of video frames based at least in part on: the similarity value, and a similarity threshold value; wherein the at least one scene comprises at least one sub-sequence of adjacent video frames; inputting, by the at least one processor, each video frame of the at least one scene into a plurality of expert machine learning models to output a plurality of expert machine learning model-specific labels associated with the at least one scene; determining, by the at least one processor, a plurality of expert machine learning model-specific markup tags associated with the plurality of expert machine learning models; and generating, by the at least one processor, at least one scene text-based markup for the at least one scene comprising the plurality of expert machine learning-specific markup tags and the plurality of expert machine learning-specific labels associated with the at least one scene.

Clause 2. The method of clause 1, further comprising: inputting, by the at least one processor, a plurality of video frames into a video frame encoder to output a plurality of video frame vectors; generating, by the at least one processor, an aggregate video frame vector for the plurality of video frame vectors; determining, by the at least one processor, a shot similarity value between the aggregate video frame vector and at least one adjacent aggregate video frame vector of an adjacent plurality of video frames in the sequence; and determining, by the at least one processor, a scene comprising the plurality of video frames and the adjacent plurality of video frames based at least in part on the shot similarity value exceeding a threshold value.

Clause 3. The method of clause 2, further comprising: inputting, by the at least one processor, the scene into a scene classifier neural network to output at least one shot type based at least in part on a plurality of trained neural network parameters.

Clause 4. The method of clause 1, further comprising: indexing, by the at least one processor, the at least one sub-sequence of video frames of the at least one scene using the at least one scene markup.

Clause 5. The method of clause 4, further comprising: searching, by the at least one processor, the at least one scene markup, using the index, based on a search query comprising plain text.

Clause 6. The method of clause 4, further comprising: receiving, by at least one processor, a search query comprising plain text; encoding, by the at least one processor, the search query into a search vector using at least one semantic embedding model; encoding, by the at least one processor, the at least one scene text-based markup into a destination vector using the at least one semantic embedding model; and searching, by the at least one processor, the at least one destination vector with the search vector based at least in part on a measure of similarity between the search vector and the destination vector.

Clause 7. The method of clause 1, further comprising: increasing, by the at least one processor, upon determining that a first expert machine learning model-specific label of the plurality of expert machine learning model-specific labels matches a second expert machine learning model-specific label of the plurality of expert machine learning model-specific labels, an expert machine learning model-specific label confidence score of at least one of at least one of the first expert machine learning model-specific label or the second expert machine learning model-specific label by at least one rule; and confirming, by the at least one processor, the at least one of at least one of the first expert machine learning model-specific label or the second expert machine learning model-specific label by at least one rule based at least in part on the expert machine learning model-specific label confidence score exceeding a threshold.

Clause 8. The method of clause 7, wherein the at least one rule is user configurable.

Clause 9. The method of clause 1, further comprising: querying, by the at least one processor, at least one external data source with at least one expert machine learning model-specific label of the plurality of expert machine learning model-specific labels; receiving, by the at least one processor, property data associated with the at least one expert machine learning model-specific label from the at least one external data source in response; and modifying, by the at least one processor, the at least one scene text-based markup to include metadata comprising the property data.

Clause 10. The method of clause 1, wherein the video is live-streamed and the indexing is in real-time.

Clause 11. A system comprising: At least one processor that is configured to: receive a digital video comprising a sequence of a plurality of video frames; input at least one video frame into a video frame encoder to output at least one video frame vector for the at least one video frame; determine a similarity value between the at least one video frame and at least one adjacent video frame in the sequence based at least in part on a similarity between the at least one video frame vector and at least one adjacent video frame vector of the at least one adjacent video frame; determine at least one scene within the sequence of the plurality of video frames based at least in part on: the similarity value, and a similarity threshold value; wherein the at least one scene comprises at least one sub-sequence of adjacent video frames; input each video frame of the at least one scene into a plurality of expert machine learning models to output a plurality of expert machine learning model-specific labels associated with the at least one scene; determine a plurality of expert machine learning model-specific markup tags associated with the plurality of expert machine learning models; and generate at least one scene text-based markup for the at least one scene comprising the plurality of expert machine learning-specific markup tags and the plurality of expert machine learning-specific labels associated with the at least one scene.

Clause 12. The system of clause 11, wherein the at least one processor is further configured to: input a plurality of video frames into a video frame encoder to output a plurality of video frame vectors; generate an aggregate video frame vector for the plurality of video frame vectors; determine a shot similarity value between the aggregate video frame vector and at least one adjacent aggregate video frame vector of an adjacent plurality of video frames in the sequence; and determine a scene comprising the plurality of video frames and the adjacent plurality of video frames based at least in part on the shot similarity value exceeding a threshold value.

Clause 13. The system of clause 12, wherein the at least one processor is further configured to: input the scene into a scene classifier neural network to output at least one shot type based at least in part on a plurality of trained neural network parameters.

Clause 14. The system of clause 11, wherein the at least one processor is further configured to: index the at least one sub-sequence of video frames of the at least one scene using the at least one scene markup.

Clause 15. The system of clause 14, wherein the at least one processor is further configured to: search the at least one scene markup, using the index, based on a search query comprising plain text.

Clause 16. The system of clause 14, wherein the at least one processor is further configured to: receiving, by at least one processor, a search query comprising plain text; encode the search query into a search vector using at least one semantic embedding model; encode the at least one scene text-based markup into a destination vector using the at least one semantic embedding model; and search the at least one destination vector with the search vector based at least in part on a measure of similarity between the search vector and the destination vector.

Clause 17. The system of clause 11, wherein the at least one processor is further configured to: increase upon determining that a first expert machine learning model-specific label of the plurality of expert machine learning model-specific labels matches a second expert machine learning model-specific label of the plurality of expert machine learning model-specific labels, an expert machine learning model-specific label confidence score of at least one of at least one of the first expert machine learning model-specific label or the second expert machine learning model-specific label by at least one rule; and confirm the at least one of at least one of the first expert machine learning model-specific label or the second expert machine learning model-specific label by at least one rule based at least in part on the expert machine learning model-specific label confidence score exceeding a threshold.

Clause 18. The system of clause 17, wherein the at least one rule is user configurable.

Clause 19. The system of clause 11, wherein the at least one processor is further configured to: query at least one external data source with at least one expert machine learning model-specific label of the plurality of expert machine learning model-specific labels; receive property data associated with the at least one expert machine learning model-specific label from the at least one external data source in response; and modify the at least one scene text-based markup to include metadata comprising the property data.

Clause 20. The system of clause 11, wherein the video is live-streamed and the indexing is in real-time.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk(™), TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, a digital video comprising a sequence of a plurality of video frames;
inputting, by the at least one processor, at least one video frame into a video frame encoder to output at least one video frame vector for the at least one video frame;
determining, by the at least one processor, a similarity value between the at least one video frame and at least one adjacent video frame in the sequence based at least in part on a similarity between the at least one video frame vector and at least one adjacent video frame vector of the at least one adjacent video frame;
determining, by the at least one processor, at least one scene within the sequence of the plurality of video frames based at least in part on:
the similarity value, and
a similarity threshold value;
wherein the at least one scene comprises at least one sub-sequence of adjacent video frames;
inputting, by the at least one processor, each video frame of the at least one scene into a plurality of expert machine learning models to output a plurality of expert machine learning model-specific labels associated with the at least one scene;
determining, by the at least one processor, a plurality of expert machine learning model-specific markup tags associated with the plurality of expert machine learning models; and
generating, by the at least one processor, at least one scene text-based markup for the at least one scene comprising the plurality of expert machine learning-specific markup tags and the plurality of expert machine learning-specific labels associated with the at least one scene.

2. The method of claim 1, further comprising:
inputting, by the at least one processor, a plurality of video frames into a video frame encoder to output a plurality of video frame vectors;
generating, by the at least one processor, an aggregate video frame vector for the plurality of video frame vectors;
determining, by the at least one processor, a shot similarity value between the aggregate video frame vector and at least one adjacent aggregate video frame vector of an adjacent plurality of video frames in the sequence; and
determining, by the at least one processor, a scene comprising the plurality of video frames and the adjacent plurality of video frames based at least in part on the shot similarity value exceeding a threshold value.

3. The method of claim 2, further comprising:
inputting, by the at least one processor, the scene into a scene classifier neural network to output at least one shot type based at least in part on a plurality of trained neural network parameters.

4. The method of claim 1, further comprising:
indexing, by the at least one processor, the at least one sub-sequence of video frames of the at least one scene using the at least one scene markup.

5. The method of claim 4, further comprising:
searching, by the at least one processor, the at least one scene markup, using the index, based on a search query comprising plain text.

6. The method of claim 4, further comprising:
receiving, by at least one processor, a search query comprising plain text;
encoding, by the at least one processor, the search query into a search vector using at least one semantic embedding model;
encoding, by the at least one processor, the at least one scene text-based markup into a destination vector using the at least one semantic embedding model; and
searching, by the at least one processor, the at least one destination vector with the search vector based at least in part on a measure of similarity between the search vector and the destination vector.

7. The method of claim 1, further comprising:
increasing, by the at least one processor, upon determining that a first expert machine learning model-specific label of the plurality of expert machine learning model-specific labels matches a second expert machine learning model-specific label of the plurality of expert machine learning model-specific labels, an expert machine learning model-specific label confidence score of at least one of at least one of the first expert machine learning model-specific label or the second expert machine learning model-specific label by at least one rule; and
confirming, by the at least one processor, the at least one of at least one of the first expert machine learning model-specific label or the second expert machine learning model-specific label by at least one rule based at least in part on the expert machine learning model-specific label confidence score exceeding a threshold.

8. The method of claim 7, wherein the at least one rule is user configurable.

9. The method of claim 1, further comprising:
querying, by the at least one processor, at least one external data source with at least one expert machine learning model-specific label of the plurality of expert machine learning model-specific labels;
receiving, by the at least one processor, property data associated with the at least one expert machine learning model-specific label from the at least one external data source in response; and
modifying, by the at least one processor, the at least one scene text-based markup to include metadata comprising the property data.

10. The method of claim 1, wherein the video is live-streamed and the indexing is in real-time.

11. A system comprising:
At least one processor that is configured to:
receive a digital video comprising a sequence of a plurality of video frames;
input at least one video frame into a video frame encoder to output at least one video frame vector for the at least one video frame;
determine a similarity value between the at least one video frame and at least one adjacent video frame in the sequence based at least in part on a similarity between the at least one video frame vector and at least one adjacent video frame vector of the at least one adjacent video frame;
determine at least one scene within the sequence of the plurality of video frames based at least in part on:
the similarity value, and
a similarity threshold value;
wherein the at least one scene comprises at least one sub-sequence of adjacent video frames;

input each video frame of the at least one scene into a plurality of expert machine learning models to output a plurality of expert machine learning model-specific labels associated with the at least one scene;

determine a plurality of expert machine learning model-specific markup tags associated with the plurality of expert machine learning models; and generate at least one scene text-based markup for the at least one scene comprising the plurality of expert machine learning-specific markup tags and the plurality of expert machine learning-specific labels associated with the at least one scene.

12. The system of claim 11, wherein the at least one processor is further configured to:

input a plurality of video frames into a video frame encoder to output a plurality of video frame vectors;

generate an aggregate video frame vector for the plurality of video frame vectors;

determine a shot similarity value between the aggregate video frame vector and at least one adjacent aggregate video frame vector of an adjacent plurality of video frames in the sequence; and determine a scene comprising the plurality of video frames and the adjacent plurality of video frames based at least in part on the shot similarity value exceeding a threshold value.

13. The system of claim 12, wherein the at least one processor is further configured to:

input the scene into a scene classifier neural network to output at least one shot type based at least in part on a plurality of trained neural network parameters.

14. The system of claim 11, wherein the at least one processor is further configured to:

index the at least one sub-sequence of video frames of the at least one scene using the at least one scene markup.

15. The system of claim 14, wherein the at least one processor is further configured to:

search the at least one scene markup, using the index, based on a search query comprising plain text.

16. The system of claim 14, wherein the at least one processor is further configured to:

receiving, by at least one processor, a search query comprising plain text;

encode the search query into a search vector using at least one semantic embedding model;

encode the at least one scene text-based markup into a destination vector using the at least one semantic embedding model; and search the at least one destination vector with the search vector based at least in part on a measure of similarity between the search vector and the destination vector.

17. The system of claim 11, wherein the at least one processor is further configured to:

increase upon determining that a first expert machine learning model-specific label of the plurality of expert machine learning model-specific labels matches a second expert machine learning model-specific label of the plurality of expert machine learning model-specific labels, an expert machine learning model-specific label confidence score of at least one of at least one of the first expert machine learning model-specific label or the second expert machine learning model-specific label by at least one rule; and confirm the at least one of at least one of the first expert machine learning model-specific label or the second expert machine learning model-specific label by at least one rule based at least in part on the expert machine learning model-specific label confidence score exceeding a threshold.

18. The system of claim 17, wherein the at least one rule is user configurable.

19. The system of claim 11, wherein the at least one processor is further configured to:

query at least one external data source with at least one expert machine learning model-specific label of the plurality of expert machine learning model-specific labels;

receive property data associated with the at least one expert machine learning model-specific label from the at least one external data source in response; and modify the at least one scene text-based markup to include metadata comprising the property data.

20. The system of claim 11, wherein the video is live-streamed and the indexing is in real-time.

* * * * *